United States Patent [19]

Joel, Jr.

[11] 3,731,000

[45] May 1, 1973

[54] EQUIPMENT FOR SWITCHING CALLS FROM REMOTE TRUNK GROUPS TO DISTANT CENTRALIZED OPERATOR SERVICE CENTER

[75] Inventor: Amos Edward Joel, Jr., South Orange, N.J.

[73] Assignee: Bell Telephone Laboratories, Inc., Murray Hill, N.J.

[22] Filed: Dec. 16, 1970

[21] Appl. No.: 98,801

[52] U.S. Cl. ....................................179/8 R, 179/18 B

[51] Int. Cl. ..........................H04m 15/26, H04m 3/00

[58] Field of Search ....................179/7 F, 7 MM, 8 R

[56] References Cited

UNITED STATES PATENTS 3,122,611 2/1964 Wheeler ..............................179/7 R 3,307,150 2/1967 Bartlett ..............................179/7 R

*Primary Examiner*—Thomas B. Habecker

*Attorney*—R. J. Guenther and James Warren Falk

[57] ABSTRACT

A telephone system is disclosed in which centrally located traffic service position system (TSPS) equipment cooperates with groups of remotely situated trunks to provide the operator service required on the person-to-person type calls served by the trunks. A crossbar type switch operating as a concentrator at each remote location temporarily interconnects calling ones of the remote trunks with digit receivers, outpulsers, and operator positions at the TSPS center. The TSPS equipment also provides supervision and charge data recording via a data link for all calls served by the trunks.

20 Claims, 23 Drawing Figures

INVENTOR
A. E. JOEL, JR.
BY Donald M Duft
ATTORNEY

| X | Y | Z | |
|---|---|---|---|
| 0 | 0 | 0 | LOAD SHIFT REGISTER AND SEND 1ST DIGIT PULSES 1-5 |
| 1 | 0 | 0 | ADVANCE SHIFT REGISTER-INTERDIGITAL PULSES 6-10 |
| 0 | 1 | 0 | SEND 2ND DIGIT PULSES 11-15 |
| 1 | 1 | 0 | ADVANCE SHIFT REGISTER-INTERDIGITAL PULSES 16-20 |
| 0 | 0 | 1 | SEND 3RD DIGIT PULSES 21-25 |
| 1 | 0 | 1 | ADVANCE SHIFT REGISTER-END TRUNK NO. |

F/G. 3B
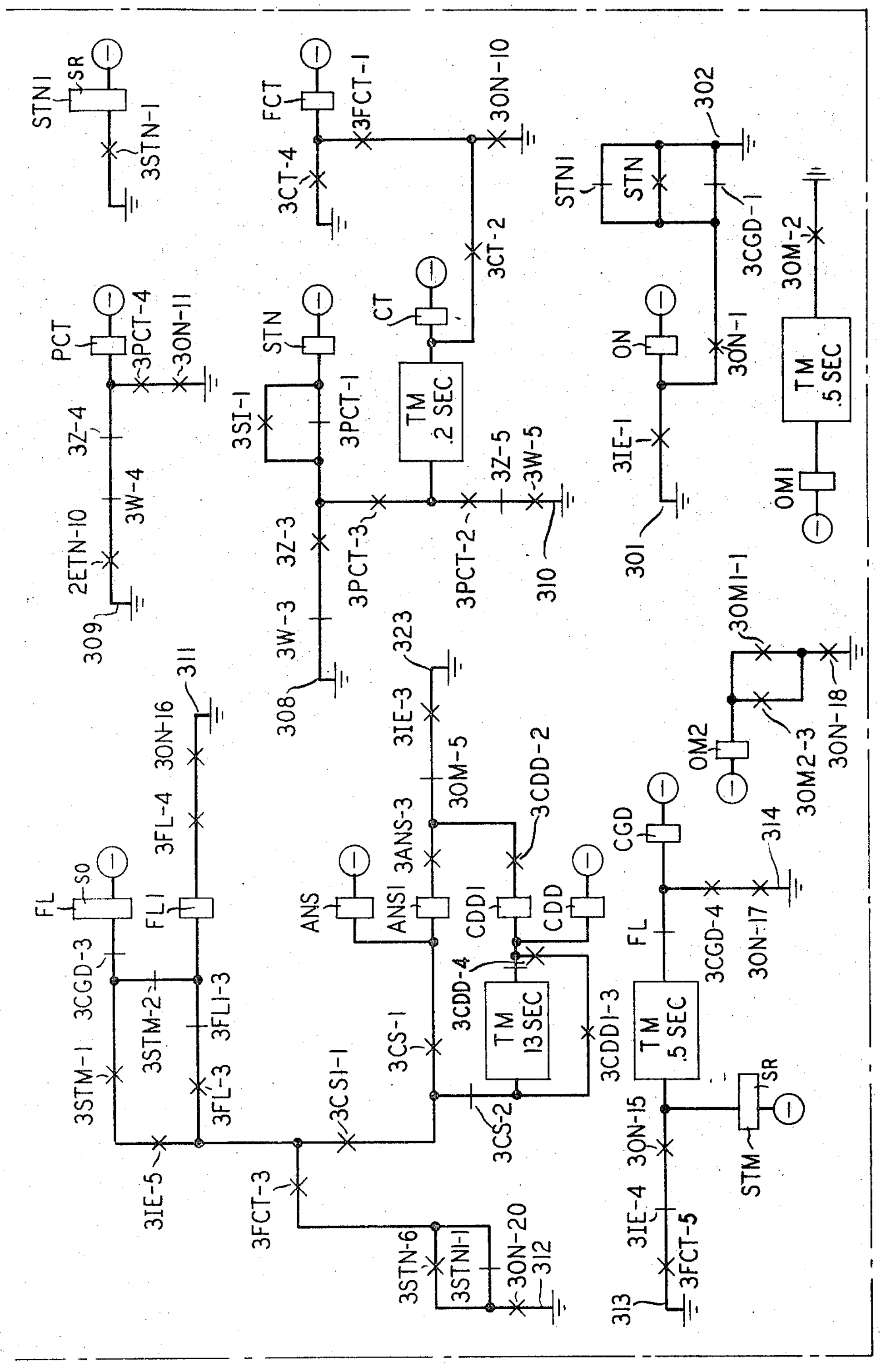

Patented May 1, 1973 3,731,000

20 Sheets-Sheet 7

EQUIPMENT FOR SWITCHING CALLS FROM REMOTE TRUNK GROUPS TO DISTANT CENTRALIZED OPERATOR SERVICE CENTER

BACKGROUND OF THE INVENTION

This invention relates to a telephone switching system, and more particularly to a switching system having improved facilities for serving customer dialed toll calls that require operator assistance for their completion. The invention further pertains to a system having facilities positioned intermediate a toll and a local office for providing operator assistance on customer calls incoming to the toll office. The invention further pertains to a system in which centrally located facilities, including operator positions and charge data recording equipment, cooperate with remotely situated trunks to facilitate the serving of the customer dialed person-to-person and other type calls extended over the trunks to a toll office.

It is known to equip telephone systems with facilities for serving person-to-person and other types of calls that require the services of an operator for their completion. During the establishment of such calls, the calling party dials the called number and an operator position is then subsequently temporarily bridged onto the connection to provide whatever services may be required such as, for example, ascertaining that the specified party is available for a person-to-person call, determining that the called station will accept the charges for a collect call, et cetera. In accordance with one such prior art arrangement, e.g., U. S. Pat. Nos. 3,341,661 and 3,341,662, issued Sept. 12, 1967 to R. B. Curtis and Cerny et al. respectively, equipment is provided at an existing toll or tandem office for serving customer dialed person-to-person type calls in this manner. A disadvantage of the Curtis and Cerny arrangement is that it requires the installation or modification of equipment at the toll or tandem office at which the services are to be provided.

In accordance with an improved prior art arrangement, e.g., U. S. Pat. No. 3,484,560, R. J. Jaeger, Jr. et al. issued Dec. 16, 1969, traffic service position system (TSPS) equipment is positioned intermediate a local and a toll office for providing person-to-person type service on the originating toll traffic extended from the local to the toll office. The TSPS equipment includes a plurality of TSPS trunk circuits each of which is permanently connected between a local office outgoing trunk circuit and a toll office incoming trunk circuit. The equipment further includes operator positions, charge data recording apparatus, together with equipment for automatically connecting the operator positions to the TSPS trunk circuits to which calls have been extended by the local office. In connection with a call establishment, the TSPS equipment receives the information outpulsed from the local office, registers and translates this information to determine whether or not operator assistance is required, and then outpulses to the toll office the information it requires. Each call extended to the toll office, regardless of whether operator assitance is required, is monitored and timed by the TSPS center and charge data is recorded upon the call termination. If a call requires a connection to an operator, this is effected concurrently with the establishment of the forward connection to the terminating office and called station. When connected, the operator performs the duties required of her, and then depresses keys at her position to indicate the type of service provided as well as to release her position from the connection. The calling and called station remain connected via the TSPS trunk circuit for the call duration.

The Jaeger et al. TSPS system is advantageous in certain respects over the other prior art arrangements for serving customer dialed person-to-person type calls in that no modification of existing offices is required. However, since the TSPS equipment must be nearby or adjacent the trunks whose calls it serves, its application is economically limited to large trunk groups having a sizable quantity of toll traffic. This factor excludes TSPS from use with smaller trunk groups and thereby prevents subscribers served by such trunk groups from dialing their own personto-person type calls.

BRIEF SUMMARY OF THE INVENTION

OBJECTS

It is therefore an object of the invention to provide facilities whereby subscribers whose offices are served by small trunk groups may dial their own person-to-person type toll calls.

It is a further object to provide facilities whereby the customer dialed person-to-person type traffic extended to a toll office over relatively small trunk groups may be economically served by TSPS equipment.

Summary Description

In accordance with an illustrative embodiment of the invention, a system is disclosed having (1) a centrally located TSPS center including control equipment and operator positions, (2) a plurality of relatively small remotely situated trunk groups each of which interconnects a different local office with a toll office, (3) a remote TSPS trunk circuit connected to and comprising a part of each remote trunk and (4) facilities which enable each remote TSPS trunk circuit serving a call to communicate and exchange call information with the TSPS center. This permits each remote trunk group to serve person-to-person type calls in a manner analogous to that in which such calls are served in the Jaeger et al. system whose TSPS trunk circuits comprise a portion of the TSPS center itself.

The TSPS center with its processor, operator positions, and other control equipment need not be nearby any of the remote trunk groups. The remote TSPS (RTSPS) trunk circuits are divided into groups with each such group being connected to a group of toll trunks over which it is desired to serve person-to-person type calls. Each RTSPS trunk circuit is positioned intermediate a local and a toll office and is individually connected to a trunk extending between the two offices. The incoming end of each RTSPS trunk circuit is connected by its trunk to a local office outgoing trunk circuit; the outgoing end of each remote TSPS trunk circuit is connected by its trunk to a toll office incoming trunk circuit.

Each group of RTSPS trunk circuits is associated with a crossbar type concentrator switch which is physically situated in the same remote location as the trunk circuits. The crossbar switch verticals are connected to the incoming and outgoing portions of each RTSPS trunk circuit; the switch horizontals are connected to circuit paths extending to the TSPS center which, in turn, connects digit receivers, outpulsers, and operator positions, to these paths, as required, during the serving of calls. The concentrator switch at each remote location permits its associated RTSPS trunk circuits to communicate with the TSPS center so that the person-to-person type call service may be provided in the same manner as if the trunk circuits were an integral part of the TSPS center.

A remote TSPS trunk circuit receiving a call is initially connected via the concentrator switch to a first path extending to the TSPS center. The TSPS center connects a digit receiver to this path so that call information may be received from the remote location and the local office. The RTSPS trunk circuit contains circuitry which generates and transmits information to the TSPS center identifying the trunk and the current state of completion of the call. The originating office then outpulses the calling and called number information forward, via the RTSPS trunk circuit and concentrator switch, to the TSPS center. The digit receiver is then released and an operator position is connected to this same path. The operator converses with the calling party to determine the service required. Subsequently, the TSPS center seizes a different path extending to the remote location, connects an outpulser to this path, and outpulses the priorly received RTSPS trunk identification digits plus a digit specifying the outgoing end of the trunk circuit. The reception of these digits at the remote location causes the concentrator switch to connect the second path to the outgoing end of the same RTSPS trunk circuit to which the TSPS center is currently connected over the first path. The TSPS center then outpulses call information forward to the toll office via the concentrator switch and the RTSPS trunk circuit.

The concentrator switch connection to the second path is released as soon as outpulsing is completed at the TSPS center. The first path is released when the call is successfully completed to the called station or when the required operator service has been provided. Depending on the type of call the operator may or may not release before the call is answered. If the operator is required to remain on the connection to converse with the called party, e.g., collect and person-to-person calls, she will depress a key to indicate when call charging should begin.

The operator will release on many types of calls before the called station answers, e.g., credit card calls. The remote concentrator switch connection to the TSPS center is released as soon as the operator releases. Subsequently, when the call is answered, a new concentrator switch connection form the RTSPS trunk circuit to TSPS center is established, the trunk circuit identification circuitry is reactivated to transmit the trunk number to the TSPS center together with a special digit indicating that the call has now been answered. The TSPS center then records the appropriate call answer time in the same area of temporary memory the remainder of the information for the same call is currently stored.

Each RTSPS trunk circuit contains facilities for detecting subsequent supervisory changes of state by either party. Whenever, a change of state is detected, the equipment that was originally used to identify the trunk number is activated, the concentrator switch is seized, a new connection to the TSPS center is established, and over this connection the trunk member identification digits are again transmitted together with a special digit indicating the nature of the supervisory change of state, i.e., a calling party flash or on-hook signal. The TSPS equipment receives this information, compares it with what it already has for the same call, and determines what action is to be taken in connection with the change of state. For example, if a switchhook flash is detected, the TSPS center connects an operator position to the call connection so that further assistance may be provided. On the other hand, if an on-hook signal from either station is detected, the TSPS center determines this to be the end of the call, computes the chargeable time, and records it on magnetic tape as shown in Jaeger et al.

The above-described arrangement of my invention permits centrally located TSPS control equipment to provide person-to-person type service on customer dialed toll calls served by small trunk groups. The TSPS control center is connected to a plurality of remote locations each of which serves the traffic from a different local office. The sharing of the cost of the TSPS center by many trunk groups permits person-to-person service to be economically feasible for smaller offices and trunk groups than was heretofore possible.

Features

A feature of the invention is the provision of a centrally located traffic service position system (TSPS) service center together with a plurality of remotely situated trunk groups for serving the customer dialed calls extended from an originating office to a toll office over any of the remote trunks.

A further feature is the provision of a concentrator switch connected to each trunk group for providing communication paths between a calling trunk and the service center during the extension of a call from a local to a toll office.

A further feature is the provision of trunk identification equipment at each remote center together with facilities for transmitting trunk identification information to the service center each time a path is established by the concentrator switch from the remote center to the service center.

A further feature is the provision of facilities for outpulsing trunk identification information to the remote location each time a path is established from the service center via the concentrator switch to a calling trunk circuit, together with facilities whereby the concentrator switch control circuitry receives the outpulsed identification and uses it to establish a path to the calling trunk circuit.

A further feature is the provision of facilities at each remote center for transmitting information to the service center specifying each trunk supervisory call change of state together with the identification of the appropriate trunk circuit.

Another feature of the invention is the provision of the remote center having a plurality of remote trunk circuits each of which serves calls extended from a local to a toll office, switching means in the remote center, a service center distantly situated with respect to the remote center, facilities at the remote center responsive to the receipt of a call by one of the remote trunk circuits for establishing a connection from the calling trunk circuit through the switching facilities to the service center, facilities at the remote center for transmitting call information over the connection to the service center with the information including the identity of the calling trunk circuit and the current state of the call, facilities at the service center for connecting an operator position to the connection so that the operator at the position may converse with the calling party to determine the service required, facilities operative under control of the TSPS service center for establishing a second connection via the switching means between the service center and the calling trunk circuit, facilities in the service center for transmitting call information over the second connection and the calling trunk circuit to the toll office, facilities for releasing both connections to the service center, and facilities in the calling trunk circuit for monitoring the subsequent supervisory state of calls.

A further feature is the provision of a register in each trunk circuit, facilities in each trunk circuit effective on the detection of each supervisory change of state for entering digits into its register representing the identity of the trunk as well as the current state of the call served by the trunk circuit, and outpulsing facilities for transmitting the information stored in the register through the switching means to the service center subsequent to the detected supervisory call change of state.

A further feature is the provision of a first and a second path connecting each trunk circuit with the switching means at the remote center, facilities at the service center for transmitting to the remote center the identity of a calling trunk circuit and the identity of the particular path extending to the trunk circuit that is to be used on a connection that is initiated under control of the service center, facilities at the remote center for registering the information and for controlling the switching facilities to establish the second connection to the trunk circuit over the path specified by the service center.

A further feature is the provision of a plurality of remote centers each of which serves calls extended from a different local office to a different toll office, a plurality of remote trunk circuits in each center for serving the calls extended through its center, a distantly situated service center, switching facilities at each remote center for establishing connections between calling trunk circuits and the service center, and facilities whereby the remote center and the service center may exchange information pertaining to calls served by each remote center.

DRAWING

These and other objects, advantages, and features of the invention may be more readily understood upon a reading of the following description of an exemplary embodiment of the invention taken in conjunction with the drawing in which:

FIGS. 1A and 1B disclose a block diagram embodiment of the invention;

FIGS. 2A, 2B, 3A, 3B, 4A, 4B, 5A, 5B, 5C, 7A, and 7B disclose the details of the equipment at each remote location;

FIG. 6 discloses the transmission and signaling equipment that connects a remote location with the TSPS center;

FIGS. 8A, 8B, and 8C, 9 and 10 disclose the equipment comprising the TSPS center, FIG. 11 illustrates how FIGS. 1A and 1B should be arranged with respect to each other;

FIG. 12 illustrates how FIGS. 2A through 8B should be arranged with respect to each other; and FIG. 13 discloses the details of a trunk that is used at the TSPS center to receive calls from a remote location.

GENERAL DESCRIPTION

FIGS. 1A and 1B together diagrammatically disclose the invention in a manner which facilitates an understanding of its broader system aspects. These figures disclose a centrally located TSPS Center 100, a plurality of local offices such as 101A and 101B, a plurality of toll offices such as 102A and 102B, and a plurality of remote service units such as 113A and 113B. Each remote service unit is positioned intermediate a local office and a toll office. Thus, remote service unit 113A is intermediate local office 101A and toll office 102A. Each remote service unit is connected to the TSPS Center 100 by circuit paths such as 114A for remote service unit 113A. The remote service units communicate with the TSPS Center to permit its operator positions 109 to provide whatever assistance may be required on the customer dialed person-to-person type calls extended from a local to a toll office.

Remote switch unit 113A contains RTSPS trunk circuit 103–0 through 103–99, a concentrator switch 108A, a switch controller 108B, and remote base unit trunk circuits 110–0 through 110–9. Each RTSPS trunk circuit 103– is connected on its incoming side via conductors IT and IR to a local office outgoing trunk circuit. Thus, remote TSPS circuit 103–0 is connected to outgoing trunk circuit 120A–0. Each RTSPS trunk circuit is connected on its outgoing side over a pair of conductors OT and OR to a toll office incoming trunk circuit such as 121A–0 for RTSPS trunk circuit 103–0. The remaining trunk circuits 103– in remote service unit 113A are similarly connected between a local and a toll office. The trunk circuits of all other remote service units are similarly connected between the local and toll offices with which they are associated. With this arrangement, each local office outgoing trunk circuit is connected to a different RTSPS trunk circuit 103– and in turn is individual to the toll office incoming trunk to which its RTSPS trunk circuit is connected. Each call from office 101A for example, is extended over a selected one of its outgoing trunk circuits through its associated RTSPS trunk circuit, and in turn, to its associated incoming trunk circuit at toll office 102A.

The vertical conductors of concentrator switch 108A are connected to the trunk circuits 103. Each trunk circuit is connected to two verticals so that separate and independent connections can be made to the incoming and outgoing end of the trunk circuit. Thus, conductors 111–0 connect the incoming side of trunk circuit 103–0 with switch vertical VO; conductors 112–0 connect the outgoing end of the trunk circuit with the V1 vertical. The remote base unit trunk circuits 110–0 through 110–9 are connected to switch horizontals HO through H9. The right-hand or outgoing side of each trunk circuit 110 is connected over separate conductor paths 114A to an appearance on switching network 104A at TSPS Center 100. For example, trunk circuit 110–0 is connected via conductors 114A–0 to the TSPS network. The remote base unit trunk circuits 110 are further connected over path 124 to an MF receiver 108C.

The controller 108–B and the concentrator switch 108A together cooperate to establish the connections that are required from a calling trunk circuit 103, via a base unit trunk circuit 110, to the TSPS Center 100. The extension of each call from a trunk circuit 103 to a toll office requires two separate concentrator switch connections to the TSPS center. A connection is first established via conductors 111 from the incoming side of an RTSPS trunk circuit 103, through the concentrator switch and a base unit trunk circuit to the TSPS Center. Call information is transmitted to the TSPS Center over the path. Subsequently, the controller and the concentrator switch connect the outgoing end of trunk circuit with the TSPS Center. This connection is established over conductors 112 and the vertical of the switch to which these conductors are connected. This path is used to transmit information from the TSPS Center to the toll office.

The TSPS Center 100 includes a switching network 104A, a network controller 104B, a system control 105 and an AMA recorder 137. The TSPS Center further includes a plurality of operator positions 109–1 through 109–*n* each of which has an individual appearance on the right side of network 104A. The switching network 104A, system control 105, recorder 137, and the operator positions permit the TSPS Center to provide a charge data recording operation and/or operator assistance on calls extended through a remote service unit to a toll office.

Switching network 104 is connected on its left side to circuit paths 114 extending to the various remote service units 113. On its right side the switching network 104A is connected to a plurality of different circuits including outpulsers 106, and digit receivers 107. The receivers 107 receive the information transmitted to the TSPS Center from a remote service unit, the outpulser transmits information to the remote service units, and in turn, to a toll office. The switching network 104 includes link 104A which contains the paths required to interconnect the circuits having appearances on its left side with those having appearance on its right side. Switching network 104 further includes link controller 104B which controls the operation of the network in its path establishing function. System control 105 regulates, and coordinates the operation of each circuit of the TSPS Center so that it may furnish the service required of it on each call it receives. This service may include the recording of call charge data by recorder 137. This service may further include the attachment of an operator position 109 to an RTSPS trunk circuit whenever operator assistance is required. The operator position is disconnected when the necessary call assistance has been furnished. However, the calling and called stations remain connected via the RTSPS trunk circuit for the call duration. The equipment at the remote service unit monitors the call and transmits supervisory change of state information to the TSPS Center. From this, the TSPS Center times the call and upon its termination causes recorder 137 to record the applicable charge data.

In order to illustrate the operation of the system of FIGS. 1A and 1B let it be assumed that a customer dialed call requiring operator assistance originates in local office 101A. Let it further be assumed that this call requires a routing to toll office 102A via the trunk group served by remote service unit 113A. Finally, let it be assumed that in serving this call, local office 101A selects outgoing trunk circuit 120A–O. The seizure of this circuit generates a signal which is received by RTSPS trunk circuit 103–O. The receipt of this signal causes trunk circuit 103–O to transmit a signal to controller 108B requesting that the incoming side of the trunk circuit be connected via concentrator switch 108A and a base unit trunk circuit to the TSPS Center. Let it be assumed that controller 108B establishes this interconnection via switch vertical VO and horizontal H9 to base unit trunk circuit 110–9. From there, the connection is further extended via path 114–9 to an appearance on network 104A at the TSPS Center. The receipt of the call is detected by the TSPS equipment and system control 105 causes network 104A to establish a connection between path 114A–9 and digit receiver 107. The purpose of this interconnection is to permit the TSPS Center to receive and register the call information it will subsequently receive.

The TSPS Center transmits a signal to remote base unit trunk circuit 110–9 as soon as the connection to receiver 107 has been established. Trunk circuit 110–9 transmits a signal to this effect via the concentrator switch to trunk circuit 103–O. The outpulser 116–O of the trunk circuit 103–O now generates and transmits to the TSPS Center information identifying the current status of the call as well as the number of RTSPS trunk circuit serving the call. This information is received and registered in system control 105.

An RTSPS trunk circuit requests the establishment of a connection to the TSPS Center a plurality of times during the serving of a typical call. Each time a connection is established, the trunk outpulser 116– transmits call status and trunk identity information to the TSPS Center. This information is needed so that the TSPS Center will know the current state of the call, i.e., whether it is being established or alternatively, for example, whether the call is about to be released as both parties go on-hook. Other types of call status signals are also transmitted for other purposes as is subsequently described in detail. The trunk identification information is necessary since the TSPS Center has no other way of knowing which trunk is serving a call at a remote service unit. This information is also needed so that the TSPS Center can subsequently initiate the establishment of a connection to the outgoing end 112–O of a calling trunk circuit, such as trunk circuit 103–O, for example.

After the call status and trunk identify information is transmitted to the TSPS Center, trunk circuit 103–O transmits a signal back to the local office requesting that it outpulse the calling and called station information. This information is then outpulsed over outgoing trunk circuit 120A–O, and over conductors IT and IR to trunk circuit 103–O. From there, it is passed over path 111–O, through the VO and H9 crosspoints of the switch, through remote base unit trunk circuit 110–9, over path 114A–9, to the TSPS Center. From there the information is passed via the network 104A to the receiver 107 which detects it and registers in system control 105.

System control now (1) causes link controller 104B to release the network connection to the digit receiver 107 after the local office outpulsing operation has been completed, (2) determines that the call requires operator assistance, and (3) causes the link controller to establish a network connection between path 114A–9 and an idle operator position. Let it be assumed that position 109–1 is available to serve this call. This being the case, switching network now establishes a connection between path 114A–9 on the left-hand side of the network and the conductors extending to operator position 109–1.

At the same time an operator position is being selected and attached to the calling end 111–O of trunk 103–O, the TSPS Center initiates the operations required to establish a connection to the outgoing end 112–O of trunk circuit 103–O so that call information may be transmitted to the toll office. As a first step in this sequence of operations, system control selects an idle path extending back to the remote location. Let it be assumed that path 114A–O is idle and is selected. This also amounts to a selection of trunk circuit 110–O. Next, the TSPS center connects outpulser 106 via network 104A to path 114A–O and in turn to remote base unit trunk circuit 110–O. At this time it is necessary that the TSPS center outpulse information specifying the remote TSPS trunk circuit to which the concentrator switch should establish a connection from base unit trunk circuit 110–O. Specifically in order that a connection may be established to the outgoing end of trunk circuit 103–O at this time, it is necessary that controller 108B receive information indicating not only to which RTSPS trunk circuit path 114A–O is to be extended, but whether the path should be extended to the incoming or outgoing end of the trunk circuit. Since for the call now being described, a connection is to be established from base unit trunk circuit 110–O to the outgoing end of trunk circuit 103–O, the TSPS outpulser 106 transmits information to this effect over path 114A–O to the remote location. This information is received by trunk circuit 110–O and extended over path 124 to MF receiver 108C. The receiver detects and registers the information and causes the controller to connect trunk circuit 110–O with the outgoing end 112–O of trunk circuit 103–O by means of its vertical conductor V1.

The base unit trunk circuit 110–O transmits a signal to the TSPS center indicating the establishment of this connection, and the TSPS outpulser then transmits the called station information over this path. This information is received by the outgoing end of trunk circuit 103–O and applied over conductors OT, OR to toll office incoming trunk circuit 112A–O. The toll office utilizes this information to establish the forward connection in the conventional manner. The TSPS outpulser is disconnected from the call upon the termination of outpulsing and the concentrator switch connection between path 114A–O and trunk circuit 103–O is released.

The operator converses with the calling party as soon as her position is connected to the incoming end of RTSPS trunk circuit 103–O via network 104A at the TSPS center and concentrator 108A at the remote service unit. As already mentioned, the connection of the operator to the incoming end of the RTSPS trunk circuit is effected as soon as the receiver 107 is disconnected at the end of the local office outpulsing operation. The relative times at which the TSPS outpulser and the operator position are attached to a call is determined by system control 105. It is generally desirable that the operator have sufficient time to converse with the calling party before the called station answers. The operator remains on the connection to converse with the answering party at the called station only if the call is of the person-to-person or collect type. It is not necessary that the operator converse with the called station on credit card and charge to a third party calls. When the operator has determined that the call has been established in the manner requested by the calling party, she depresses keys at her position to indicate the type of call service she provided and to release the network connection between path 114A–9 and the network appearance of her position console 109–1.

Path 115A permits system control 105 to transmit call data to each position circuit. This data may include the call type as well as the calling and/or called numbers together with any other information that the operator requires. This same path also permits each position circuit to transmit information back to the system control for charge data recording purposes as well as for instructing system control regarding the progress of each call served by the system. The information transmitted from the positions to system control may vary greatly depending upon the nature of the call.

Remote base unit trunk circuit 110–9 detects the release of operator position 109–1 from the call and, in turn, releases the VO and H9 crosspoints. This disconnects the base unit trunk circuit from the incoming end of RTSPS trunk circuit 103–O. The calling and called station remain interconnected for the call duration by the trunk circuit. This circuit monitors the supervisory status of both parties and reports each subsequent supervisory change of state to the TSPS center. When a change of state is detected, the trunk ascertains the nature of the change of state, and requests controller 108B to establish a new connection to the TSPS center. When this connection is established, the trunk circuit outpulser transmits a digit signifying the nature of the supervisory change of state as well as digits identifying the trunk itself to the TSPS equipment.

If the supervisory change of state represents a switchhook flashing condition by the calling party, the TSPS center and the remote service unit establish a new connection from an operator position to the incoming side of the trunk circuit 103–O. This permits the operator to converse with either party to determine what further service is required. If the supervisory change of state signal represents an on-hook (end of call) signal, this information is transmitted to TSPS system control which from this, as well as the other call information it has priorly received, determines that the call has been terminated and that the applicable call charges should be computed and recorded.

RTSPS trunk circuit 103–O releases when both parties go on-hook upon the call termination. The TSPS operator will normally release before the called station answers on credit card and charge to third party type calls. On these calls, the RTSPS trunk detects the off-hook condition when the called station answers and, in turn, 1. initiates the establishment of a concentrator switch connection to the TSPS center;
2. causes its outpulser to transmit digits over this connection identifying the trunk and indicating that the call has been answered.

The operator must remain on a connection until the called station answers on collect and person-to-person type calls. Before releasing, the operator depresses a key at her position indicating that the call has been successfully completed and that the charge timing should begin. The establishment by the RTSPS trunk circuit of a concentrator switch connection to the TSPS center when the called station answers is inhibited as long as the operator remain connected. However, when the operator is released, the RTSPS circuit transmits its answer information to the TSPS center in the same manner as for credit card calls. This information is disregarded by the TSPS center since the chargeable time does not begin when a person-to-person or collect type call is answered; rather it begins only when the operator determines that the specific person is available or that the charges will be accepted. The TSPS center is programmed to disregard the answer information transmitted by the RTSPS trunk circuit on all calls for which the operator keys any information specifying the beginning of the chargeable time.

All outgoing trunk circuits 120A in local office 101A on FIG. 1A extend their calls to toll office 102A via the remote service unit 113A and its RTSPS trunk circuits. If trunk circuits 120A comprise the sole means by which traffic may be routed by office 101A to the toll office, they would then be required to serve all types of traffic including calls requiring operator assistance for their completion as well as calls that do not. Trunk circuits of this type are commonly referred to as being of the combined types since they serve more than one type of traffic.

Local office 101A could have additional outgoing trunk circuits, not shown on FIG. 1A, extending directly to the toll office. In this case the outgoing traffic would be segregated by the local office and routed to the toll office over the trunk group individual to the type of service required on each call. With this arrangement noncoin station paid and other calls not requiring operator assistance would be routed directly to the toll office; calls requiring operator assistance would be un-routed via the remote service units to the toll office. A direct trunk route could be utilized for this purpose and the TSPS facilities circumvented only if either the local or toll office has facilities for obtaining and automatically recording the charge data required for billing purposes. If such is not the case, a direct trunk group could not be utilized and all traffic would have to be routed via the remote service unit. In this event, an operator position would be attached only on calls requiring operator assistance. Calls not requiring operator assistance would be served by the TSPS facilities in the same manner as already described except that a connection to an operator position would not be made. The call data required for billing purposes would be received by a system control 105 from digit receiver 107 in the manner already described.

The preceding has described the manner in which calls extended from office 101A via remote service unit 113A are extended to toll office 102A and served by the TSPS Center 100. Calls originating at local office 101B and directed to toll office 102B are extended through remote service unit 113B and served by the TSPS Center 100 in the same manner.

The TSPS Center 100 shown on FIG. 1A is a slightly modified version of the TSPS system shown in the aforementioned Jaeger et al. patent which is hereby incorporated as a part of the present application to the same extent that it fully disclosed herein. Only those elements of the Jaeger system are shown on FIG. 1 as are necessary for an understanding of the broader system aspects of my invention. Further details of the present invention as well as additional details of the Jaeger TSPS system are shown on other drawing figures and are described in subsequent portions of the specification.

DETAILED DESCRIPTION

Figure 4A:
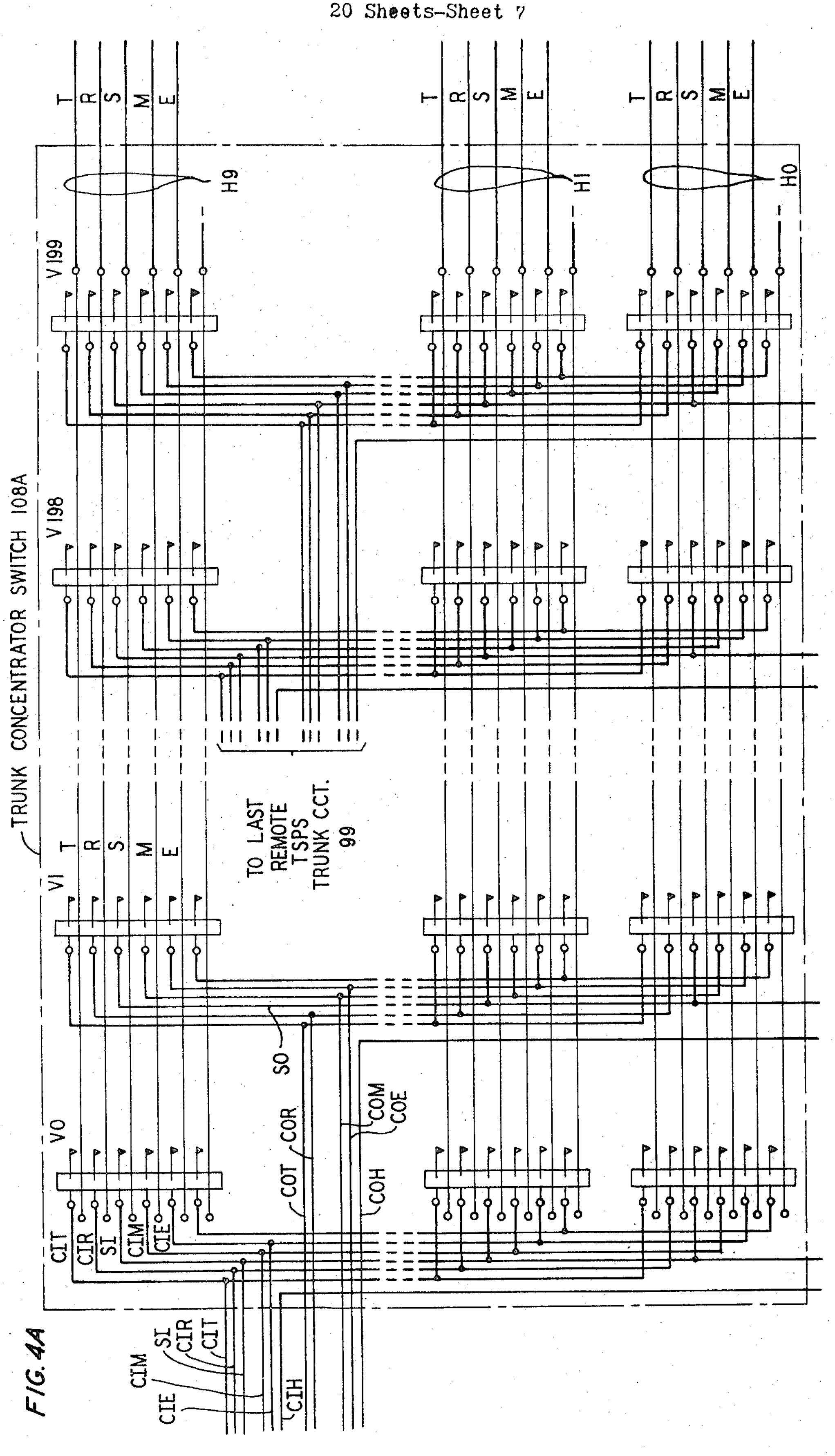
Figure 4B:
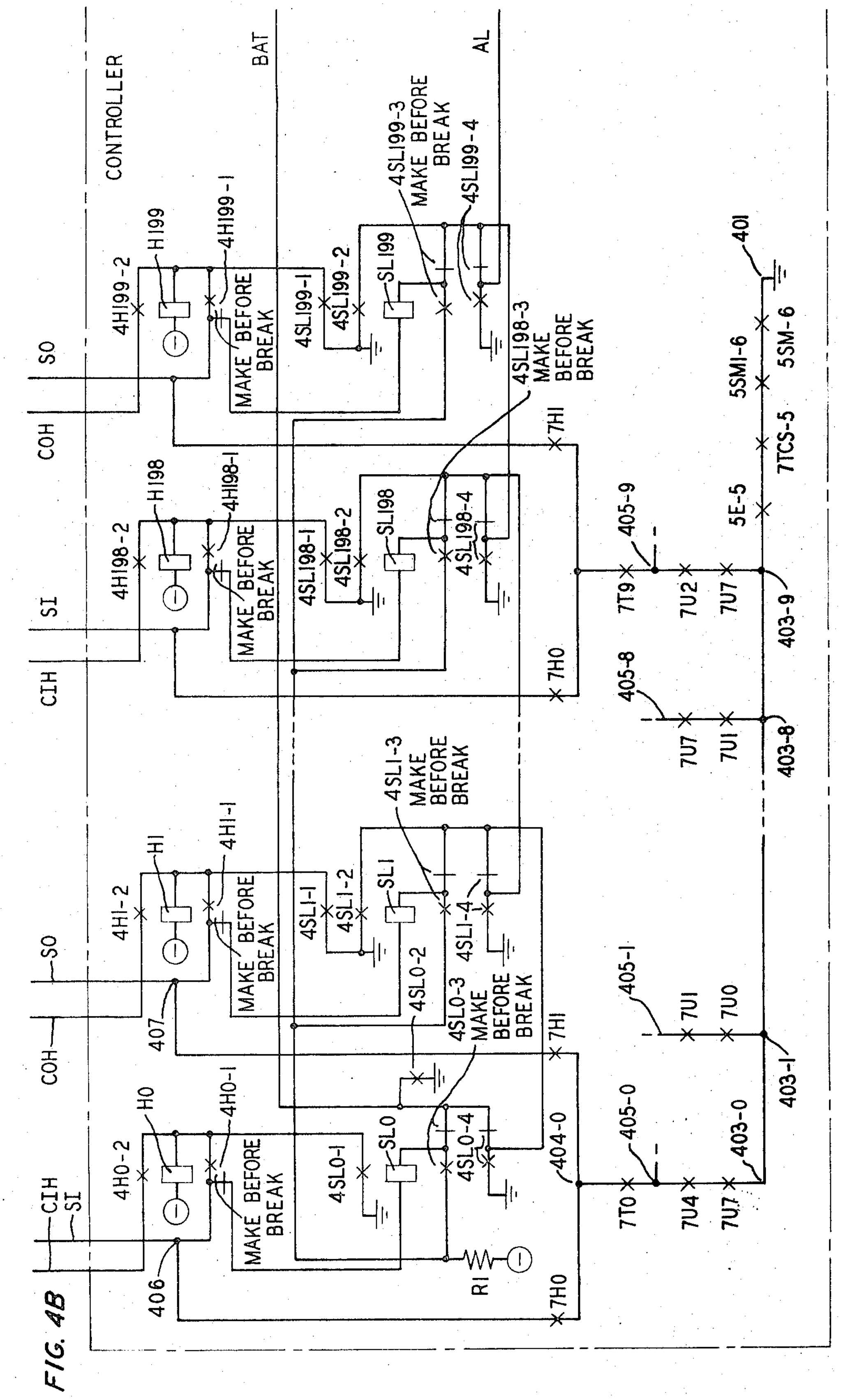
Figure 5A:
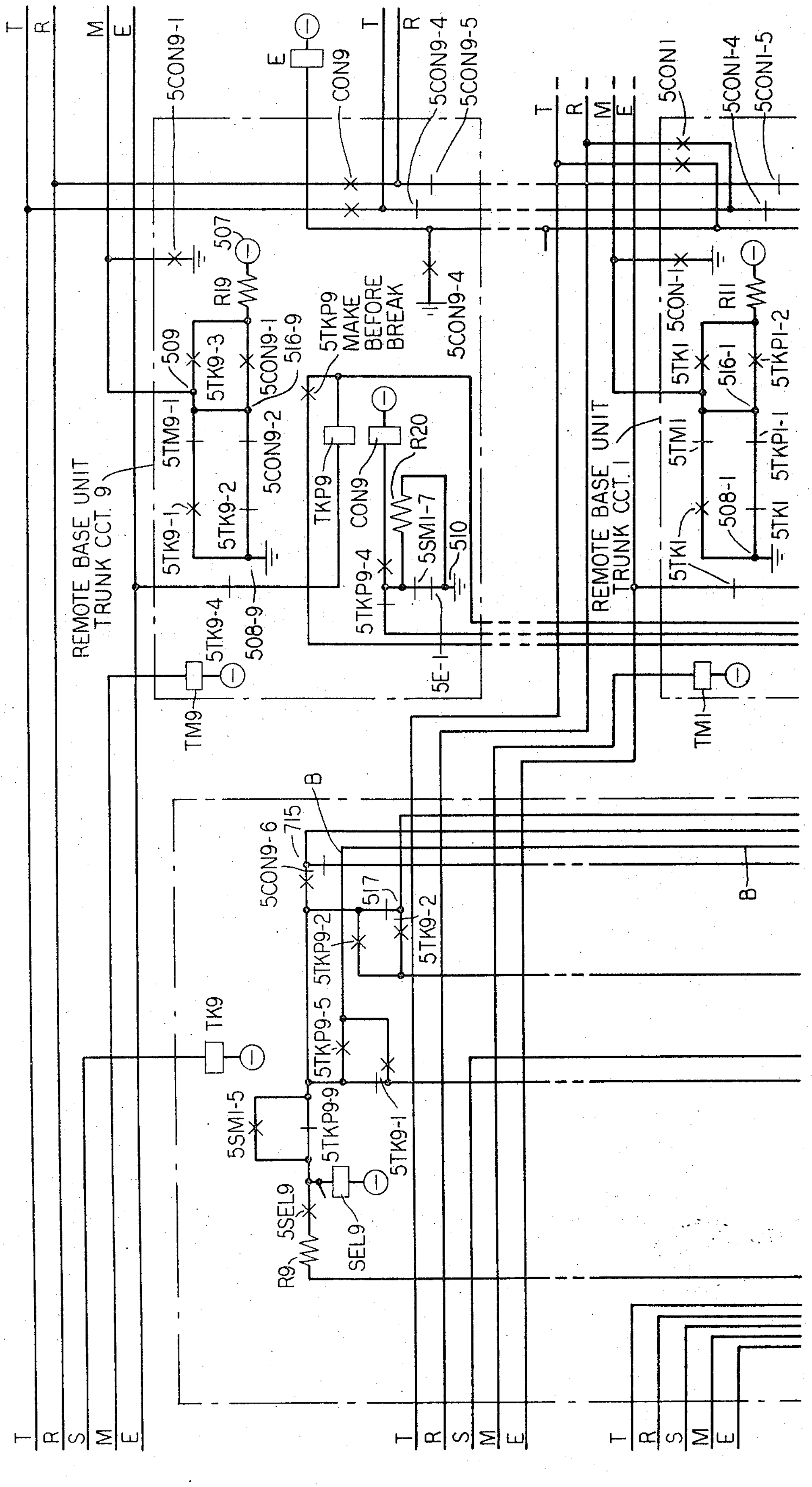
Figure 5B:
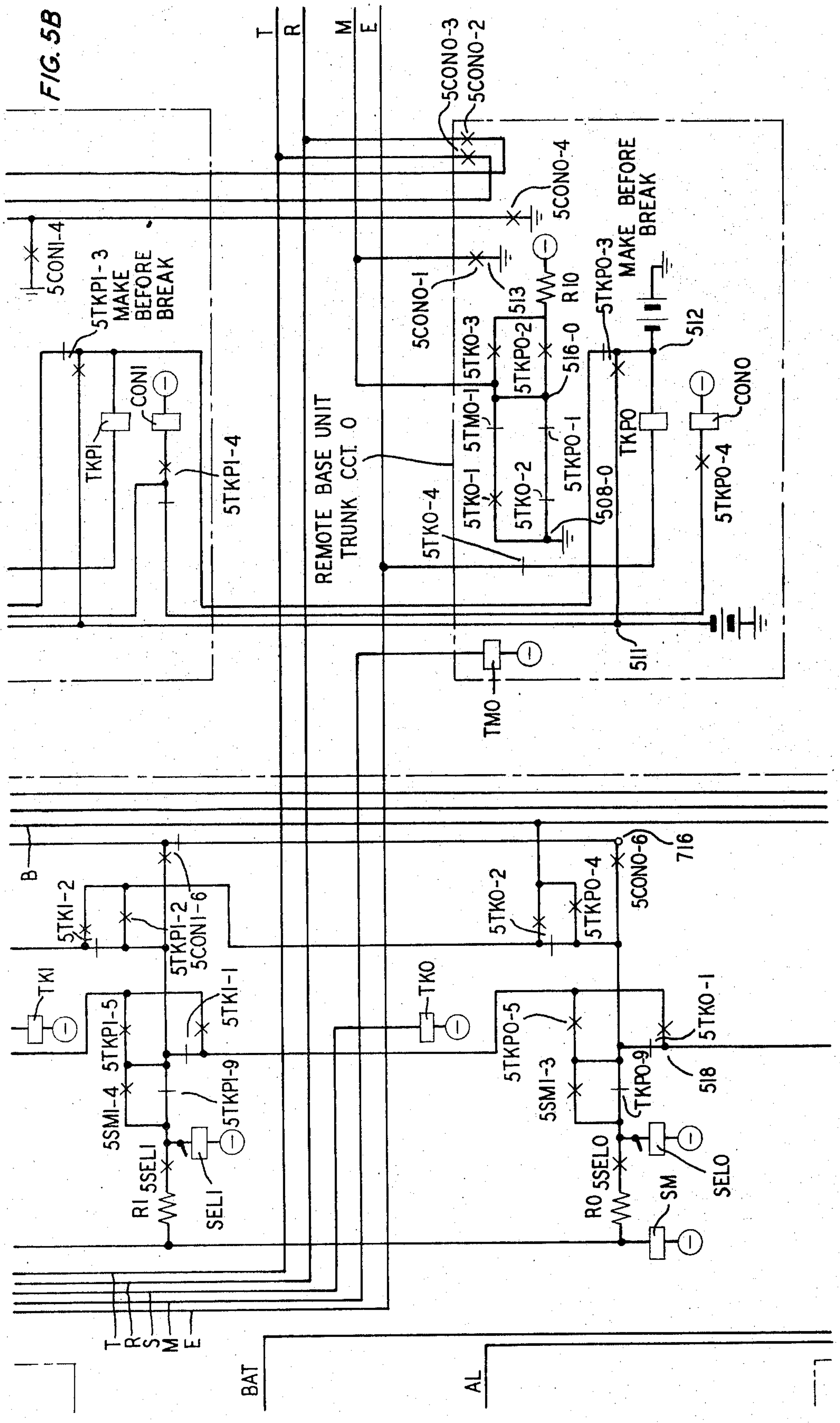
Figure 5C:
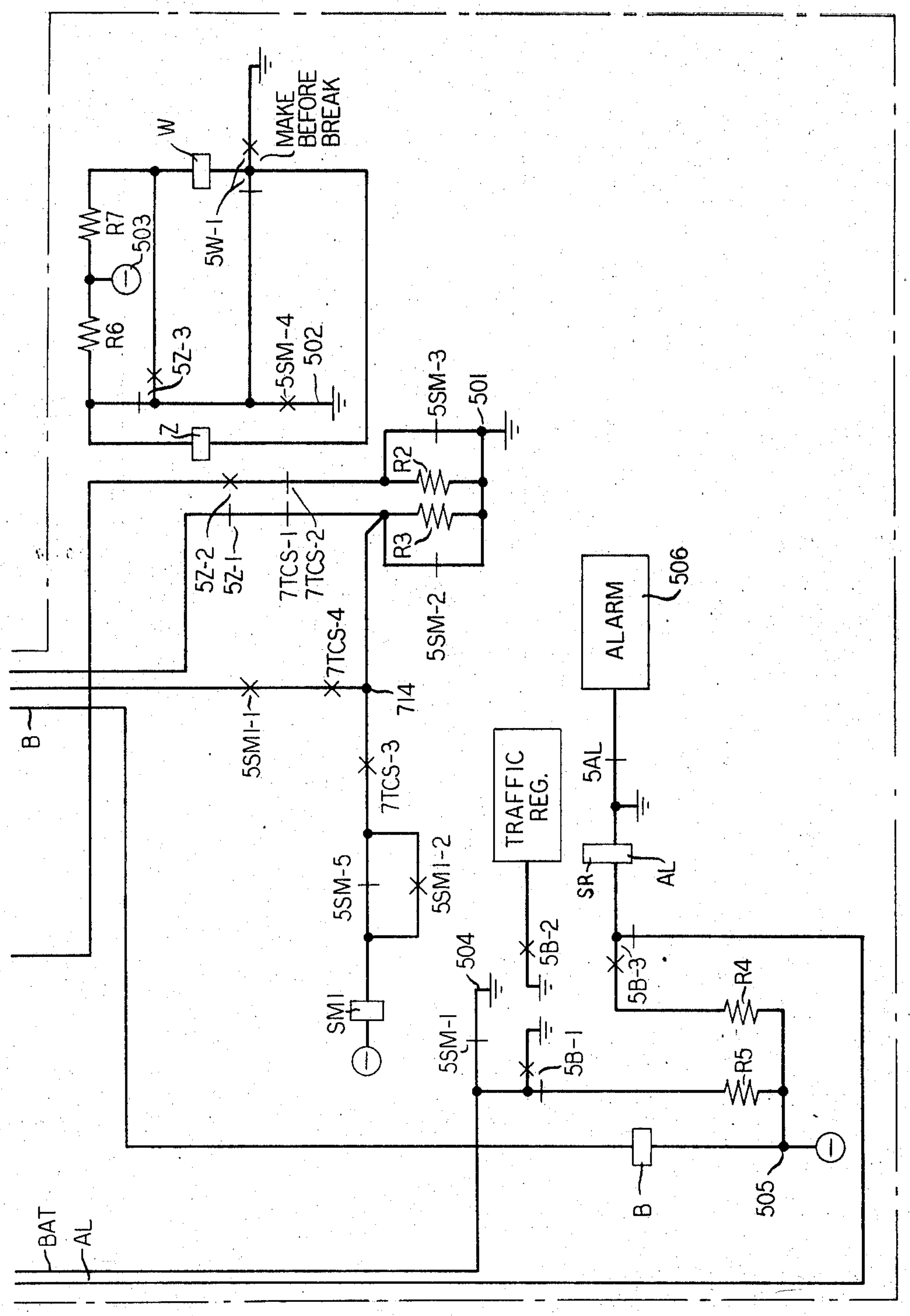
Figure 6:
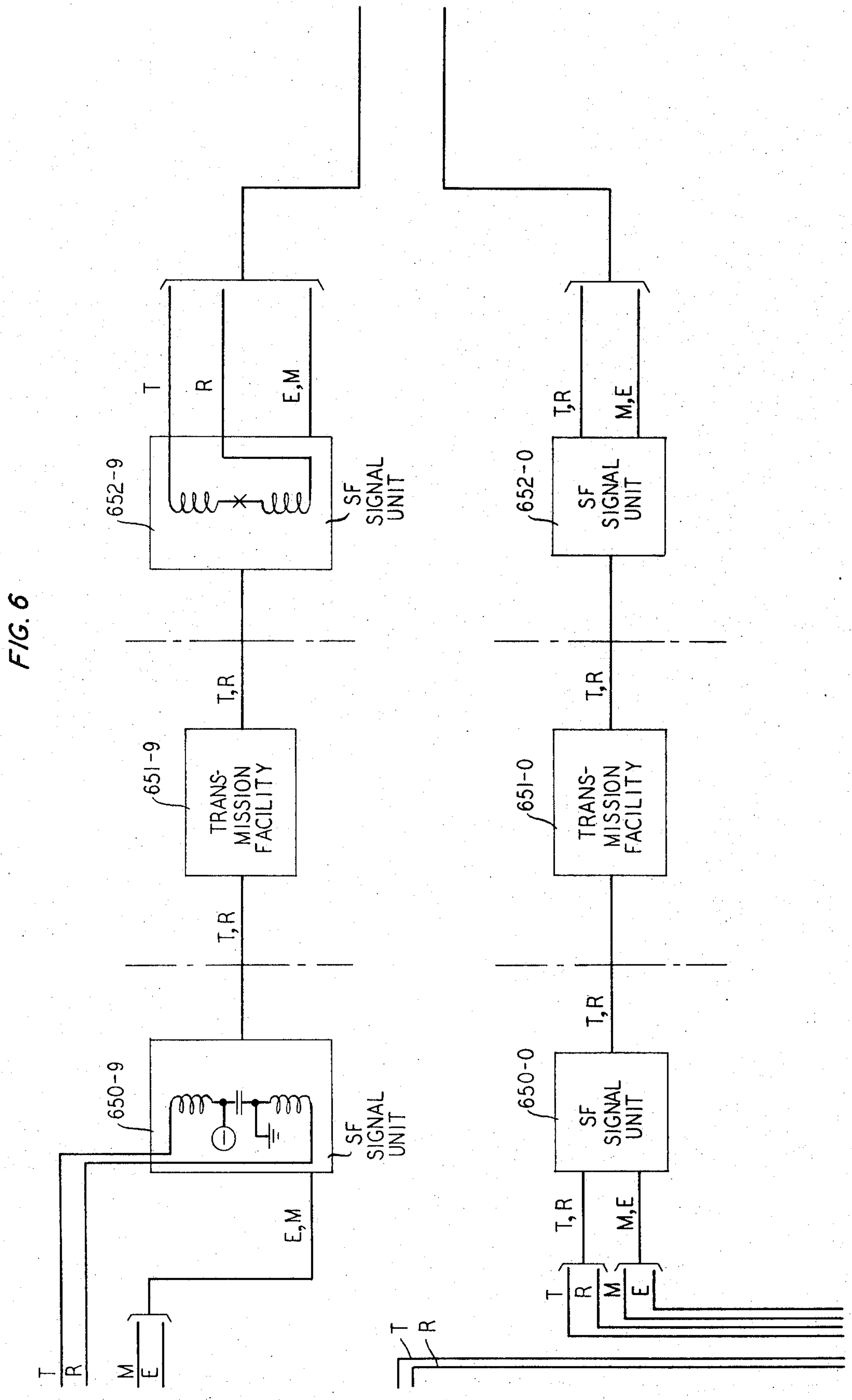
Figure 9:
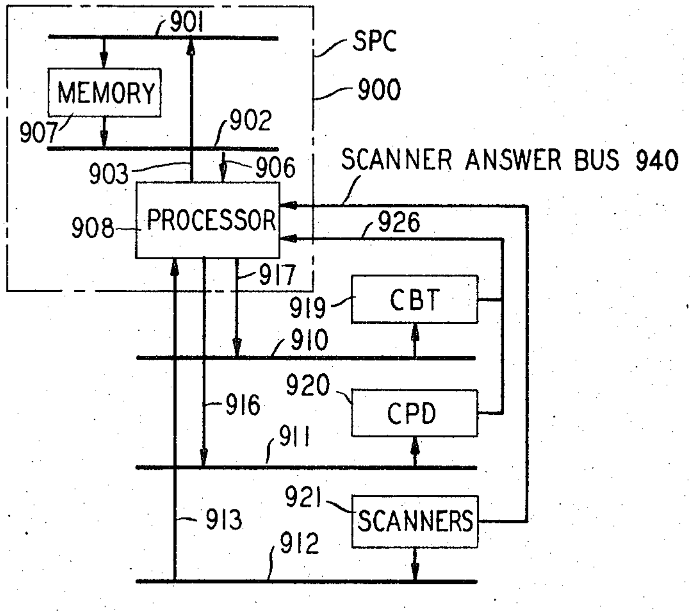
Figure 10:
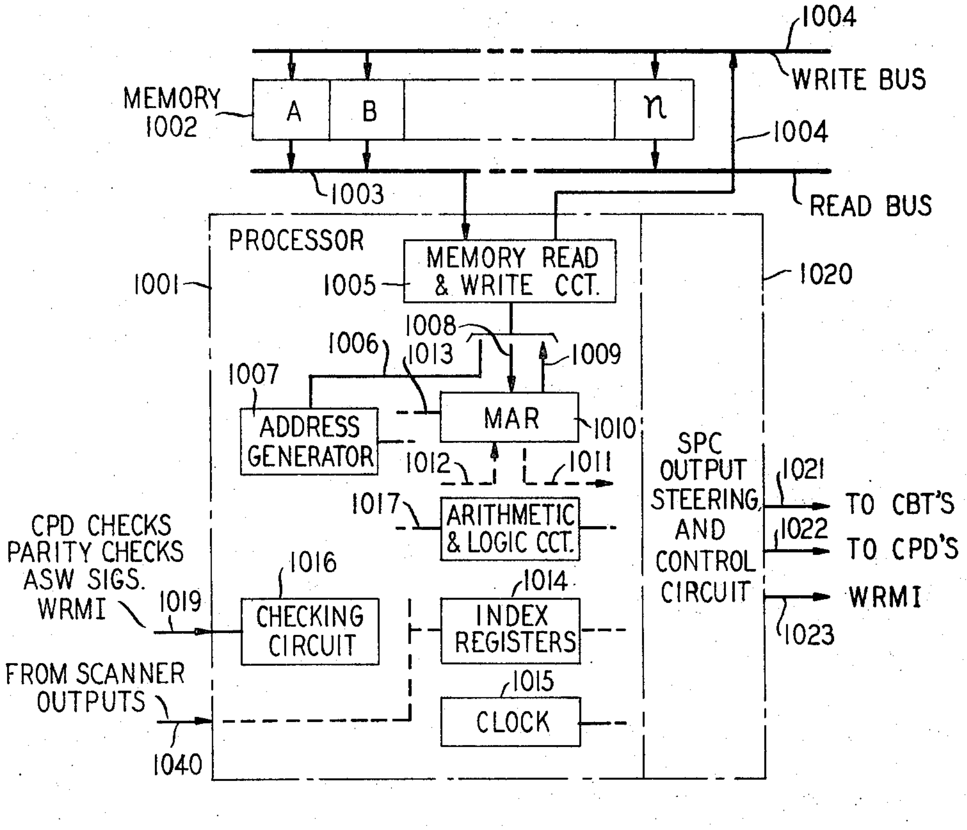
Figure 12:
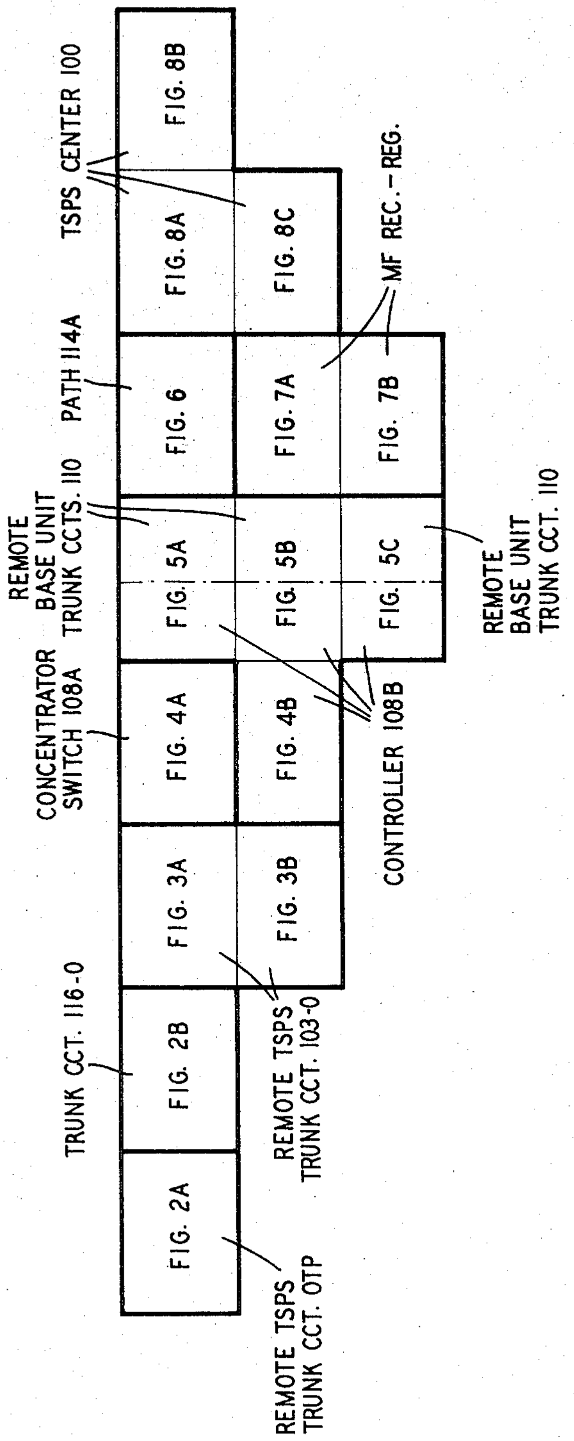
Figure 11:
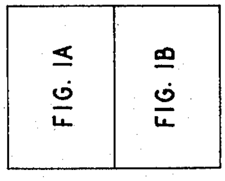

Further details of the present invention are shown on FIGS. 2 through 8 where arranged with respect to each other as shown in FIG. 12. FIG. 12 also indicates the correspondence between the various equipments on FIG. 1 and their counterparts on FIGS. 2 through 8. FIGS. 2A and 2B discloses the outpulser portion of RTSPS trunk circuit 103–O; FIGS. 3A and 3B discloses the remaining details of trunk circuit 103–O; FIG. 4A discloses the concentrator switch; FIG. 4B and the left half of FIGS. 5A and 5B, together with the entirety of FIG. 5C disclose the controller 108B; the right-hand portion of FIGS. 5A and 5B disclose the remote base unit trunk circuits 110; FIG. 6 discloses the equipment that comprises path 114A interconnecting the remote service 113A with TSPS Center 100; FIGS. 7A and 7B disclose the MF receiver 108C; FIGS. 8A, 8B and 8C together disclose the TSPS Center 100 while FIGS. 9 and 10 diagrammatically disclose further details of the equipment comprising the TSPS controller shown on element 105 on FIGS. 1.

Figure 13:
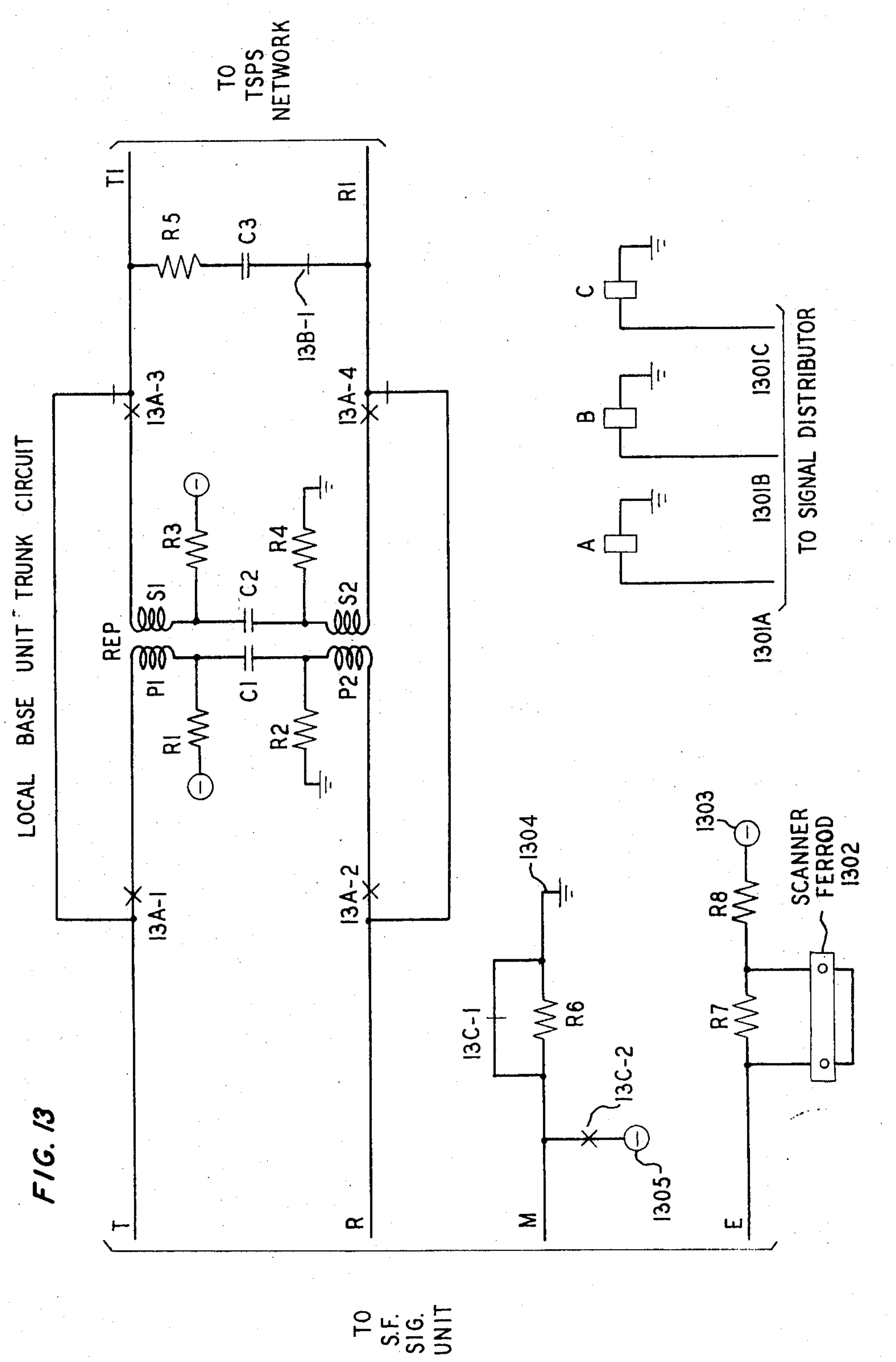

In this portion of the specification, the operation of the concentrator switch 108A and the controller 108B is described in detail. This is followed by a detailed description of the TSPS Center of FIGS. 8A through 8C. The remainder of the circuitry of FIGS. 2 through 8 is then described in connection with the serving of a typical call. The concentrator switch and the TSPS center are described first in order to facilitate an understanding of how the overall system serves a typical call. FIG. 13 shows in detail the local TSPS center base unit trunk circuit used to convert the center with the remote base unit trunk circuit shown in FIGS. 5A, 5B, and 5C.

DRAWING SYMBOLS

Relay contacts are shown detached from their windings on the drawing. Contacts which are closed when a relay is operated (make contacts) are represented by an X crossing the lines representing the connecting conductors; contacts which are opened when a relay is operated (break contacts) are represented by a short line intersecting the connecting conductors. The winding of each relay is designated either alphabetically or alphanumerically, such as for example, relay TK9 on FIG. 5A. The contacts associated with a relay are designated with a numerical prefix signifying the drawing figure on which the controlling winding appears, followed by the drawing designation of the relay winding, followed by a numerical suffix which identifies a particular contact on a relay having many contacts. Thus, make contacts 9 of relay TK9 are designated 5TKP9–9. The prefix 5 indicates the relay winding is on FIG. 5; the suffix –9 identifies the contacts of the relay from others on the same relay. This method of designation facilitates an identification of the controlling winding for each set of contacts since the winding may or may not be on the same drawing figure. Also the prefix indicating the drawing figure on which a winding is located eliminates the necessity of separately specifying a figure number each time a relay winding is discussed.

CONCENTRATOR SWITCH DESCRIPTION

The function of concentrator switch 108 is to connect a RTSPS trunk circuit with a remote base unit trunk circuit and, in turn, with a path extending to the TSPS Center. Such a connection may be initiated either by the RTSPS trunk circuit or by the remote base unit trunk circuit. An RTSPS trunk circuit makes the request when it determines that a new or an existing call requires a connection to the TSPS center. A remote base unit trunk circuit initiates a connection under control of the TSPS Center when the TSPS Center determines that a connection is required to the outgoing end of a particular RTSPS trunk circuit or when an operator requires a connection with the calling party over the incoming end of the trunk.

Figure 3A:
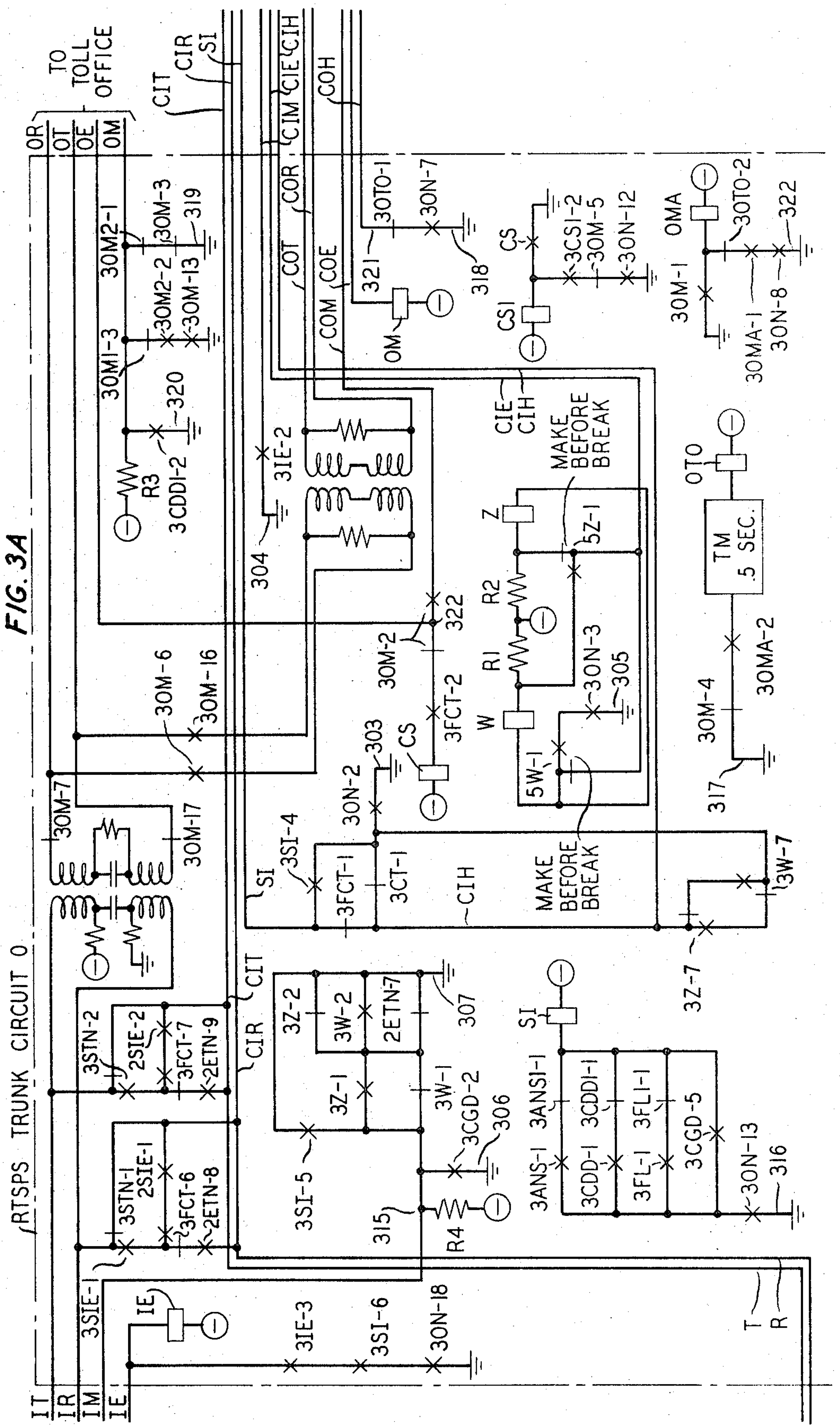

Each switch horizontal is individual to a different remote base unit trunk circuit, each RTSPS trunk circuit is connected to a pair of switch verticals. One vertical of a pair is connected to the incoming portion of its trunk circuit, the other vertical of the pair is connected to the outgoing portion of its trunk circuit. With reference to FIGS. 4A, the top row of the switch (horizontal 9) is connected to base unit trunk circuit 9 (FIG. 5A), the leftmost pair of verticals, (verticals V0 and V1) are connected to the incoming and outgoing portions of the RTSPS trunk circuit of FIGS. 2 and 3. This disclosure assumes 10 crossbar switches with their horizontals and select magnets multipled. This provides 200 verticals which may serve as many as 100 RTSPS trunk circuits.

On FIG. 5A a select magnet (SEL– ) is associated with each level; on FIG. 4B a hold magnet (H– ) is associated with each vertical. The closure of a particular set of crosspoint contacts is effected by first operating the select magnet of the associated row and by then operating the hold magnet of the associated column. The select magnet may then be released and the crosspoint contacts will remain closed as long as the hold magnet remains operated. Crossbar switches are well known and therefore no further discussion concerning them is necessary The connections between the RTSPS trunk circuit on FIGS. 3 and its two switch verticals (VO and V1) are shown in detail. The conductors connected to vertical VO are designated CIT, CIR, SI, CIM, CIE, and CIH and they extend to the incoming portion of the trunk circuit. The conductors connected to vertical VI are designated COT, COR, SO, COM, COE, and COH, and they extend to the outgoing portion of the trunk circuit. The connections between the remaining switch verticals and other RTSPS trunk circuits are shown only diagrammatically.

The hold magnets and their control circuitry are shown on FIG. 4B. This circuitry includes the series of relays SLO through SL199 each of which is associated with one of hold magnets HO through H199. The numerical suffix portion of the designation of each SL– relay and each hold magnet indicates the switch vertical with which each is associated, i.e., SLO and HO for vertical VO.

Two conductors of each switch vertical extend to the control circuitry of FIG. 4B. The SI conductor of vertical VO extends via contacts 4HO–1 of hold magnet HO to relay SLO; conductor CIH extends to contact 4HO–2 of hold magnet HO. For vertical V1, trunk conductor SO extends via hold magnet H1 contacts 4H1–1 to relay SL1; conductor COH extends to contacts 4H1–2 of hold magnet H1.

On FIGS. 5A and 5B there are 10 remote base unit trunk circuits (O–9) and each is connected to the conductors of a different switch horizontal. FIGS. 5A and 5B also contain the 10 switch select magnets (SELO through SEL9) and a series of TK– relays designated TKO through TK9. These relays control the operation of the select magnets on the switch connections requested by the RTSPS trunk circuits.

The TK– series of relays, the SM relay together with the W and Z relays of FIG. 5C provide a means for preselecting the remote base unit trunk circuit that will be used on the next connection requested by a RTSPS trunk circuit to the TSPS center. The select magnet of the switch horizontal that is to be used for the next connection is operated and is held operated by the TK– relays until the next connection is established upon the operation of the requesting RTSPS trunk circuit. At that time, the select magnet releases and the selection circuit comprising the TK relays preselects the next switch horizontal and remote base unit trunk circuit in the same manner by operating and holding its select magnet until the next RTSPS trunk circuit request is received.

The following paragraphs describe the details of the preselection circuit. The path over which a select magnet is operated to preselect a remote base unit trunk begins with the terminal 501 (FIG. 5C) ground on contacts 5SM–2 and 5SM–3 of relay SM. This relay is normal whenever a preselection is to be made. This ground is extended through break contacts 7TCS–1 and 7TCS–2 and then through either break contacts 5Z–1 or make contacts 5Z–2 to terminals 518 (FIG. 5B) or 517 (FIG. 5A). Relays W and Z on FIG. 5C constitute what is commonly known as a "WZ" combination. This circuit operates as a count of two divider to operate and release relay Z once for every two pulses supplied by a ground on make contacts 5SM–4 from terminal 502.

The WZ circuit works in the following manner: assume both relays to be normal; the first ground from contacts 5SM-4 is extended through break contacts 5W-1, through the winding of relay W, through resistor R7 to negative battery. The closure of this path operates relay W. Relay Z does not operate at this time because ground from the make contacts 5SM-4 is also extended through break contacts 5Z-3 to short circuit relay Z's winding. This short circuit is removed when make contacts 5SM-4 release. Relay Z operates at that time from the ground on make contacts 5W-1. The next time ground is applied by the closure of contacts 5SM-4, relay W is short circuited and releases from the ground extended through make contacts 5Z-3. Relay Z then remains operated as long as relay SM remains operated. Relay Z releases upon the release of relay SM and restores this "WZ" relay combination to normal.

Each of relays TKO through TK9 on FIGS. 5A and 5B is connected to the (S) sleeve lead of its associated switch horizontal. At any given time, each TK- relay that is currently involved on a connection between a remote TSPS trunk circuit and a remote base unit trunk circuit is held operated by a ground from the connected remote TSPS trunk circuit. This ground is supplied by the SI or SO lead of the trunk circuit depending upon whether the connection is to its incoming or its outgoing end.

Let it be assumed that a base unit trunk circuit preselection is to be made, that all base unit trunk circuits are idle and that relay Z on FIG. 5 is normal. In this case the terminal 501 ground on break contacts 5SM-2 is extended through break contacts 7TCS-1 and 5Z-1, to terminal 517, through break contacts 5TK9-2 and 5TKP9-9 to the winding of select magnet SEL9 to operate it. In operating, the select magnet extends its operating ground through its make contact, through resistor R9 to the winding of relay SM (FIG. 5) to operate it. The operation of relay SM opens its contacts 5SM-2 and 5SM-3 on FIG. 5C to remove the direct ground from the winding of select magnet SEL9. At this time, resistor R3 shunts break contacts 5SM-2 and supplies a holding ground for the select magnet so that it will remain operated, but yet will not overheat in the event that it is held operated for a prolonged period of time.

The operation of relay SM opens its break contacts 5SM-1 on FIG. 5C to remove the terminal 504 ground that is supplied to the sleeve leads of all idle switch vertical whenever relay SM is released. This ground makes the concentrator switch appear busy during the interval of time required for the base unit trunk circuit preselection operation to be performed as indicated by the release of relay SM. This ground is supplied from terminal 504, through break contacts 5SM-1, over conductor BAT to FIG. 4B where it is extended to break contact 4SLO-3, through the winding of relay SLO, through break contacts 4HO-17 of hold magnet HO, to the sleeve conductor SI extending to the incoming end of RTSPS trunk circuit O. This same ground is also extended through a chain circuit comprising break contacts 4 on each relay SLO through SL199 and from there in a similar fashion, through the windings of these relays, through the break contact of each unoperated hold magnet, to place a ground on the RTSPS trunk circuit sleeve lead associated with each hold magnet. These sleeve lead grounds prevent the RTSPS trunk circuit with which each lead is associated from seizing the concentrator switch at this time, i.e., when relay SM is released.

The operation of relay SM upon the completion of the preselection operation closes its contacts 5SM-4 to apply a ground to the input of the WZ relay circuit which proceeds with its counting action, as described, so that upon the next release of relay SM, relay Z will operate and shift the base unit trunk preselection preference circuit in the manner hereinafter described.

Select magnet SEL9 is now operated as a preselection of remote base unit trunk circuit 9 to serve the next request by a RTSPS trunk circuit for a connection to the TSPS center. Let it be assumed that the next request is made by the RTSPS trunk circuit shown on FIGS. 3A and 3B. Let it be assumed further that this request is from the incoming end of the trunk circuit. This request is manifested by a ground on the sleeve lead SI. This ground is extended through break contacts 4HO-1 of hold magnet HO, through the winding of the relay SLO, through break contacts 4SLO-3, over conductor BAT extending from FIG. 4B to FIG. 5C, break contacts 5B-1, resistor R5 to a negative battery on terminal 505. Relay SLO operates over this path. If the connection request had arrived on conductor SI for trunk 99, relay SL198 would have operated over a path similar to that already described except that the path would additionally include break contacts 4 on all of relays SK198 through SL0.

The closure of make contacts 4SLO-4 applies a ground to the other sleeve leads of the switch through the series circuit comprising the break contacts 4 of the remaining SL- relays. This same ground is applied to conductor AL extending from FIG. 4B to FIG. 5C, and through break contacts 5B-3 to the winding of relay AL. This path tends to release relay AL which has a ground on its other side of its winding. This relay is of the slow release type and does not immediately release. Normally the relay is held operated over this same path via the break contacts 4 of the SL- relays to the battery on the BAT lead supplied by the contacts 5B-1. However, the operation of relay SLO removes this battery and now applies a ground to the AL relay. Relay AL is normally held up over the path already described above or alternatively over an obvious path via make contacts 5B-3 when relay B operates. As will be subsequently appreciated, an operated SL- relay normally remains operated only momentarily. If a trouble condition causes relay SLO to remain operated for a prolonged period of time, slow release relay AL releases and actuates alarm 506.

The operation of relay SLO closes its make contacts 4SLO-3 to provide a battery via resistor R1 to hold up relay SLO when the right side of its winding is disconnected by break contacts 4SLO-3 from the battery potential on conductor BAT. The closure of make contacts 2 of any SL- relay other than SLO extends a ground through break contacts of all the preceding SL- relays in the chain and to place a ground on the SI and SO sleeve leads of all RTSPS trunk circuits. This prevents them from attempting to extend a connection through the concentrator switch for the time being. Make contacts 4 perform this function for relay SLO. (If an intermediate SL- relay were operated this contact would prevent succeeding SL- relays from operating.). The closure of make contacts 4SLO-1 extends a ground to operate hold magnet HO. The operation of make hold magnet contacts 4HO-1 extends the ground on conductor SI to the right hand winding terminal of the hold magnet HO to maintain it operated. The opening of break contacts 4HO-1 releases relay SLO.

The operation of hold magnet HO closes the crosspoints common to switch vertical O and switch horizontal 9 since select magnet 9 remains held operated as already described. The closure of this crosspoint effectively interconnects the incoming side of RTSPS trunk circuit O with base unit trunk circuit 9. This interconnection extends the ground on incoming sleeve lead SI to the S sleeve lead of base unit trunk circuit 9. The ground on the S lead operates relay TK9 and holds it operated for the duration of the interconnection between RTSPS circuit O and base unit trunk circuit 9. The operation of relay TK9 opens its break contacts 5TK9-2 to remove the ground holding select magnet 9 operated which causes it to release. The release of the select magnet breaks the path holding relay 5-SM operated and releases it.

The release of relay SM removes the ground from the input of the WZ relay combination. This causes relay Z to operate as the shunting ground is removed from the left hand terminal of resistor R6. A ground is now applied through break contacts 5SM-3, break contacts 7TCS-2, make contacts 5Z-2, to terminal 518 and contacts 5TKO-1. These contacts together with the corresponding contacts of the other TK- relays form a preference chain. If base unit trunk circuit O is idle at this time, relay TKO is normal and the ground on terminal 518 is extended through contacts 5TKO-1 and 5TKPO-9 to operate select magnet O to preselect base unit trunk circuit O for the next connection requested by a RTSPS trunk circuit. The operation of select magnet O closes a path over its make contacts to operate relay SM in a manner similar to that already described.

The next connection requested by a remote trunk circuit will operate its associated relay in the series of relays SL1 through SL199 which in turn will operate its associated hold magnet to interconnect the requesting trunk circuit with base unit trunk circuit O in a manner similar to that already described.

Relay B on FIG. 5C operates when all remote base unit trunk circuits are busy. This state of the system occurs with the operation of all of relays TKO through TK9. The path to operate B under such conditions comprises its relay winding, conductor B extending from FIG. 5C to FIG. 5B, make contacts 2 of all the TK- relays in series beginning with relay TKO, break contacts 5Z-1, 7TCS-1, and 5SM-2 to the terminal 501 ground. Alternatively, the path to operate relay B may comprise the same path beginning with conductor B, make contacts 1 of all the TK- relays in series beginning with relay TK9, make contacts 5Z-2, break contacts 7TCS-2, break contacts 5SM-3 to the terminal 501 ground. Relay B operates and supplies ground through its make contacts 5B-1 to conductor BAT which by means of break contacts 3 and 4 on the SL- relays supplies ground to the incoming (SI) and outgoing (OS) sleeve leads of the RTSPS trunk circuits in a manner similar to that already described in connection with break contacts 5SM-1. Contacts 5B-2 operated apply a ground to operate the traffic register to indicate an all trunk busy condition. Make contacts 5B-3 close a battery through resistance R4 to hold relay AL operated to prevent the trouble alarm from being sounded. This circuit is necessary for holding up the AL relay at this time since the operation of relay B opens its break contacts 5B-3 and removes the resistor R5 battery that normally holds relay AL operated.

The foregoing has described the operation of the select magnet preselection circuit and in particular the manner in which the TK- relays and relay SM cooperate to perform this function. This select magnet preselection circuit is only used on connection requests by the RTSPS trunk circuits. This circuit is bypassed on connections initiated by the TSPS center. On these, the TSPS center seizes an idle remote base unit trunk circuit and, as a result, the select magnet for the seized trunk circuit must be operated to complete the connection.

DESCRIPTION OF TSPS CENTER — FIGS. 8A, 8B AND 8C

Figure 8A:
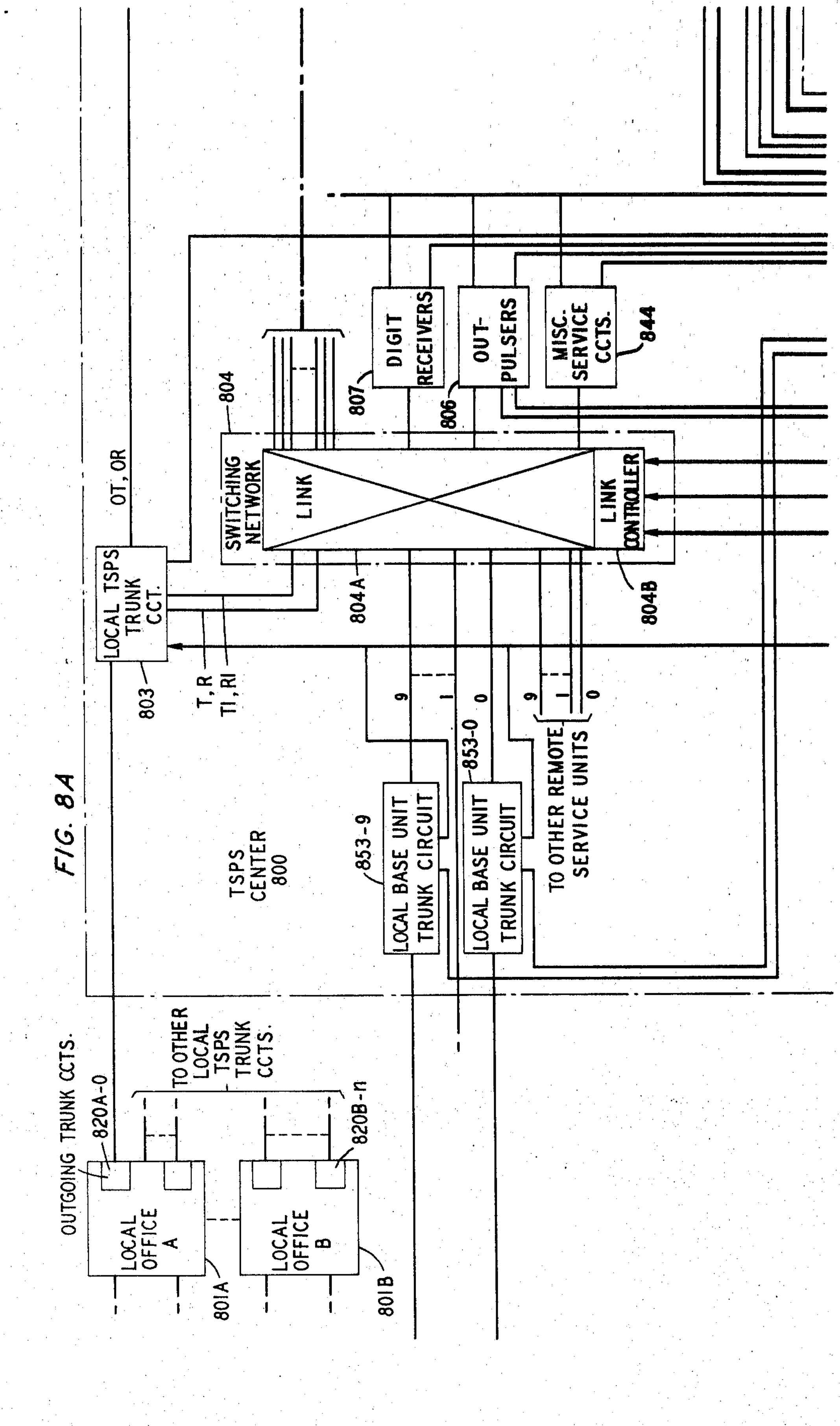
Figure 8B:
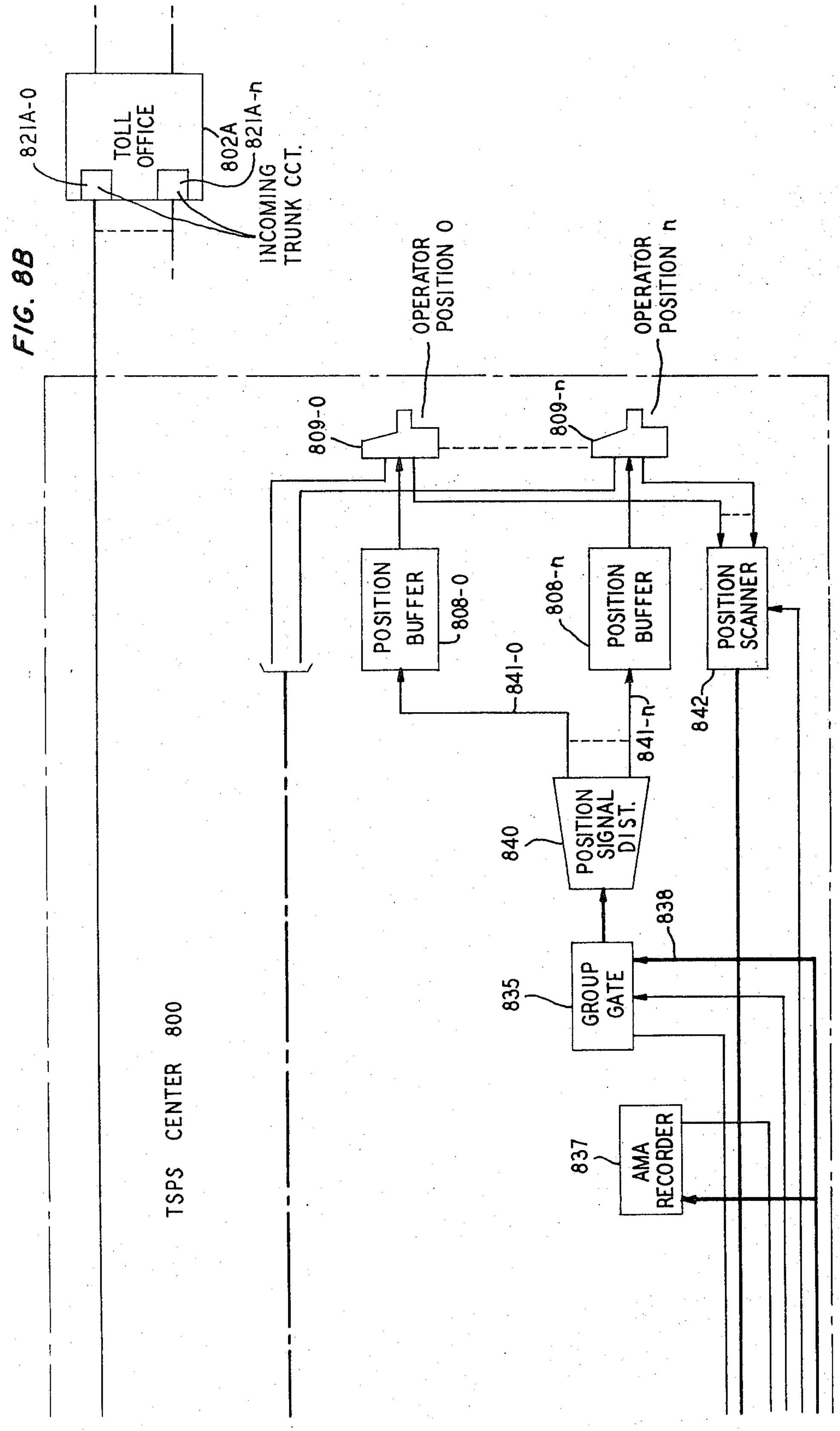
Figure 8C:
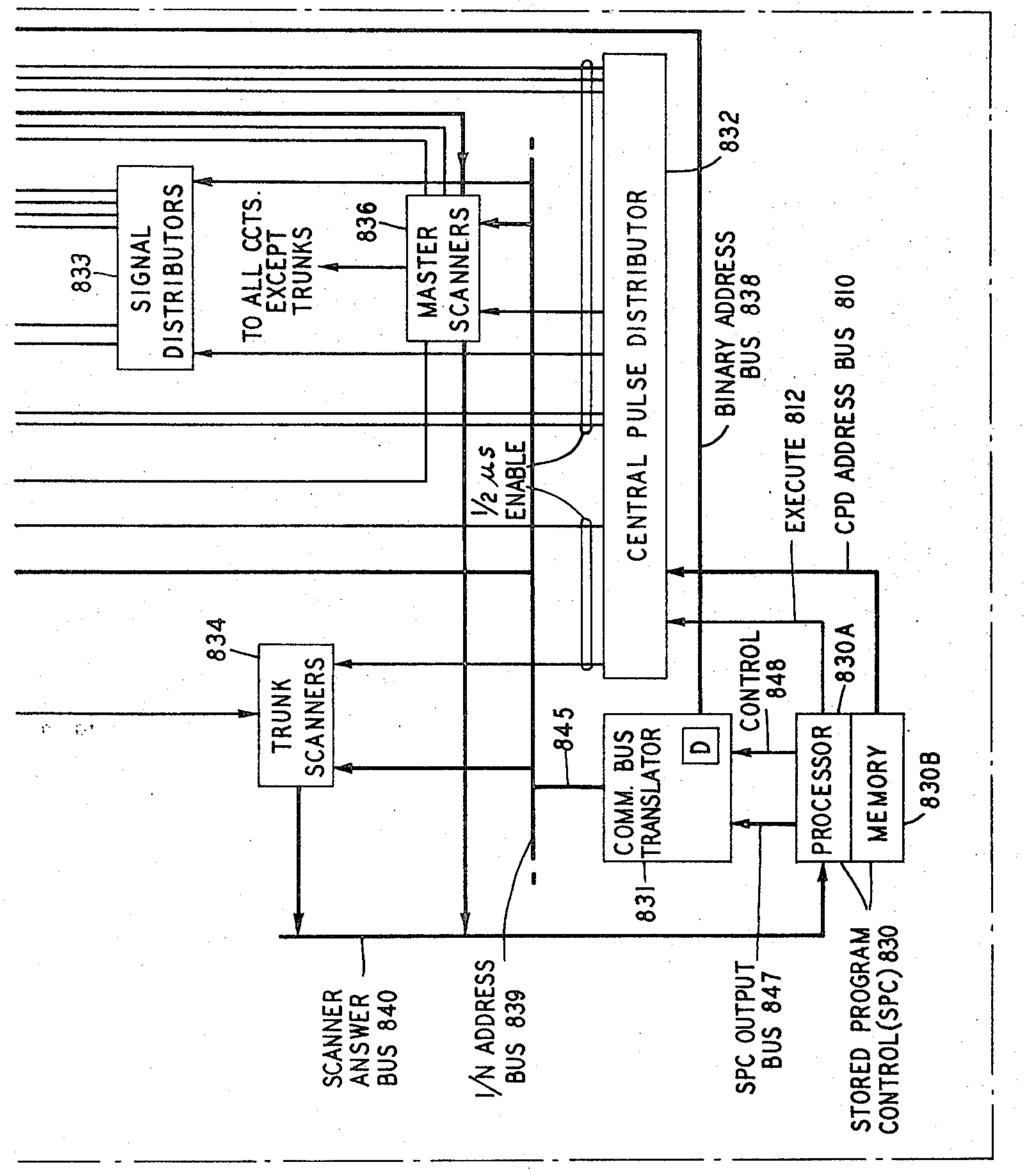

FIGS. 8A, 8B and 8C diagrammatically disclose the TSPS system shown in the aforementioned Jaeger et al. specification. On FIGS. 8, the TSPS Center is shown arranged to serve calls in the manner described in the Jaeger patent as well as the manner provided by my invention. Specifically, the Jaeger TSPS equipment serves customer dialed person-to-person type calls by means of TSPS trunk circuits which are positioned intermediate a local and a toll office but are physically situated nearby or adjacent to the remaining TSPS equipment that comprises a TSPS Center. In order to distinguish the TSPS trunk circuits of the Jaeger invention from the remote TSPS trunk circuits of my invention, the Jaeger trunk circuits are hereinafter referred to as local TSPS trunk circuits.

Shown on FIGS. 8, is a TSPS Center 800 connected between local offices such as 801A, 801B, and toll office 802A. The TSPS equipment provides the services required above and beyond a connection to the called station on customer dialed person-to-person and other special types of calls originating in local offices 801A and 801B and extended to the toll office 802A.

The TSPS Center contains a plurality of local TSPS trunk circuits 803 of which only one is shown. Each such trunk circuit is connected on its incoming side to a corresponding one of the local office outgoing trunk circuits 820A-0 through **820B-*n* and on its outgoing side to a corresponding one of the toll office incoming trunk circuits 821A-0 through 821A-*n*. Each local office outgoing trunk circuit is individual to a different local TSPS trunk circuit 803** and in turn to a different one of the toll office incoming trunk circuits. Each call from a local office is extended via a selected outgoing trunk circuit to its associated local TSPS trunk circuit and in turn to its associated incoming toll trunk circuit.

The TSPS Center includes a switching network 804, which is connected on its left side to local TSPS trunk circuits 803, on its right side to various other circuits, such as outpulsers 806, digit receivers 807, operator positions 809, and miscellaneous other circuits which, for the purposes of this figure, are represented generally as miscellaneous service circuits 844. Switching network 804 includes link 804A, which contains the circuit paths required to interconnect the circuits having left side network appearances with those having right side appearances. The network 804 further includes network controller 804B, which controls the operation of the link in its path-establishing function.

Each local TSPS trunk circuit 803 is connected by means of two separate conductor pairs to two separate appearances on the left side of link 804A. The T and R pair connects the incoming side of the trunk circuit to the link. This permits the circuits on the right side of the link to communicate with the local office. The T1 and R1 conductor pair connects the outgoing end of the trunk circuits to the link. This permits the circuits on the right side of the link, such as for example, outpulsers, to communicate with the toll office.

Digit receivers 807 receive call information outpulsed from a local office. These receivers may be of different types, such as for example, DP or MF, depending upon the mode of outpulsing utilized. Outpulsers 806 transmit to the toll office the information it needs on each call.

The TSPS Center furnishes the call services required of it simultaneously with the extension of the connection to the toll office. This service may include the attachment of an operator position 809 to the calling local TSPS trunk circuit, via the link, if operator assistance is required. The operator position is disconnected from the call when the required assistance has been furnished. The calling and called stations remain connected via the local TSPS trunk circuit for the call duration. The system monitors and times the call and, upon its termination, causes recorder 837 to perform a charge data recording operation.

Each operator position contains a plurality of keys which may be selectively depressed to generate call information when the position is temporarily bridged onto a call connection. In addition to the signals received from the operator positions, the system receives supervisory signals from the local TSPS trunk circuits 803, and it further receives internally generated signals indicating the current state of the various elements of the system. All of these signals are used by the system in its call serving activities.

The circuits that control or assist in controlling the TSPS System include stored program control 830, hereinafter referred to as SPC, communications bus translator (CBT) 831, central pulse distributor (CPD) 832, signal distributor 833, trunk scanners 834, master scanners 836, group gate 835, and position signal distributor 840. The system of the invention shown in FIGS. 8 comprises an electronic stored program controlled system which utilizes many circuits similar to those shown in detail in the copending application to R. W. Downing et al., Ser. No. 334,875, filed Dec. 31, 1963. Downing et al. discloses an electronic type local office which is controlled in its operation by a real time stored program processor. The Downing et al. system is also disclosed in detail in the entirety of the September 1964 issue of the *Bell System Technical Journal.*

The SPC may be considered to be the "brain" or basic controlling mechanism for the entire TSPS Center. It comprises a stored program real time machine having a processor 830A and a memory 830B. The processor performs arithmetical and logical operations on the data it receives from the memory, as well as on the data it receives from circuits external to the SPC, such as for example, from the scanners. As described in Downing et al., as well as in Jaeger et al., the SPC receives signals from its memory and from the scanners, performs arithmetical and logical operations in response to the received signals, and generates output commands which are transmitted to other circuits to control them in the performance of their required call functions. The circuits which respond to the SPC output commands are referred to as "peripheral circuits" since they are peripheral, or external, to the SPC.

The SPC communicates with the peripheral circuits by means of communication paths referred to in this specification as "busses." The busses which transmit the SPC commands to the various peripheral circuits are the 1-out-of-N address bus 839 and the binary address bus 838. The SPC transmits its output commands in binary form directly to the communication bus translator (CBT) 831 over paths 847 and 848. The CBT supplies the binary information to the binary address bus system. The CBT also translates the SPC binary output into a plurality of 1-out-of-N information bits and applies these to the 1-out-of-N address bus system. Thus, for each binary command received, the CBT applies a corresponding binary command to the binary address bus and, in turn, to the peripheral circuits served by this bus. Simultaneously, a 1-out-of-N type command is applied to the 1-out-of-N address bus and to the peripheral circuits it serves.

The trunk scanner monitors the current state of each trunk circuit and, upon command, reports its findings to the SPC. The trunk scanner is connected to a plurality of circuit points within each trunk circuit and each such circuit point in turn, is individually connected to a different sensing device, termed a "ferrod" in the scanner: Each ferrod has a plurality of windings, one of which is connected across its associated trunk circuit point so that the magnetic state of the ferrod is controlled by the current applied to its winding by the trunk circuit point to which it is connected. The other windings of each ferrod are wired so that the scanner may be selectively controlled by the SPC to provide an indication of the existing state of each circuit. The master scanners are similar to the trunk circuit scanners except that they monitor the operational states of circuits other than trunk circuits. These include the service circuits, the digit receivers, and coin control circuits connected to the right side of the position link. Ferrods are further described, inter alia, in the Baldwin-May U.S. Pat. No. 3,175,042 of Mar. 23, 1965.

The scanner ferrods are arranged into rows. Each command received by a scanner specifies a ferrod row that is to be interrogated. The information resulting from the interrogation is transmitted to the SPC over bus system 840 designated "scanner answer bus." With this arrangement, the transmission of a command to the scanner instructing it to interrogate a particular row of ferrods, causes information to be transmitted back to the SPC signifying the current state of all circuit points within the system to which the plurality of ferrods in the interrogated row are connected. The signal distributor 833, comprises a translator whose function is to receive the microsecond type signals from the central pulse distribution 832 (CPD) and the 1/N address bus and, in turn, transform them into signals having the persistence required to operate and release magnetic latching relays and the circuits which utilize relays. These relays are primarily contained in the trunk circuits and in the service circuits. Signal distributors are further described in the aforementioned issue of the *Bell System Technical Journal*, as well as in the Jaeger et al. specification.

The switching network 804 operates in response to the reception of the coincidently received signals from the CPD and the 1/N address bus system. These commands cause them to establish link connections between their left side and right side appearances. The paths by which these connections are to be established are not determined by the links but, instead, by the SPC in response to the information it receives from its memory. Switching networks of the type suitable for use with the present invention are disclosed in detail in the aforementioned issue of the *Bell System Technical Journal*, as well as in the patents cited in the Jaeger et al. specification.

The function of group gate 835 is to control the operation of the position signal distributor 840 in response to commands received from the binary address bus 838. These commands represent lamp information that is to be transmitted to a particular operator position to assist the operator in serving a call currently at her position. The position signal distributor is similar to the signal distributor 833 in that it comprises a translator which receives the group gate output signals and translates them into signals having the persistence required to operate or release magnetic latching relays in the position buffer circuits 808. Each position buffer circuit contains the relays required to control the lamp displays at its associated operator position.

Position scanner 842 transmits key signal information from the positions via the master scanner to the SPC. Each position circuit contains a plurality of keys which may be depressed by an operator to generate call information or service requests. This information may comprise numerical data, such as calling and called numbers; it may comprise call charge data signifying the type of service requested by the calling party; and it may also comprise call status information, such as for example, signals requesting the disconnection of the operator position from the call. Position scanner 142 is connected to each key in each position and, by virtue of these interconnections, it continually monitors the state of each key. In response to the depression of any key at any position, it transmits signals back to the SPC, via the master scanner, signifying the key that is depressed as well as the position in which the key is located. The position scanner is shown in detail in the Jaeger et al specification, as well as in the G. Riddell application, Ser. No. 537,224, filed Mar. 24, 1966, now U.S. Pat. No. 3,529,090.

The SPC performs its function of controlling the system operation on each call in response to the signals it receives from the various scanners. From the trunk scanners 834, the SPC receives information including supervisory signals indicating the on-or off-hook status of the calling and called stations. From the master scanner 836 the SPC receives the operator key action signal information as well as information regarding the status of many circuits of the system including the link, the service circuits, outpulsers and digit receivers. The SPC also uses signals that are internally generated by it as it operates under control of its memory as well as to the signals received from the scanners. The SPC receives signals from these various sources, and utilizes them to perform its required function of controlling the call serving activities of the system in an ordered manner.

STORED PROGRAM CONTROLLER (SPC) — FIGS. 9 AND 10

The SPC, shown as element 830 on FIGS. 8, is a stored program machine having a processor 830A and a memory 830B. The memory stores both program instructions and data. All instructions, and some data, are stored on a relatively permanent basis and are changed only infrequently. Other of the data is relatively temporary in nature, and it may be entered into memory, modified and erased during the serving of a call. The program instructions provide the intelligence necessary to instruct the processor in the many functions required of it under any of the many call situations it may encounter. The processor monitors and controls peripheral equipment by performing logical and/or arithmetic operations on data temporarily stored in registers within it, under control of the program instructions, and by transmitting to the peripheral equipment output information or commands generated while performing these operations. Although the processor may perform many different functions, it is capable of executing only one instruction at a time under control of the memory.

The SPC either directly or indirectly controls the operation of every circuit in the system. All commands specifying an operation in another circuit originate within the SPC and all answers signifying the existing operational state of many circuit points within the system are returned to the SPC. Certain instructions result in actions which are entirely confined within the SPC. For example, an instruction on series of instructions may command the SPC to perform logical and/or arithmetic operations on the data currently contained within it. Other instructions may cause the SPC to command a peripheral circuit to perform an operation which results in an answer being sent to the scanner to read or interrogate a specific row of ferrods. The results of the interrogation are transmitted over the scanner answer bus back to the SPC, where the information is stored temporarily either in memory or in index registers within the processor until it can be later utilized.

The SPC communicates primarily with the communication bus translator (CBT), central bus distributors (CDT) and the scanners. The output signals of the SPC are commonly referred to as "commands" since they cause the circuit receiving them to perform the operation specified by the command. The commands transmitted to the CBT's are applied over circuit paths 847 and 848 and they instruct the CBT's to apply their own output commands to the address busses which, in turn, transmit them to the peripheral circuits to which they are connected. The SPC output commands are received by the CPD's to unlock the receiving portion of a specified peripheral circuit in order that it, and only it, may receive and register the command currently on the address bus to which the specified peripheral circuit is connected.

The scanner answer signals are transmitted over the scanner answer bus 840 back to the SPC. The information represented by these signals signifies the current state of the many circuit points within the system. Each such circuit point is associated with an individual ferrod in the scanner and the plurality of ferrods within a scanner are divided into rows.

FIG. 9 discloses in greater detail the relationship between an SPC 900 and the circuits with which it communicates. The processor 908 retrieves either data or instructions from memory 907 by a read operation and it enters information into memory by means of a write operation. The input bus for memory 907 is element 901 the output bus is element 902. FIG. 9 also discloses CBT 919, CBD 920, and a plurality of scanners which are represented generally as element 921. The processor transmits commands to the CBT over bus 910 and to the CPD over 911. It receives information from the scanners over bus 940 and from the CBT and CPD over bus 926.

Additional details of the SPC are shown on FIG. 10. This figure discloses a processor 1001, a memory 1002, the circuit paths interconnecting these two elements, as well as the circuit paths interconnecting the processor with circuits external to the SPC.

Memory 1002 is functionally subdivided into a plurality of portions designated A, B . . . *n*, each of which stores the program and data required to enable the SPC to perform the many separate functions required for the operation of the system. The Memory Read and Write Control Circuit 1005 within the processor controls the operations required to read data and instructions out of and enter data into memory. The information to be written into memory is applied to it over bus 1004 from the output of circuit 1005. Similarly, the information that is read from memory is applied by means of bus 1003 to circuit 1005. Each portion of memory is represented by an address, as is typical in stored program machines, and therefore in performing each read and write function, circuit 1005 obtains the address of the pertinent portion of memory from address generator 1007 over path 1006. The memory access register MAR 1010 transmits to circuit 1005 the information that is to be entered into memory on write operations, and on read operations it receives from circuit 1005 the information extracted from memory. The information the MAR 1005 receives from memory on a read operation is transmitted to other elements (not shown) within the processor over path 1011. Similarly, the MAR receives from these other elements the data that is to be entered into memory on a write operation over path 1012.

Since the details of the processor comprise no part of the invention, many of the elements with which the MAR communicates are shown only diagrammatically. However, included in the processor is the circuitry required to operate upon and manipulate the data stored within it so that both logical and arithmetic operations may be performed. This circuit is represented generally by the box entitled Arithmetic and Logic Circuit and shown as element 1017.

The index registers 1014 cooperate with circuit 1017 to perform arithmetic and logical operations upon the data received by the processor both from memory and from circuits external to the SPC. The index registers are also used to receive and register temporarily the scanner answer information. This information is received over path 1040 and when received, it is stored within the index registers until it may be acted upon and then either entered into memory, utilized for other purposes, or discarded. Checking circuit 1016 receives the various check signals, parity signals, etc., which must be received by the SPC in response to the various commands it transmits to other circuits before it proceeds with another command. The output commands generated by the SPC are applied to external circuits by the circuit entitled "SPC output steering and control circuit" and designated as element 1020. Cable 1021 transmits commands from the SPC to the DBT; cable 1022 transmits commands from the SPC to the CPD; and cable 1023 transmits WRMI pulses to the circuits requiring them.

The SPC is shown primarily in diagrammatic form since it details comprise no portion of the present invention and since stored program controllers suitable for use in our invention are disclosed elsewhere. For example, the aforementioned Downing et al. application discloses in complete detail a stored program controller which may be utilized to generate the control signals required to operate the circuits of our invention. The Downing et al. stored program controller is further described in complete detail in the aforementioned Bell System Technical Journal of September 1964, which issue is devoted in its entirety to an electronic switching system and with approximately 50 percent or more of this issue being devoted to details of the stored program controller. Also, if desired, a stored program controller whose processor is shown in the Kettley et al. U.S. Pat. No. 3,370,274 of Feb. 20, 1968 may be utilized.

The processor receives the call signals and information with which our invention is concerned from the scanners and from memory. The scanner information is received over path 1040 and is ultimately entered into one of the index registers. This scanner information may represent supervisory signals, it may represent information from one of the peripheral circuits to which the scanner is connected such as for example, an outpulser or a digit receiver, and it may also represent the key action signals generated at the operator positions.

The signals the processor receives from memory may represent various items of information concerning the current state or change of state of the various items of information concerning the current state or change of state of the calls served by the system. This information is normally generated by the processor and the memory, together in response to the change of state and other signals the processor receives from the scanner. Thus, the processor may receive a supervisory change of state signal from the scanner and, in response to the receipt of this signal, it will cooperate with the memory to determine that the change of state represents an on-hook signal indicating the calling party has abandoned the call and that the forward connection should be released. Similarly, the processor may receive a relatively simple type of operator key signal requesting a release of the forward connection to which the operator is connected. In response to the receipt of this signal, the processor and the memory will together determine whether the connection may be released immediately. If it can, the processor and the memory together will generate the necessary signals that are required for transmission to the peripheral circuits to cause the release of the connection.

The disclosure of the processor on FIGS. 9 and 10 is diagrammatic and general in nature since our invention is not concerned with its specific details, but rather, relates to the manner in which the processor, the memory, and the rest of the elements of the system, cooperate to process the signals and information the processor receives during the performance of its call serving and system controlling function.

The TSPS Center is arranged in accordance with my invention to include a plurality of local base unit trunk circuits 853–0 through 853–9. These circuits are connected on their right side to the TSPS switching network 804. In a manner already described for the local TSPS trunk circuits, they may be connected via the network to digit receivers, outpulsers, service circuits, and operator positions. On the left side, each local base unit trunk circuit is connected to a remote base unit trunk circuit at a remote center by means of a path comprising the SF signalling units 650– and 652– and a transmission facility 651–. Thus, remote base unit trunk circuit 9 on FIG. 5A is connected via its T, R, M, and E, conductors to the SF signaling unit 650–9. This unit converts the E and M signals to appropriate tones which are transmitted in the same manner as speech signals over the transmission facility 651–9 to the SF signalling unit 652–9. The SF signaling unit 652–9 reconverts the SF tone signals back into E & M lead signals and applies them to local base unit trunk circuit 853–9. This trunk circuit is of the E & M lead type and from these signals it detects the receipt of a call. With the assistance of the SPC, the trunk scanners and the signal distributors, the trunk circuit 853–9 is connected with circuits having appearances on the right-hand side of switching network 804 in the same manner as are local TSPS trunks circuits.

SF signaling units are well known in the art and, therefore, no further description of elements 650– and 652– are believed necessary. Further details of such equipment may be found in the March 1970 issue of the Bell Laboratories Record in an article entitled, "A New Single Frequency Signaling System" by R. N. Batista et al. beginning on p. 85. Further details of SF signaling systems may be found in the November 1960 issue of the Bell System Technical Journal in an article entitled, "Signaling Systems for Control of Telephone Switching" by C. Breen et al.

Figure 1A:
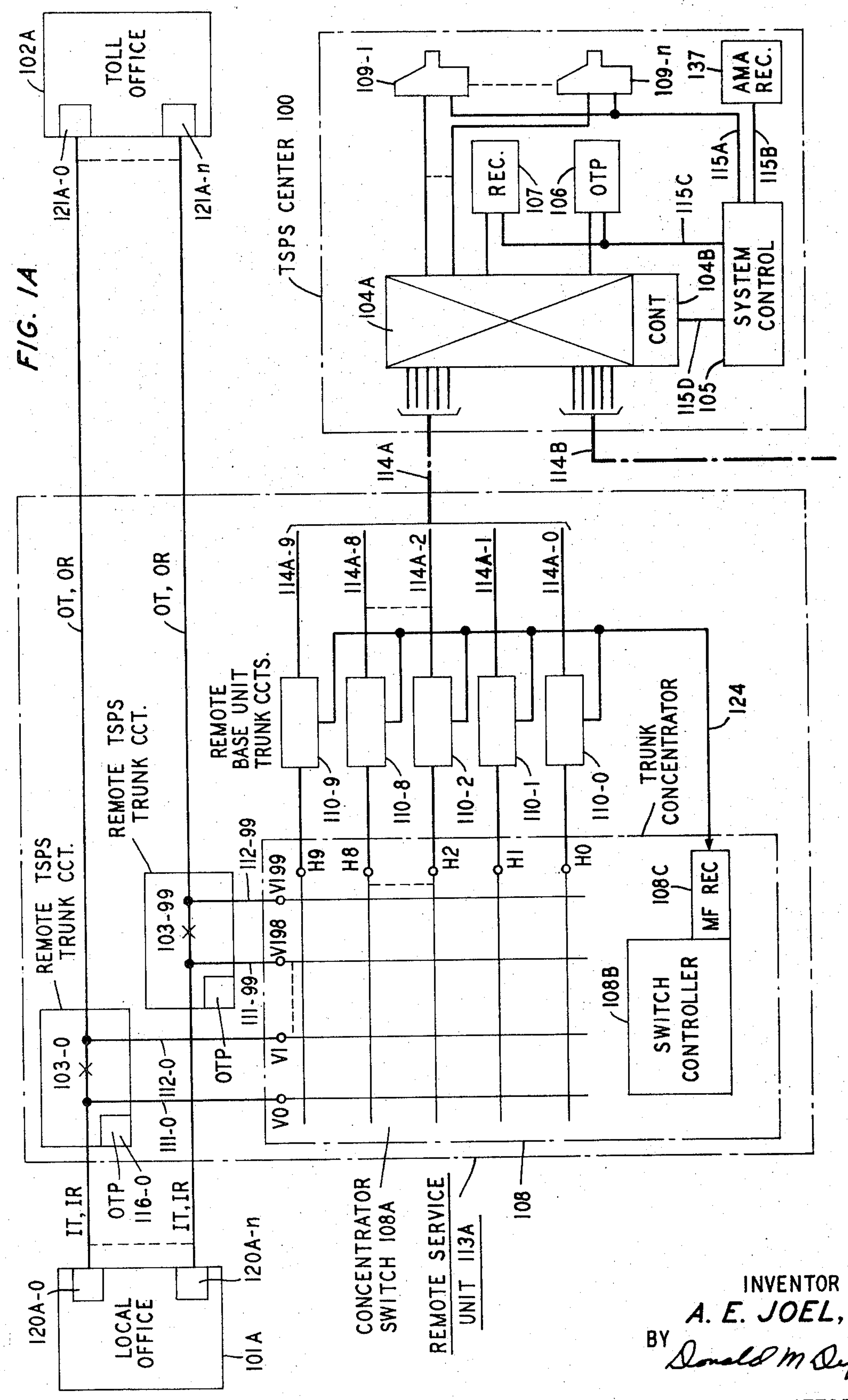
Figure 1B:
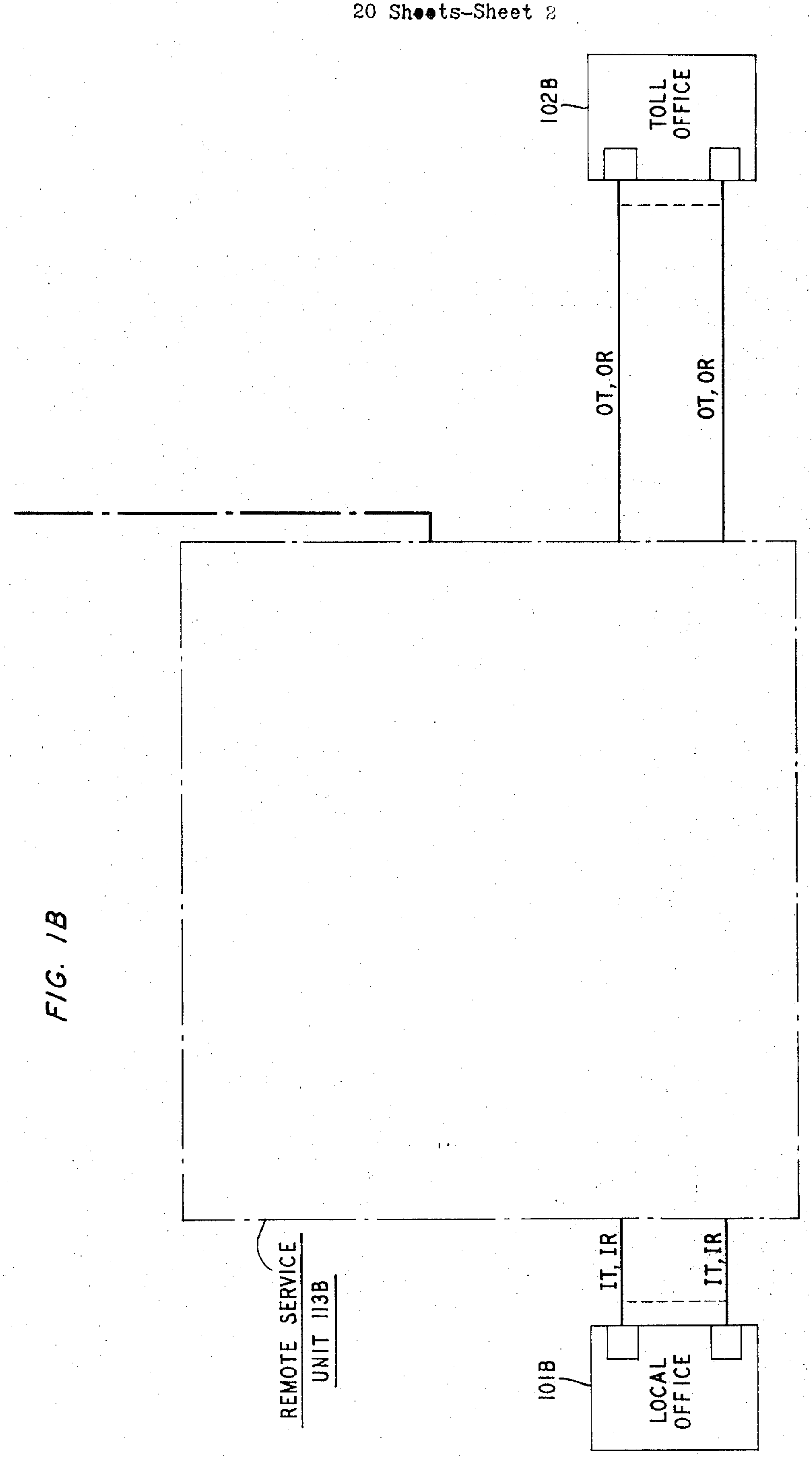

The SF signal units 650–9 and 625–9, the transmission facility 651–9, together with the trunk circuit 853–9 on FIG. 8A comprises the path 114A–9 on FIG. 1A. These elements are not shown in connection with FIG. 1A in order to minimize its complexity. However, they are shown on FIGS. 8 since their function is subsequently described in greater detail in connection with the serving of a typical call.

The left side of network 804 also has appearances for the local base unit trunk circuits extending to other remote locations whose details are not shown on the present drawing figure since they correspond in every respect to those already shown in detail.

DETAILED DESCRIPTION OF THE SERVING OF A TYPICAL CALL SEIZURE BY LOCAL OFFICE

With reference to FIG. 1A, let it be assumed that local office 101A serves a customer dialed person-to-person call that requires a routing to toll office 102A. Let it further be assumed that local office 101A selects its outgoing trunk circuit 120A–0 and extends the call over this trunk circuit and via trunk circuit 103–0 to the toll office. Trunk circuit 103–0 corresponds to 2A, 2B, RTSPS trunk circuit 0 whose details are shown in FIGS. 3A and 3B. The conductors extending to the local office are shown on the left side of FIG. 2A; the conductors extending to the toll office are shown on the right side of FIG. 3A. Trunk circuit 103–0 communicates with the local and toll offices by means of E and M type signaling in a manner well known in the art. The local office places a battery on its M lead to transmit a seizure signal forward to the RTSPS trunk circuit of FIGS. 2A, 2B, 3A and 3B. The battery on the M lead at the local office causes a ground to appear on the IE lead of the trunk circuit of FIG. 3A where the lead terminates on the winding of relay IE. This ground operates relay IE which closes a path from ground on terminal 301 via contacts 3IE–1 to operate relay ON (FIG. 3B). Relay ON closes a holding path for itself through its own make contacts 3ON1–1 and through the break contacts 3CGD–1 to the terminal 302 ground.

Relay ON in operating extends the ground on terminal 303 (FIG. 3A), through its make contacts 3ON–2, through break contacts 3CT–1 and 3FCT–1 to conductor SI extending from FIG. 3A via FIG. 4A to break contacts 4H0–1 of hold magnet H0 on FIG. 4B. From there, the ground is extended to the winding of relay SL0 to operate it. A battery is on the other side of the relay SL0 winding at this time via break contacts 5B–1 (FIG. 5C), resistor R5 and terminal 505 as already described in connection with the detailed description of the concentrator switch.

Relay SL0 in operating, operates its hold magnet H0 to close a crosspoint connection between the RTSPS trunk circuit 0 of FIGS. 2 and 3 and the remote base unit trunk circuit that has been preselected for use on the next call connection. Let it be assumed that base unit trunk circuit 9 was preselected and that accordingly select magnet 9 was priorly operated and was held operated at the time hold magnet H0 operates for the call now being described. This being the case, a concentrator switch connection is established between the RTSPS trunk circuit 0 and base unit trunk circuit 9 via the crosspoint contacts defined by switch vertical zero and switch horizontal 9.

Hold magnet H0 is now held operated over a looking path that includes its make contacts 4H0–2, and conductor CIH extending from FIG. 4B back to FIG. 3A where the conductor is grounded by a part of the circuit from terminal 303 that originally grounded the SI conductor. The cut-through of the connection between RTSPS trunk circuit 0 and base unit trunk circuit 9 releases select magnet 9 and initiates the circuit operations already described so that another base unit trunk circuit is preselected for use on the next connection requested by a remote trunk circuit.

A ground from terminal 303 is on conductor SI on FIG. 3A at this time over a path already described. A ground is also applied at this time to conductor CIM from terminal 304 (FIG. 3A) through make contacts 3IE-2. The ground on these two conductors is extended with the closure of the switch crosspoints to the S and M conductors of switch horizontal 9 extending to the corresponding conductors on FIG. 5A. The ground on the S conductor operates relay TK9 to indicate that remote base unit trunk circuit 9 is busy and to prevent it from being preselected by the switch controller while it is busy on this connection. The ground on conductor M extends to the winding of relay IM9 on FIG. 5A to operate it.

A ground is on the M lead extending to the TSPS Center prior to the operation of relays TK9 and TM9. On FIG. 5A, the operation of relays 5TK9 and 5TM9 extend the battery on terminal 507 through resistor R19, make contacts 5TK9-3 to terminal 509-9. The operation of relay TM9 opens its break contacts 5TM9-1 to prevent the terminal 508- ground from being applied to terminal 509-9. The resistance battery on terminal 509-9 is extended to the M lead and from there to the SF signaling unit which transmits this signal over the circuitry shown on FIG. 6 so that it appears as a ground on the E lead of the local base unit trunk circuit 853-9 at the TSPS Center. This ground constitutes a seizure signal to the TSPS Center which in a manner already described then causes an MF receiver to be connected via switching network 804 to trunk circuit 853-9. This connection is established so that the TSPS Center may receive and register the call information that it will soon receive from the calling office via the remote center as well as the information that will receive from the remote center identifying the RTSPS trunk involved on the call.

TSPS CENTER REQUESTS CALLED NUMBER INFORMATION

The TSPS Center transmits a wink signal to the remote location when it is ready to receive call information. This wink signal appears as the application and removal of ground on the E lead of base unit trunk circuit 9 on FIG. 5A. The wink signal on the E lead of the base unit trunk circuit is extended through the closed crosspoints of the trunk concentrator switch where the same wink signal appears on lead CIE extending the the WZ relay combination on FIG. 3A. The initial application of the wink ground potential to lead CIE operates relay W; the subsequent removal of the ground operates relay Z. At the end of the wink signal, both relays W and Z on FIG. 3A are operated. This WZ circuit is similar to that already described in connection with FIG. 5C and therefore, its operation is assumed to be understood.

From a study of the circuitry intermediate ground on terminal 307 and the IM lead on FIG. 3A, it may be seen that the IM lead is grounded when both relays W and Z on this FIG. are released; that the battery from resistance R4 will be applied to the IM lead when relay W is operated while relay Z remains released; and that ground from terminal 307 will again be applied to conductor TM when both relays W and Z are operated. This being the case, it may be appreciated that the normal state of relays W and Z, followed by the sequential operation of these relays in response to a wink signal on conductor CIE, causes a corresponding battery wink signal to be applied to conductor IM back towards the calling office. In accordance with conventional E and M signaling technology, this wink signal is received by the local office on its E lead. This signal causes the local office sender to start the MF transmission of the called number forward where it is received on conductors IT and IR on FIG. 2. The MF signals on these conductors are extended to FIG. 3A, and via the break contacts 3STN-1 and 2 of relays STN are extended on FIG. 3A to conductors CIT and CIR from where they are further extended through the closed crosspoints of the concentrator switch and out over the T and R conductors on the upper right hand portion of FIG. 5A to the SF signaling equipment on FIG. 6. From there, they are transmitted to the TSPS Center where they are detected by a digit receive 807 and registered in memory under control of the processor.

TSPS CENTER REQUESTS THE REMOTE TSPS TRUNK AND CALLING STATION NUMBER

Following its reception of the called number, the TSPS Center transmits a signal to the remote center requesting that it outpulse the RTSPS trunk number followed by the calling number sent to the TSPS Center from the office. This sequence of action is initiated when the TSPS Center applies a battery to the M lead of the local base unit trunk circuit 853-9 to cause a ground to appear on the E lead of remote base unit trunk circuit 9 in FIG. 5A. This ground is extended over the E lead through the concentrator switch to the CIE lead on FIG. 3A where it causes relay W to release by shunting the left-hand terminal of resistor R1 to the ground on the CIE lead through the closed make contacts 5Z-1 of relays Z operated. With relay W released and relay Z operated, a path is closed on FIG. 3B from ground on terminal 308 to operate relay STN over an obvious path including contacts of the W and Z relays together with break contacts 3PCT-1. Relay STN now operates relay STN-1 on the same figure.

RTSPS TRUNK CIRCUIT OUTPULSER — FIGS. 2A AND 2B

Figures 2A, 2C:
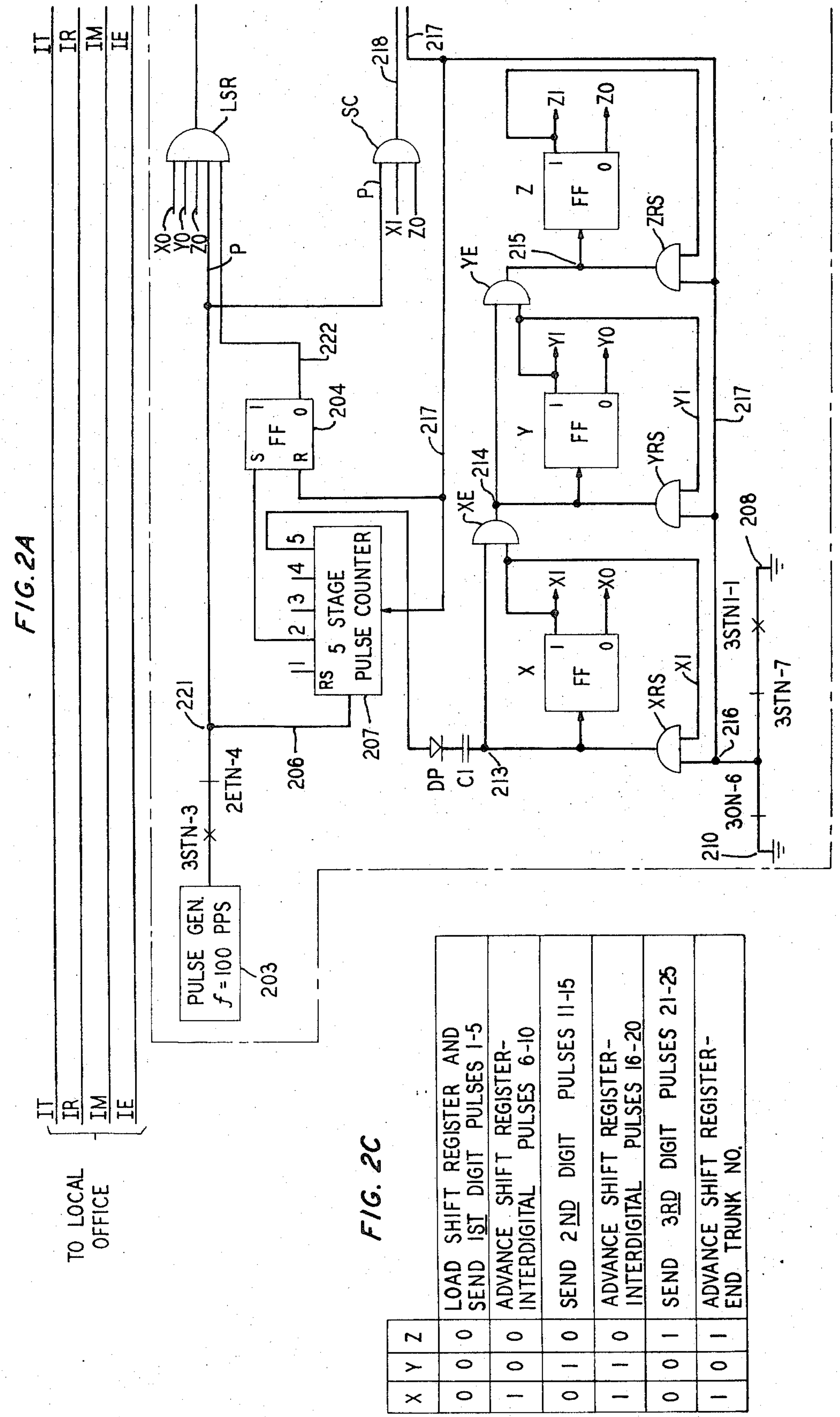
Figure 2B:
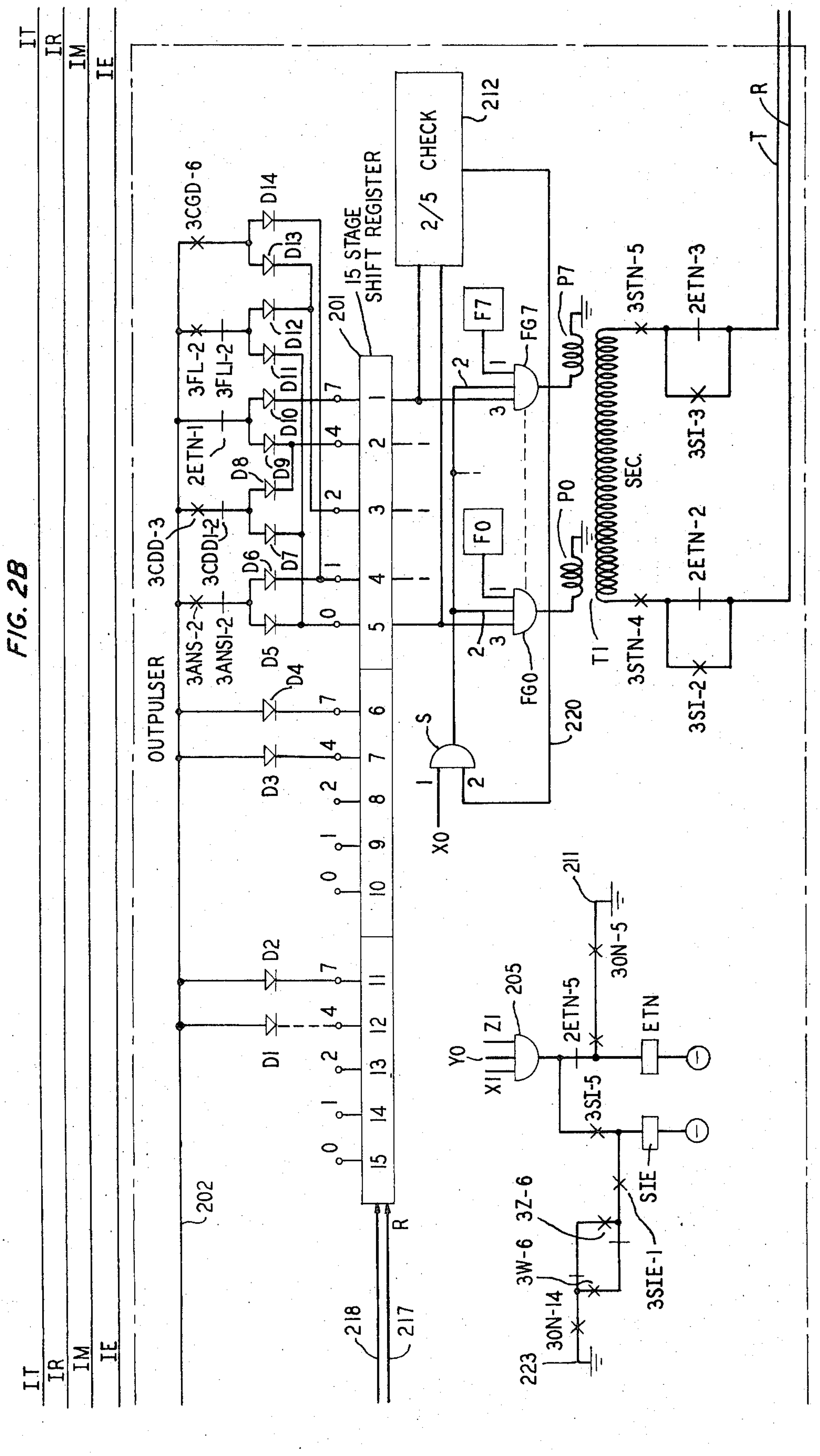

The equipment shown on FIGS. 2A and 2B generates the information that identifies the current stage of completion of the call as well as the identity of the RTSPS trunk circuit involved on the call. FIG. 2B contains sources of five frequencies F0 through F7 (F0,F1,F2,F4F7) which are used to generate signals in a two-out-of-five combinational code form, a transformer T1 by means of which the generated signals are transmitted via RTSPS trunk circuit 0 and in turn to the TSPS Center and a shift register 201 having 15 stages.

The 15 shift register stages are subdivided into three segments of five stages each. On each usage of the circuit of FIGS. 2A and 2B, a digit representing the stage of the call is initially entered in the right most segment; two digits representing the trunk identity number are entered in the left most two segments. The trunk identification information is prewired by means of the cross connections comprising diodes D1 through D4 which extend between conductor 202 and the inputs appearing on the top of the left most two segments of the shift register. Diodes 5 through D14, together with the relay contacts interconnecting them with conductor 202, supply an appropriate identification digit, in two-out-of-five code form, to the inputs of the right most segment of the shift register. The output information is taken from the right most segment of the shift register; pulses that cause the contents of the register to be shifted to the right by step are applied to its left end from the output of gate SC.

The illustrated cross connections are shown for a trunk number of 00 which supplies signals from conductor 202 via diodes D1 through D4 to stages 6,7,11 and 12 of the shift register. In accordance with the numbered inputs of these stages, the middle segment of the shift register thus receives a tens digit of 0 and the left most segment receives a units digit of 0 in two-out-of-five code form. With relay ETN released and with none of relays ANS, CDD, FL or CGD operated, a path is closed at this time from conductor 202, through break contacts 2ETN–1 and through diodes D9 and D10 to register stages 1 and 2. In accordance with the numbered inputs for these stages, these signals represent the digit zero and the two-out-of-five code form. Thus from the foregoing, it may be seen that the circuitry of FIG. 2 is now prepared to transmit the digits 000 with the first 0 indicating that this is an initial period seizure of the trunk circuit and with the remaining two zeros identifying RTSPS trunk circuit 00 of FIGS. 3A and 3B.

With reference to transmission AND gates FG0 through FG7 on FIG. 2B, frequencies F0 through F7 are continuously applied to the No. 1 input of each of these gates. The No. 3 input of these gates are connected to positions 1 through 5 of the shift register. This energizes the No. 3 input of the gates connected to register positions currently storing a binary "1." At the current time, register positions 1 and 2 each currently store a binary "1" to represent a "0" in two-out-of-five code form. This energizes the No. 3 inputs of gates FG7 and FG4. The No. 2 input of gates FG0 through FG7 are connected to the output of gate S and are energized only when gate S is turned ON.

Thus, it may be seen that anyone of AND gates FG0 through FG7 will be turned ON only if (1) gate S is ON and (2) the associated stage of the shift register stores a binary "1." The two-out-of-five check circuit 212 generates an output signal and applies it to conductor 220 whenever two and only two of the first five shift registers stages contain a binary "1." If the input conditions to the check circuit are satisfied, namely, if the first segment of the shift register contains good two-out-of-five information, the output of the check circuit 212 applies a signal via path 220 to energize the No. 2 input of AND gate S. The output of each of gates FG0 through FG7 is applied to primary windings P0 through P7 of transformer T1. The turn ON of any of these gates permits the frequency applied to its No. 1 input to pass therethrough and to be applied to the primary winding connected to the output of the gate.

It may be appreciated from the foregoing that with positions 1 through 5 of the shift register storing a digit "0", frequencies F7 and F4 will be applied via gates FG4 and FG7 to primary windings P4 and P7 of transformer T1 as soon as the upper input of AND gate S is enabled. When this occurs, these same frequencies will be applied via the secondary of the transformer and through make contacts 3STN–4 and 3STN–5, through break contacts 2ETN–2 and 2ETN–3 to the tip and ring conductors on FIG. 2. extending to conductors CIT and CIR of the trunk circuit. From there, the signals will pass through the concentrator switch and out over the tip and ring conductors on FIG. 5A to the TSPS Center.

OUTPULSING OF RTSPS TRUNK CIRCUIT NUMBER AND CALL STATE DIGIT

The following describes the manner in which the circuitry of FIGS. 2A and 2B outpulses the trunk identification number and call state identification digit in connection with the establishment of a path from the remote location of the TSPS Center. The operation of the circuit is controlled by the pulses from generator 203. This generator produces pulse at a 100 pulse per second rate with each pulse being of approximately 10 microseconds in width. With relay STN operated and ETN released, the output of the generator is applied to the P input of the LSR AND gate, as well as over conductor 206 to the input of five stage counter 207. the output of the counter controls flip-flop 204 as well as flip-flops X, Y and Z. Flip-flops X, Y, and Z comprise a binary counting chain AND gates XE, and YE are the carry gates between the successive binary stages. AND gates XRS, YRS, and ZRS, perform a reset function.

Each of the X, Y, and Z flip-flops has a 1 and a 0 output from which conductors extend to the inputs of various gates such as LSR, SC, 205. The output conductors of the binary X, Y, and Z counter control the conductive stages of the various gates so that the circuit performs its intended functions at the correct time. In order to minimize the drawing complexity, the conductors interconnecting the X, Y, and Z counter outputs with the various gates are not shown; but rather, the input designation of each gate whose conductive state is controlled by the binary counter is designated to indicate which binary stage (or stages) controls its conductive state. Thus, the lower two inputs of gate SC are designated X1 and Z0, respectively, to indicate that these two inputs are connected to the 1 output of stage X and the 0 output of stage Z, respectively.

All of the gates shown on FIGS. 2A and 2B are of the AND type. With respect to the gates that are connected to binary counter outputs, each input of an AND gate that is so connected is energized when its associated binary counter stage is in a conductive state. Thus, the lower two inputs of gate SC are connected to outputs X1 and Z0 of the binary counter; these two inputs are both energized when the X stage of the counter is in a 1 state and the Z stage is in its 0 state.

The binary counting chain is assumed to be initially in its 0 state when the circuit of FIG. 2 is first seized for use on an outpulsing operation. Relay STN is in an operated state at this time as already described. Relay ETN is normal. The pulses produced by generator 203 are now applied via make contacts 3STN–3 and break contacts 2ETN–4 to terminal 221. From there the pulses are applied to the P input of gate LSR as well as over conductor 206 to counter 207. Counter 207 is normally in its reset position 1 and it advances one position for each pulse received. The counter advances from its stage 5 back to its stage 1 when the fifth pulse is received. Flip-flop 204 is normally in its reset position, and therefore, its output connected via conductor 222 to the lower input of gate LSR is normally high.

With reference to AND gate LSR, its upper three conductors are high when the circuit is first seized since the X, Y, Z stages of the binary counter are all in their 0 condition at this time. The lower input of the LSR gate is also high at this time since flip-flop 204 is reset. This being the case, the reception of the first pulse by the P input of the gate turns it on and loads the shift register by means of the cross connection between output conductor 202 of the gate and the diodes extending therefrom to the various stages of the shift register. Since relay ETN is normal at this time, the right-most segment of the shift register is loaded via diodes D9 and D10 with the digit 0 in two-out-of-five code form. The next two segments of the register are loaded via diodes D1, D2, D3 and D4 with the digits 0 in two-out-of-five code form to represent the trunk number 00. The 0 in the right-most segment indicates the stage of the call and, in particular, indicates that this is an initial period seize seizure, and that the call is in the process of being established forward.

The upper input of AND gate S is connected to the X0 output of the binary counter; the lower input of the gate is connected to the output of the two-out-of-five check circuit 212. This check circuit is energized whenever the right-most segment of the shift register is loaded with good two-out-of-five data. When the two-out-of-five check signal is received following the loading of the shift register, AND gate S turns on and applies an output to the No. 2 input of each of the five gates FG0 through FG7. Gates F7 and F4 currently have their No. 3 inputs energized by the shift register. Frequencies F4 and F7 are applied via these gates to primary windings P4 and P7 of the transformer which in turn, extends these frequencies out over the tip and ring conductors through the crosspoint switch to the TSPS Center.

The first pulse from generator 203 advances counter 207 from its position 1 to its position 2. The output of position 2 of the counter switches flip-flop 204 from a reset (R) to a set (S) position. This removes the high signal from the 0 output of the flip-flop which is connected via conductor 222 to the lower input of gate LSR. Thus, gate LSR is enabled only long enough following the reception of the first pulse to load the shift register in the manner already described.

Counter 207 advances one step each time a subsequent pulse is received and is in its position 5 after the reception of the fourth pulse. Gate S (FIG. 2B) remains enabled during this period of time and the frequencies F4 and F7 continue to be transmitted to the TSPS Center.

Counter 207 advances from its fifth back to its first position after the fifth pulse is received. The series network comprising diode DP and capacitor C1 passes only to the positive going transitions at the output of the fifth stage of the counter. Positive going pulses are produced when the counter advances out of its fifth and back into its position 1 upon the reception of the fifth pulse. The reception of the positive pulse at terminal 213 as the counter advances from its position 5 to position 1 upon the reception of the fifth pulse causes the X stage of the binary counter to switch from 0 to 1. This removes the high potential from output conductor XO and applies it to output conductor X1. The removal of the potential from conductor XO disables AND gate S so that the signal frequencies will not be applied to transformer T1 by gates F0 through FG7 for the time being. The high on the X1 conductor partially enables AND gate SC since its Z0 input is also high at this time. The upper input of this AND gate is connected to the pulse source at terminal 221; therefore, gate SC now passes each pulse and applies it to the input of the shift register which in turn, advances one step for each pulse it receives. Counter 207 continues to advance one step for each pulse it receives. Gate SC is enabled as the next four pulses are received (pulses 7 through 10) and it passes these pulses to the shift register to advance it one step for each pulse.

The shift register has advanced five positions following the reception of the 10th pulse and therefore the initial contents of the left most two segments of the register are shifted to the right so that the trunk identification digits 00 are now in the right and middle segments.

Counter 207 advances out of its position 5 and back to its position 1 when the 10th pulse is received. This stepping of the counter applies a pulse through diodes DP and capacitor C1 to terminal 213. The lower input of gate XE is currently enabled by the X1 output of stage X. Thus, the reception of the pulse at terminal 213 enables the upper input of gate XE and permits it to pass the pulse through to the input of counter stage Y to switch it from a 0 to a 1 state. The X stage is switched from a 1 back to a 0 by this same pulse on terminal 213. The stage of the binary counting chain is 010 at this time as shown in the chart of FIG. 2C. The binary counting chain remains in this condition while counter 207 receives the next five pulses (pulses 11 through 15).

Gate S is currently enabled by the X0 counter output and thus the digit "0" now in the right-most segment of the shift register energizes gates FG4 and FG7 to cause frequencies F4 and F7 to be transmitted through the transformer, over the tip and ring conductors through the crossbar switch, to the TSPS Center. This outpulsing operation lasts while the next five pulses are being received, namely pulses 11 through 15.

Counter 207 steps out of its position 5 and back to its position 1 when pulse 15 is received. Gate XE is not currently enabled and thus the only response by the XYZ counter to the pulse on terminal 213 at this time is the switching of the X stage from a 0 to a 1 condition. This sets the binary counter to its 110 state as shown on FIG. 2C.

The switching of the X stage from a 0 to a 1 (1) disables AND gate S to terminate the MF outpulsing and, (2) enables AND gate SC so that it passes the next five pulses (pulses 16 through 20) to advance the shift register five more positions. Following the reception of the 20th pulse, the counter 207 has advanced from its position 5 back to its position 1 and in turn has applied another pulse to terminal 213. The lower input of both of gates XE and YE are currently enabled since counters X and Y are both in a 1 condition. The pulse on terminal 213 passes through gate XE to switch counter Y to a 0 state and through both gates XE and YE to switch counter Z to a 1 state. Gate X is also switched to a 0 state at this time. This sets the state of the counting chain to 001 state. The switching of the X stage to 0 enables AND gate S which, in turn, causes gates FG4 and FG7 to outpulse the frequencies F4 and F7 under control of the digit 0 currently registered in the rightmost segment of the shift register. This outpulsing operation continues during the reception of the next five pulses, namely pulses 21 through 25.

The reception of pulse 25 advances the counter from its fifth back to its first position and, in turn, applies a pulse to terminal 213 to switch the X stage of the binary counter from a 0 to a 1 state. The counter is now in a 101 condition as indicated on the lower line of FIG. 2C. This turns on gate 205 and operates relay ETN. This relay in operating closes a holding path for itself over make contacts 2ETN–5 and contacts 30N–5 to the terminal 211 ground.

When relay STN subsequently releases (as described later), it closes its break contacts 3STN–7 to extend the terminal 208 ground via break contacts 3STN1–1 to terminal 216. The ground on this terminal performs a number of reset functions. Included among these is the application of a ground to the left-hand input on each of gates XRS, YRS and ZRS. These grounds enable any gate connected to an X, Y or Z flip-flop currently in a 1 condition and thereby causes the gate to generate a pulse which switches its flip-flop back to a 0 state. The terminal 216 ground is further applied over conductor 217 to the reset (R) input of the shift register to enter a 0 in all of its stages. The ground on this conductor is further applied to the five stage counter 207 to reset it. The ground is further applied to the R terminal of flip-flop 204 to reset it.

The operation of relay ETN opens its break contacts 2 and 3 to disconnect the secondary winding of transformer T1 from the tip and ring conductors. The operation of relay ETN signifies the termination of this usage of the outpulser.

PARTIAL SUMMARY OF CALL PROGRESS

In partial summary of the call currently being described, the following actions have taken place:

1. the RTSPS trunk circuit detected the extension of the call forwarded from the local office;
2. a path was established through the concentrator switch and remote base unit trunk circuit 9 to the TSPS Center;
3. the TSPS Center detected the establishment of the connection and attached an MF receiver to the connection;
4. The TSPS Center applied a wink ground signal to the E conductor of the remote center to request the called number;
5. the remote center repeated this wink signal back to the local office which then outpulsed the called number via the remote center to the TSPS Center.
6. the TSPS Center caused a ground to be applied to the E conductor of the remote base unit trunk circuit to indicate that the TSPS Center is ready to receive further call information;
7. relay 3W released (but relay 3Z remains operated) in response to the E lead ground from the TSPS Center;
8. the release of relay 3W operated relay STN to activate the outpulser of FIGS. 2;
9. the outpulser generated and transmitted to the TSPS Center the digits 000 to indicate the stage of completion of the call and the trunk number involved on the connection; and
10. relay ETN operated when the outpulser of FIG. 2 completed its function.

LOCAL OFFICE OUTPULSES ANI INFORMATION

Terminal 315 (FIG. 3A) is grounded during the interval following the release of relay 3W and prior to the operation of relay ETN. However, with the operation of relay ETN at the end of outpulsing by the trunk circuit, the terminal 307 ground is removed from terminal 315 as break contacts 2ETN–7 opens. The removal of this ground causes the battery through resistor R4 to be applied to the IM lead extending back to the local office. This battery results in a ground on the E lead at the local office which, in turn, outpulses the calling number information. This information is typically referred to as ANI and it includes a KP digit and ST digit, a class mark digit, together with the seven digits representing the calling number. This information is transmitted by means of MF outpulsing and is received by remote RTSPS trunk circuit on its IT and IR leads on FIG. 3A. From there it is passed via make contacts 1 and 2 of relay STN released to conductors CIR and CIT extending through the crosspoint switch from there via the T and R conductors extending to the TSPS Center.

The TSPS Center causes the ground to be removed from the E lead of base unit trunk circuit 9 after it receives all of the ANI information and the three digits outpulsed by the trunk outpulser of FIGS. 2A and B. The removal of ground from the E lead on FIG. 5A removes ground from lead CIE on FIG. 3A which releases relay 3Z. The release of this relay opens its make contacts 3Z–3 on FIG. 3B to release relay STN by disconnecting its winding from the terminal 308 ground. The release of relay STN releases relay STN1 on the same figure. The releases of relay STN initiates the priorly described reset operations on FIG. 2A.

CONNECTION OF AN OPERATOR TO THE CALL

After the TSPS Center registers the called and calling station information outpulsed from the local office as well as the three digits from the trunk outpulser of FIGS. 2A and 2B, the TSPS system controller analyzes the information to determine, (1) what further services are required on the call and, (2) what connections must be made in order to provide these services. The system controller at this time also, (1) determines that all information that will be forthcoming has been received from the originating office and the remote location, (2) releases its MF receiver and, (3) establishes a connection between its trunk circuit 853–9 and an idle operator position. It further proceeds to establish another connection back to the remote location and in turn to the outgoing end of remote TSPS trunk circuit O. This connection is required so that call information can be outpulsed over this path to the toll offices for use in further extending the call forward.

Let it be assumed at this time that operator position O on FIG. 8B is idle, that it is selected for use on the call, that it is connected via the switching network to base unit trunk circuit 853–9 and in turn to the incoming end of remote TSPS trunk circuit O. Let it be further assumed that at this time the TSPS Center also selects local base unit trunk circuit 853–0 for use on this call and that it transmits the necessary signals back to the remote location to seize an idle remote base unit trunk circuit which, in turn, will establish a concentrator switch connection to the outgoing end of remote TSPS trunk circuit O. Following the establishment of this connection, the TSPS controller and its switching network 804 interconnects local base unit trunk circuit 853–0 with an outpulser 806.

PATH IS ESTABLISHED TO OUTGOING END OF RTSPS TRUNK CIRCUIT FROM TSPS CENTER

The following describes the circuit operations required to establish a path from local base unit trunk circuit 853–0 to the outgoing end of remote TSPS trunk circuit O. Trunk circuit 853–0 is connected via the SF signaling units 650–0 and 652–0 and the transmission facility 651-0 to remote base unit trunk circuit O. Therefore, the selection of TSPS trunk circuit 853–0 for use on this connection automatically amounts to a selection of remote base unit trunk circuit O of FIG. 5B. The TSPS Center applies a battery to the M lead of trunk circuit 853–0 to initiate the establishment of a concentrator switch connection to RTSPS trunk circuit O. The battery on the M lead causes a ground to appear on the E lead of remote base unit trunk circuit O on FIG. 5B. The E lead ground extends to the winding of relay TKPO to operate it. The path to operate this relay includes break contacts 5TKO–4. Each remote base unit trunk circuit has a TKP– relay corresponding to TKPO for trunk circuit O. Each trunk circuit also has a CON– relay such as CONO for trunk circuit O. The TKP– and CON– relays are arranged in what is known in the art as a lockout preference circuit so that one and only one trunk circuit may operate its CON– relay at a time. The reason for this is that it is possible that the various remote base unit trunk circuits could be connected to paths extending to different TSPS centers; therefore a preference arrangement is necessary in the event that two or more TSPS Centers simultaneously attempt to establish paths through the concentrator switch.

The TKP– relays are wired in a first preference circuit so that the first relay that receives a ground on its associated E lead operates and locks over its make contacts 3 to the terminal 511 battery. Following the operation of the first TKP– relay, the corresponding relay in all higher numbered trunk circuits cannot operate because of the opening of break contacts 3 of the TKP– relay of the lower numbered trunk circuit. The TKP– relay of a lower numbered trunk circuit could however operate subsequently. For this reason, the CON– relays are also arranged in a preference circuit so that the CON– relay will operate for the first trunk circuit whose TKP– relay operates and in so doing will break the operating path for the CON– relays for all lowered numbered trunk circuits. It is assumed for the call now being described that relay TKPO operates in remote unit base unit trunk circuit O. The operation of this relay opens its break contacts 5TKPO–3 to prevent the subsequent operation of the TKP– relays in any higher numbered trunk circuits. The closure of its make contacts 5TKPO–4 completes a path to operate relay CONO through break contacts 4 of all other TKP– relays in the chain, through break contacts 5SM1–7 and 5E–1 to ground on terminal 510. Relay E operates from 5 CONO–4. In operating it opens contact 5E–1 so that the resistor R20 is inserted into the holding paths for relay 5 CONO. This prevents other 5 CON– relays from operating until relay E releases.

In its idle condition, a remote base unit trunk circuit normally applies a ground potential to its M conductor. With reference to trunk circuit O this ground is extended from terminal 508–0, through break contacts 5TKO–2 and 5TKPO–1 to the M lead. The TSPS Center caused a ground to be applied to the E lead of remote base unit trunk 0 when it seizes that circuit. A successful seizure of the trunk circuit results in the operation of relays TKPO as already mentioned. The potential of the M lead is switched at this time from ground to resistance battery to transmit an acknowledgment signal to the TSPS Center. On FIG. 5B the opening of break contacts 5TKPO–1 and the closing of make contacts 5TKPO–2 switches terminal 516–0 and, in turn, the M lead, from ground via terminal 508–0 to the battery provided by resistance R10. This resistance battery on the M lead results in a ground on the E lead of trunk circuit 853–0 at the TSPS Center. When relay 5 CONO operates and connects the remote base unit trunk to the common MF receiver 701 the battery on the M lead is changed to ground by contacts 5 CONO–1. This wink signal on the M lead signifies that the remote base unit trunk circuit O has been successfully seized, that its CONO– relay has been operated, and that the TSPS Center may now transmit to the remote location the information it requires to establish a path to the particular RTSPS trunk circuit to which the TSPS Center desires to be connected.

In connection with the call currently being described it is assumed that the TSPS Center has seized remote base unit trunk circuit O for the purpose of establishing a path via the concentrator switch to the outgoing end of remote TSPS trunk circuit O on FIGS. 3. The control circuitry of the concentrator switch requires information specifying the particular remote TSPS trunk circuit, as well as the particular end thereof to which it should establish a path from remote base unit trunk circuit O. The TSPS Center at this time connects an MF outpulser to local base unit trunk circuit 853–0 and outpulses to the remote location the information required by the concentrator switch control circuitry to establish the required connection. This information is received and registered by the circuitry of FIGS. 7A and 7B whose operation is described in the following paragraphs.

TSPS CENTER OUTPULSES THE INFORMATION THE REMOTE LOCATION REQUIRES TO ESTABLISH A PATH TO THE OUTGOING END OF THE CALLING RTSPS TRUNK CIRCUIT

The operation of relay CONO closes its make contacts 2 and 3 to connect its associated T and R conductors from the TSPS Center with the T and R input of MF receiver 701 via break contacts 4 and 5 of relay CONI of trunk circuit 1 and the corresponding break contacts of remote base unit trunk circuits 2 through 9. The MF receiver detects the signals transmitted by the TSPS outpulser, translates them, and applies them to the registers A, B, and C shown on FIGS. 7A and 7B. The received signals are translated into two-out-of-five type information which, in turn, is applied to output conductors 0, 1, 2, 4, and 7 to operate the register relays. A ground is applied by the receiver 701 to its CK output conductor whenever two-out-of-five type information is applied to its output conductors. The CK lead ground is removed after the end of the reception of a first digit and is reapplied when the next and each subsequent digit is received.

The TSPS Center transmits three digits to the MF receiver 701 and the output signals representing these digits are successively entered into registers A, B, and C. The two digits identifying the remote TSPS trunk circuit to which a connection is to be established are entered into registers B and C. A digit specifying whether the connection is to be established to the incoming or outgoing end of the trunk circuit is entered into register A. A "0" is transmitted from the TSPS Center and entered into register A if the connection is to be established to the incoming end. Alternatively a "1" is entered into the A register if the connection is to be established to the outgoing end. In a manner subsequently described, the control circuitry of the concentrator switch uses the information stored in the three registers to establish the correct connection.

It is assumed in connection with the currently described call that a connection is to be established at this time from remote base unit trunk circuit O to the outgoing end of remote TSPS trunk circuit O. This trunk circuit identified itself as trunk circuit OO to the TSPS Center when its outpulser on FIGS. 2 operated as already described to send the initial call seizure information to the TSPS Center. The TSPS outpulser now transmits MF signals representing digits 1, 0, and 0 in that order to the MF receiver 701. The reception of the digit "1" applies signals on output conductors 0 and 1 of the receiver. These signals are extended via break contacts of relay 7TAS to the windings of relay RH1 and RH0 to operate them. The path to relay RH0 includes break contacts 7TAS-2. The path for relay RH1 from the MF receiver is not shown in detail. Output conductor CK of the receiver applies a ground via break contact 7TAS-3 to shunt the terminal 703 to ground for the duration of the output signal representing the first digit. Relays RH0 and RH1 operated close an obvious path from ground on terminals 706 to operate relay H1. This relay in operating closes an obvious holding path to ground over its own make contact and the make contacts 5E-2 to terminal 702.

Relays RH0 and RH1 release when the signals representing the first digit terminates. Relay TAS operates from the terminal 702 ground when the shunting ground on the output conductor CK of the receiver is removed following the transmission of the digit "1." The operation of this relay operates its transfer contacts to switch the output conductors of the MF receiver from the input leads of register A to the inputs of register B. The reception of the digit "0" for the first digit of the trunk identification number results in the application of signals to output conductors 4 and 7. This operates relays RT4 and RT7 of register B. Each of these relays in operating completes a locking path for itself through its own make contacts to terminal 712 and then via make contacts 5E-3 to ground on terminal 703. Relays RT4 and RT7 in operating close a path through the 2/5 to 1/10 translator 707 to operate relay T0 for a tens digit of "0."

Relay TBS operates from the terminal 703 ground on the termination of the transmission of the second digit and in so doing transfers the output conductors of the receiver from register B to register C. The transmission of a "0" for the third digit operates relays U4 and U7 in register C. These relays lock via their make contacts and contacts 5E-4 to ground on terminal 704. Relay TCS operates from the terminal 704 ground upon the termination of the transmission of the third digit when the shunting ground is removed from the CK lead.

The operation of relay TKPO when remote base unit trunk circuit O was seized by the TSPS Center as already described, opens its break contacts 9 in the path of select magnet 0 to release it in the event that this select magnet had been priorly operated by the TKP– relay preselection circuit. The operation of relay TKPO also closes its make contacts 4 and 5 that parallel contacts 1 and 2 of relay TKO to take it out of the preference arrangement of the TKO relay contacts so that select magnet 0 will be bypassed by the trunk preselection circuit. If select magnet SELO had been operated, by being the circuit that had been preselected by the TK– preference chain, this select magnet would have released and the preselection chain would have operated in the manner already described to preselect another crossbar switch horizontal for use on the next call extended to the TSPS Center. The closed make contacts 4 and 5 of relay TKPO now shunt contacts 1 and 2 of TKO and eliminate horizontal 0 of the switch from further consideration for the time being as a candidate for preselection.

Figure 7A:
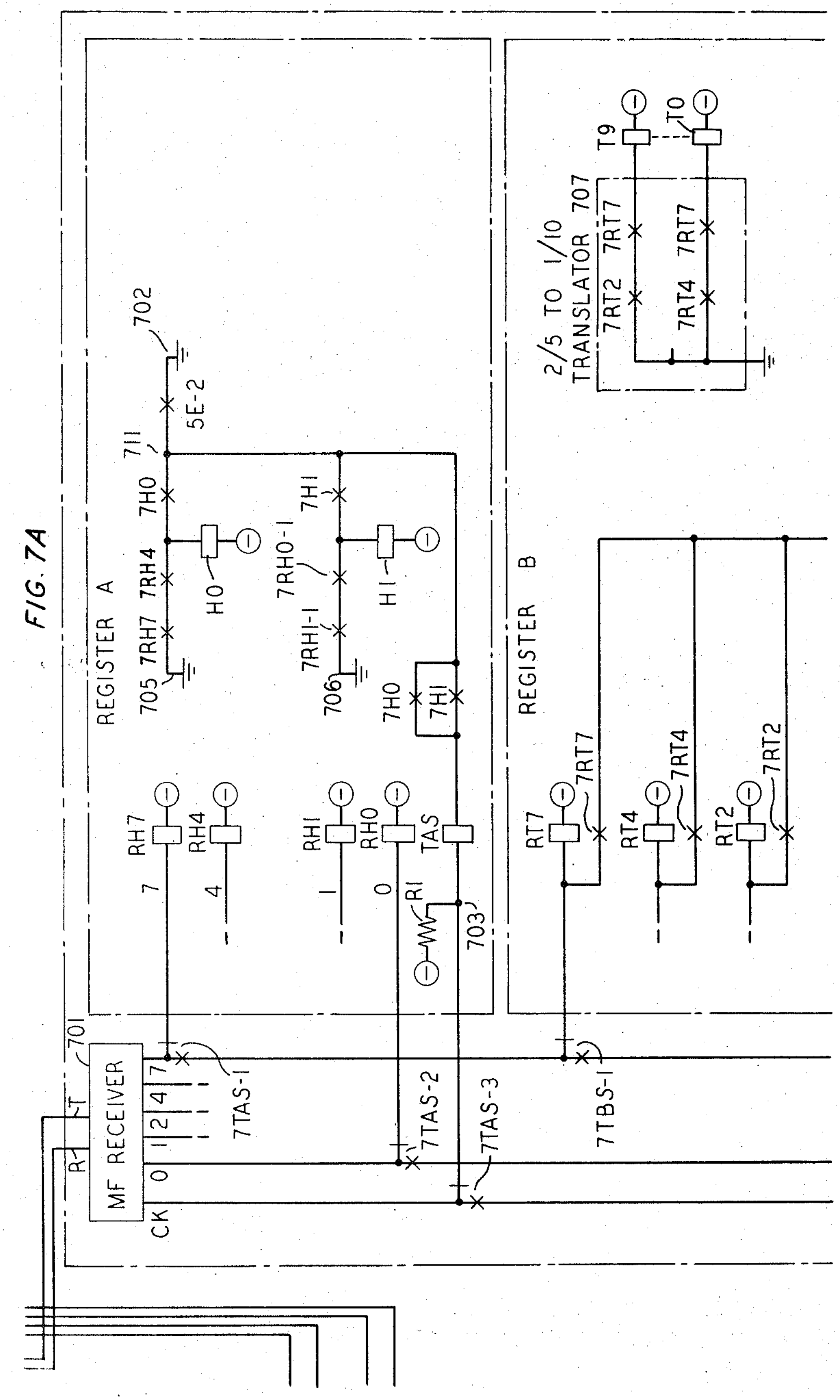
Figure 7B:
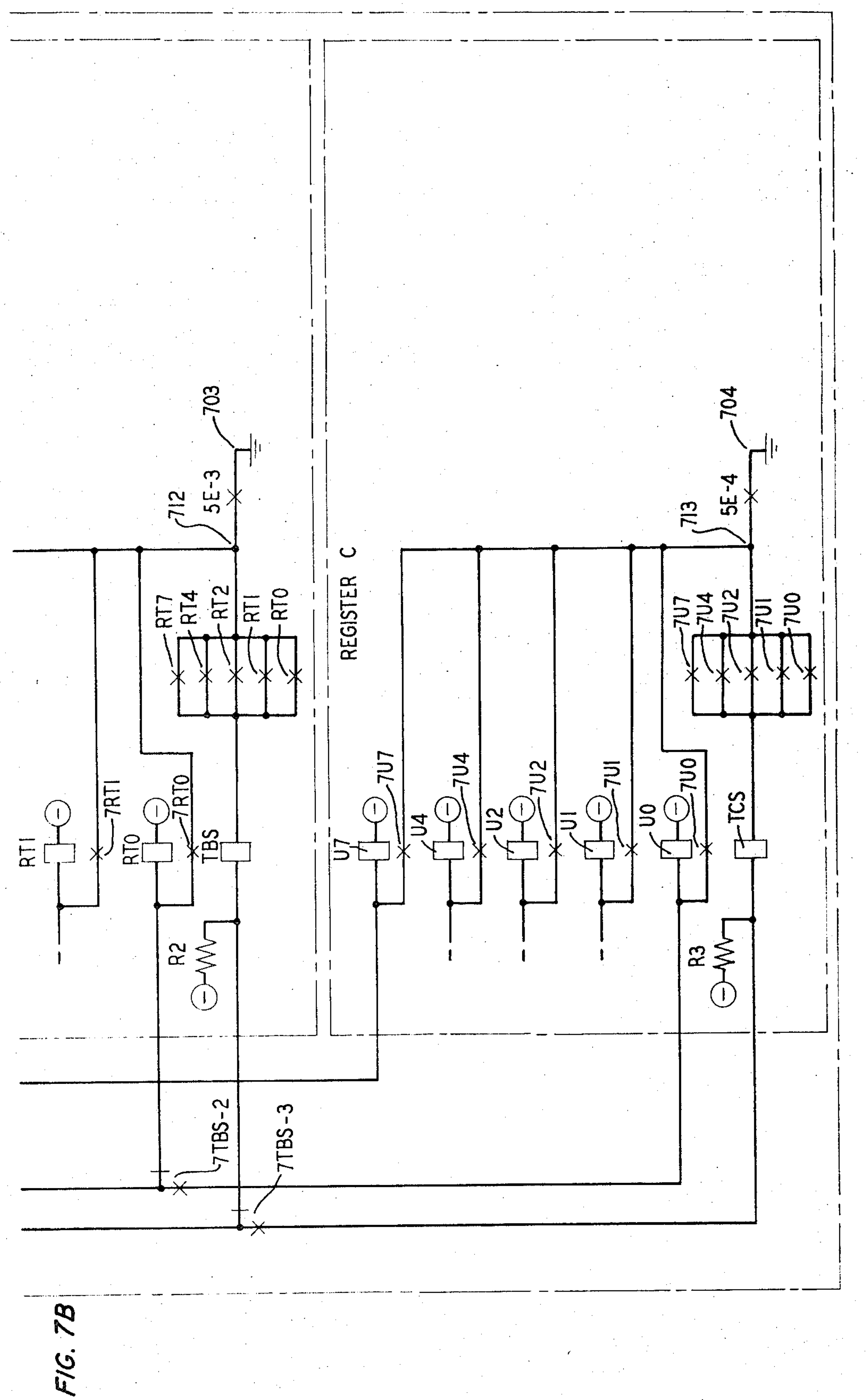

The following describes the manner in which select magnet SELO is operated following the registration of the trunk information outpulsed from the TSPS Center and registered by the circuit of FIGS. 7A and 7B. The operation of relay TCS (FIG. 7B) opens its break contacts 1 and 2 on FIG. 5C to disconnect ground on terminal 501 1 path over which a preselected select magnet and relay SM are currently being held operated. This releases the preselected select magnet and relay SM for the time required to operate select magnet 0 and an appropriate hold magnet for the connection now required. The operation of relay TCS and the release of relay SM together close a path on FIG. 5C to operate relay SM1 from the terminal 501 ground. The operation of relay SM1 closes the following path to operate select magnet 0: ground on terminal 501, break contacts 5SM-2, terminal 714, make contacts 7TCS-4, 5SM1-1, terminal 715, break contacts 6 of relays 5CON9 through 5CON1, terminal 716, make contacts 5CONO-6, make contacts 5SM1-3 to the winding of select magnet 0 to operate it. This magnet in operating closes its own make contacts to extend a path through resistor RO to operate relay SM. The operation of relay SM prevents the preselection circuitry comprising the TK- relays on FIG. 5 from preselecting and operating another select magnet at this time. This preselection operation is inhibited for the time being to avoid any interference with the path now being established.

The operation of relay SM also closes the following path on FIG. 4B to operate hold magnet H1: ground on terminal 401, make contacts 5SM-6, 5SM1-6, 7TCS-5, 5E-5, terminal 403–0, make contacts of relays 7U7, 7U4, and 7T0 to terminal 404–0, make contacts of relay 7H1 to terminal 407, and from there through break contacts 4H1-1 of hold magnet 1 to the winding or relay SL1 which operates from a battery on the other side of its winding to terminal 505 in the manner priorly described for the preselection circuitry. The operation of relay SL1 closes an obvious path to operate hold magnet H1 which by means of its make contacts 4H1–2 closes a holding path for itself to conductor COH extending to FIG. 3A where the conductor extends through break contacts 30TO–1 and make contacts 30N–7 to the terminal 318 ground. The operation of hold magnet H1 closes the crosspoint common to vertical 1 and horizontal 0 of the switch and thereby establishes a path between the TSPS Center and the outgoing end of RTSPS trunk circuit O shown on FIGS. 3. The conductors extending to the outgoing end of this trunk circuit are designated COT, COR, SO, COM, COE, and COH. The 0 suffix portion of each designation indicates that the conductors are associated with the outgoing end of RTSPS trunk circuit 1.

The operation of hold magnet H1 releases relay SL1. The closure of the crosspoint defined by vertical 1 and horizontal 0 interconnects its conductor S (FIG. 5A) with vertical conductor SO. The hold magnet H1 is held operated by a path from ground terminal 318 on FIGS. 3A through make contacts 30N–7, break contact 30TO–1, lead COH and make contact 4H1–2. Conductor SO is also grounded by this path through the additional contact 4H1–1. This ground is extended via the switch to conductor S for level 0 to operate relay TKO (FIG. 5B). This relay is held operated for the duration of the connection to prevent select magnet 0 from being reoperated by the preselection circuitry of FIG. 5.

The operation of relay TKO opens its break contacts 5TKO–4 within remote base unit trunk circuit 0 to release its relay TKPO by disconnecting it from the E lead ground. The release of this relay releases relay CONO. The release of relay TKPO releases relay 5CONO by opening the path through the make contacts 4 of all of the TKP– relays. Relay E releases when relay 5CONO releases. A different 5CON– relay cannot operate until relays 5E and 5SM1 are both released since resistor R20 in the operating path does not permit sufficient current to flow. The release of relay E opens its break contacts on FIG. 7 to release the register relays that are currently being held operated. In particular, this includes relay TCS which in releasing releases SM1 (FIG. 5C). The release of this relay in turn releases select magnet 0 and relay SM. The release of relay SM reactivates the preselection circuitry and at this time relay SM reoperates together with a preselected select magnet under control of the TK– relays. Relays TKO and TK9 are held operated at this time since both are involved on connections for the currently described call. Therefore, switch levels 0 and 9, together with levels currently serving any other established connection, are presently precluded as preselection choices for serving the next outgoing connection.

With reference to the preceding description it now may be better understood how the information transmitted to the registers of FIG. 7 controls the concentrator switch in establishing a connection from level 0 and remote base unit trunk circuit 0 to the outgoing end of remote TSPS trunk circuit 0. On the lower portion of FIG. 4B there are ten terminals designated 403–0 through 403–9. Immediately above each of these terminals there is a pair of contacts which comprise a two-out-of-five to one-out-of-ten translator for the units digit information stored in register C of FIG. 7B. For the currently described call the trunk number is 00, the units digit of the designation is therefore 0 and make contacts 7U4 and 7U7 close on FIG. 4B to extend the ground on terminal 403–0 to 405–0. Each of relays 7T0 through 7T9 has a set of contacts connected to each of the 405– terminals. Only the make contacts of relay TO is shown for contact 805–0 and only contact of relay 7T9 is shown for terminal 805–9. The value of the tens digit for the trunk number determines which one of the T– relay is operated and, therefore, determines which of the T– relay contacts will be used to operate an SL– relay and its hold magnet. The operation of relay 7T0 for a trunk tens digit of 0 extends the ground to terminal 404–0. If relay HO were now operated, it would establish a path to the incoming side of trunk circuit 0; the operation of 7H1 would close a path to the outgoing end of the trunk circuit. Therefore, the registration of a 0 or a 1 for the hundreds digit determines whether a connection will be established to the incoming or the outgoing end of the RTSPS trunk circuit identified by the tens and unit digits information. For the present call, the digits 1, 0, and 0 respectively specify the outgoing end of trunk circuit 00. A two-digit identification number permits up to 100 different trunk circuits to be identified; the hundreds digit information of a 0 or 1 requires two separate verticals on the concentrator switch for each trunk. Thus, if 100 trunk circuits are used, a switch having an effective capacity of 200 verticals would be required. Such a switch would utilize the full capacity of the identification registration and selection circuitry of the present drawing.

SEIZURE OF TOLL OFFICE

With the closure of the crosspoints common to vertical 1 and horizontal 0, the ground on the E lead from the TSPS Center is extended from FIG. 5A, through the closed crosspoints and, over conductor COE, to operate relay OM on FIG. 3A. The operation of this relay closes make contacts 30M–1 to operate relay OMA which, in turn, closes a locking path for itself through break contacts 30TO-2 and make contacts 30MA–1 and 30N–8 to the terminal 322 ground. Relay OM operated connects the OE conductor extending to the toll office with the COM lead of the trunk circuit of FIG. 3A. This lead in turn extends via the concentrator switch to relay TMO (FIG. 5B) in remote base unit trunk circuit 0. On FIG. 3A, relay OM operated opens its break contacts 30M–3 to remove the terminal 319 ground from conductor OM extending to the toll office. This permits resistance R3 to apply a battery to the conductor as an off-hook seizure to the toll office. The toll office responds to this signal and when it is ready to proceed with the serving of the call, it applies a battery to its M lead which grounds the OE conductor of FIG. 3A. This ground is extended to conductor COM, via the closed crosspoints to the winding of relay TMO to operate it. Prior to the operation of relay TMO, remote base unit trunk circuit 0 applies a ground to its M conductor extending towards the TSPS Center. The operation of relay TMO opens its break contacts 5TMO–1 to remove the terminal 508–0 ground through make contact 5TKO–1 and to permit the resistance battery from resistor R10 to be applied to the M lead through make contact 5TKO–3. This constitutes a signal to the TSPS Center that the toll office has been seized and that it is ready to proceed with the serving of the call.

The TSPS Center at this time transmits supervisory signals to the toll office by causing ground to be removed or applied to conductor E of remote base unit trunk circuit 0 on FIG. 5B. The E conductor of remote base unit trunk circuit 0 is connected at this time via the concentrator switch and the COE conductor of RTSPS trunk circuits to relay OM on FIG. 3A. The selective application and removal of ground by the TSPS Center to this conductor E controls the operated and nonoperated state of relay OM. When relay OM first operates, ground is removed from the OM lead by the opening of break contact 30M–3. Relay OM closes make contact OM–2 which after 0.5 second causes relay OM1 to operate in turn operating relay OM2 through make contact 30M1–1 and locking it through make contacts 30N–18 and 30M2–3. These relay actions at this time prepare the RTSPS trunk circuit for later supervisory actions (see section on "Release Forward by the Operator"). At this time, an E lead ground signal from the TSPS Center causes an OM lead battery signal to be transmitted to the toll office.

The toll office can communicate with the TSPS Center in the same manner by applying or removing ground from the OE lead of FIG. 3A. The OE lead is connected via the crossbar switch to relay TMO of remote base unit trunk circuit 0. The contacts of this relay determine whether battery or ground is applied to the M lead extending to the TSPS Center. The TSPS Center in the toll office exchange supervisory signals in this manner.

At this time, the tip and ring conductors incoming to the remote location from the TSPS Center are connected signalwise via the concentrator switch to the OR and OT conductors extending to the toll office through make contacts 30M–6 and 30M–16. Break contacts 30M–7 and 30M–17 remove the impedance of the local to toll office transmission repeat coil from this path. The MF signaling of the called number may be passed forward from the TSPS Center via the concentrator switch and the OT and OR conductors to the toll office. The time at which this outpulsing operation takes place is controlled by the toll office since the TSPS Center does not outpulse until it receives a wink signal on its E lead in response to a corresponding signal applied to the OE lead of the remote TSPS trunk circuit by the toll office.

TSPS RELEASES FROM THE TOLL OFFICE CONNECTION

The TSPS Center normally releases the concentrator switch connection to the toll office end of the call at the end of its MF outpulsing of the called number. The TSPS Center may, however, release at any other time. The release operation occurs when ground is removed from the E lead of remote base unit trunk circuit 0 on FIG. 5B. The removal of this ground removes ground from lead COE on FIG. 3A to release relay OM. Relay OM1 also releases. With relay OMA operated, as is currently the case, the release of relay OM for more than a timed interval, for example, 0.5 seconds operates relay OTO on FIG. 3A. This relay in operating opens its break contacts 30TO–1 to remove the terminal 318 ground from conductor COH and thereby releases hold magnet H1 for vertical 1 of the concentrator switch. The release of this hold magnet breaks down the connection between the outgoing end of RTSPS trunk circuit 0 of FIG. 3 and remote base unit trunk circuit 0. The TSPS may reestablish such a connection at any time by repeating the circuit operation priorly described. In this way, calls may be reattempted by the operator to the same or to a different called number. The TSPS Center remains connected via switch horizontal 9 and vertical 0 to the incoming end of the TSPS trunk circuit of FIG. 3 following its release from the outgoing end. With relay 30M–2 locked operated, the OM lead towards the toll office remains at the battery or off-hook potential since break contact 30M2–1 is operated and make contact 30M–3 is open.

TSPS CENTER REQUESTS RELEASE FROM AND CUT THROUGH AT THE REMOTE LOCATION

It has been described in a preceding paragraph how the outpulser at the TSPS Center transmitted the called information via the outgoing end of the RTSPS trunk circuit to the toll office. It was then described how the connection between the outgoing end of RTSPS trunk circuit 0 and the TSPS Center was released following the completion of the outpulsing operation.

The connection between the incoming end of the remote trunk circuit and the TSPS Center was initially established so that an MF receiver at the TSPS Center could receive call information outpulsed from the local office as well as from the remote center. After the reception of this information, the MF receiver was released and an idle TSPS operator position was connected to this path so that an operator can converse with the calling party to determine the service he requires. Many different types of service may be requested. Examples are charge to third party calls, credit card calls, person-to-person calls, collect calls, etc. For the first two types, the operator need only key in the appropriate billing information and then release. For the latter two types, namely person-to-person and collect, she must remain on the connection until the called station answers and determine whether the specified party is available or whether the called station will accept the charges.

From the foregoing, it may be appreciated that the nature of the services provided by the operator as well as the time required to complete these services will vary. On credit card and charge to third party calls it is probable that the operator will complete her duties and release before the called station answers. On the other hand, it is obvious that the called station must answer before the operator can release on person-to-person and collect calls.

The operator depresses a key at her position to request a release from a call to which she is currently connected. The TSPS Center responds to this signal and breaks down the connection within the TSPS Center to the local base unit trunk circuit 853–9 which is assumed to have served the presently described call on its inward connection. The TSPS Center also at this time transmits a signal to the remote center indicating that the operator position has released and that the concentrator switch connection to the inward side of the remote TSPS circuit may be released. This signal from the TSPS Center comprises a wink on the E lead of FIG. 5A; namely, a ground on the E lead for at least 0.2 seconds following which the ground signal is removed. The ground on the E lead is transmitted via the concentrator switch to conductor CIE of FIG. 3A to operate relay W. Relay Z operates 0.2 seconds later when the E lead ground is removed. During the period in which relay W is operated but before relay Z operates, the following path is closed to operate relay CT on FIG. 3B: the terminal 310 ground, make contacts 3W–5, break contacts 3Z–5, make contacts 3PCT–2 to energize the 0.2 second timer which operates relay CT after a 0.2 second delay. Relay PCT (FIG. 3B) is in an operated state at this time since it operated from the terminal 309 ground at the completion of outpulsing by the circuit of FIG. 2, namely, when relay ETN operated while relays W and Z on FIG. 3 were both in a released state. This completed a path from the terminal 309 ground to operate PCT which then closed a locking path for itself through the make contacts 3PCT–4 and 30N–11.

The operation of relay CT completes a locking path for itself and completes an obvious path to operate relay FCT which then locks to an ON relay ground. The operation of relay CT opens its break contacts 3CT–1 on FIG. 3A to remove the terminal 303 ground from conductors SI and CIH which extend to the concentrator switch. The removal of ground from conductor CIH breaks the path for hold magnet 0 to release it, and in turn, to release the crosspoints for vertical 0 and horizontal 9. This breaks down the connection between the incoming end of remote trunk circuit 0 and the path to the TSPS Center. The release of the concentrator switch breaks down the path for relays TM9 and relay TK9 on FIG. 5A. The release of these relays closes a path to apply ground from terminal 508–9 to the M lead to the TSPS Center as a release indication. Relay CT locks through make contacts 3CT–2 and 30N–10. Relay FCT in operating through break contacts 3FCT6 and 3FCT7 opens the talking path from the local office on leads 1T and 1R to leads CIT and CIR to the concentrator. This removes the bridged impedance of these wires from the cut through talking path.

CALLED PARTY ANSWERS

The time at which the operator and the TSPS Center releases from an incoming connection to a RTSPS trunk circuit depends upon the nature of the operator service required. As already described, the release may occur either before or after the called station answers. The following paragraphs first describe the circuit operation on calls for which the operator releases before answer takes place; following that, there is described the circuit operations for calls on which the called station before operator releases.

Let it be assumed that the RTSPS trunk circuit of FIGS. 3 is now awaiting answer by the called station. When the call is answered, ground appears on the OE lead from the toll office and operates relay CS of FIG. 3A. The path over which this relay operates includes ground on the OE lead, terminal 322, break contacts 30M–2, make contacts 3FCT–2 to the winding of relay CS. Relay CS in operating operates relay CS1 on the same figure which locks to ground through make contacts 3CS1–2, break contacts 30M–5, and make contacts 30N–12.

Relay ANS on FIG. 3B at this time operates over the following path; ground on terminal 312, make contacts 30N–20 break contacts 3STN1–1, make contacts 3FCT–3, 3CSI–1, make contacts 3CS–1, to the winding of relays ANS. Relay SI on FIG. 3A now operates from the terminal 316 ground over make contacts 30N–13, 3ANS–1 and break contacts 3ANSI–1.

The time at which the called party answers is of significance since the charging of the call for billing purposes usually begins for many types of calls at that time. Since the TSPS Center must compute the call charges, it is necessary that it receive information indicating the answer and disconnect times. The remote location has no facilities for storing such information and therefore in accordance with my invention, a new connection is temporarily established from a calling RTSPS trunk circuit to the TSPS Center each time a supervisory change of state is detected at the remote location. The outpulser for the RTSPS trunk circuit serving the call then transmits the trunk number and the type of change of state detected to the TSPS Center. The following describes the manner in which information indicating that the call has been answered is transmitted to the TSPS Center.

With relay SI on FIG. 3A operated as already described, the RTSPS trunk circuit is now prepared to initiate a connection to the TSPS Center. Once this connection is established as described in the following paragraphs, the trunk outpulser transmits its identity together with a prefix digit of "1" to indicate that the call has been answered. Similar operations occur for supervisory changes of state representing calling and called party disconnects or switchhook flashes by the calling party.

With the operation of relay SI, a path is closed on FIG. 3A to initiate the establishment of a new connection by the concentrator switch. This path begins with ground on terminal 303 and extends through make contacts 30N–2, 3SI–4 to conductor SI extending from FIG. 3A to FIG. 4B. This ground operates relay SLO to initiate the establishment of a concentrator switch connection between the RTSPS trunk circuit of FIGS. 3 and the TSPS Center in the manner already described. A preselected select magnet is already operated and the operation of relay SLO operates its hold magnet HO to close a set of crosspoint contacts. Let it be assumed that select magnet 9 is operated by the preselection circuit and that a path is now established over the crosspoints common to switch vertical 0 and switch horizontal 9. When the crosspoint contacts close, ground on lead CIM from the RTSPS trunk circuit operates relay TM9 on FIG. 5A and ground on lead SI operates relay TK9 on FIG. 5A. The operation of these two relays applies a battery to the M lead extending to the TSPS Center. This potential constitutes a seizure signal to the TSPS Center which, in turn, connects an idle MF receiver to the local base unit trunk circuit 853–9. This prepares the TSPS Center for the reception of the information that will be outpulsed to it by the trunk outpulser of FIGS. 2A and 2B.

When the MF receiver at the TSPS Center is attached to the connection, a ground appears on the E lead of trunk circuit 9 on FIG. 5A. This ground is extended through the concentrator switch contacts to conductor CIE on FIG. 3A to release relay W. Prior to the reception of this ground both relays W and Z were operated. The release of relay W closes a path on FIG. 3B from the terminal 308 ground to operate relay STN. The path over which this relay operates includes break contacts 3W–3, make contacts 3Z–3 and 3SI–1.

The operation of relay STN reinitiates the operation of the outpulser on FIGS. 2 to cause it to transmit a first digit identifying the current stage of the call and to transmit two extra digits identifying the trunk number. Relay ANS is held operated at this time and therefore the first pulse from generator 203 enters the trunk identification digits 00 in the left most two segments of the shift register and enters a digit of "1" in the right-most segment. This first pulse appears at the output of gate LSR and is extended through make contacts 3ANS–2 and break contacts 3ANSI–2, through diodes D5 and D6 to enter a binary bit into shift register stages 5 and 4 which represent a 0 and 1 in a two-out-of-five-code. The diodes interconnecting the output of gate LSR with the left-most two segments of the shift register enter the trunk identification digits of "00" into the shift register.

The circuit of FIGS. 2 now outpulses the digits "100" to the TSPS Center. The digit "1" tells the TSPS Center that the call has been answered; the digits "00" identify the trunk number. The TSPS Center stores this information together with that to which it has already received for the same call served by this trunk circuit. The path over which the outpulsing takes place on FIG. 2B now includes the make contacts 3SI–2 and 3SI–3 rather than break contacts 2 and 3 of relay ETN. Relay SIE (FIG. 2B) operates when the XYZ flip-flops reach their 101 state at the end of outpulsing through make contact 3SI–3. Relay SIE closes a holding path for itself through make contacts 3SIE–1, make contacts 3Z–6, break contacts 3W–6, make contacts 30N–14 to ground on terminal 223.

After receiving the digits "100," the TSPS Center removes ground from the E lead of FIG. 5A. This releases relay Z on FIG. 3A. The release of relay Z releases relay STN on FIG. 3B and starts the release of relay STN1 of FIG. 3B. During this interval (before relay STN1 releases), relay ANS1 on FIG. 3B operates from the terminal 323 ground through make contacts 3IE–3, break contacts 30M–5, make contacts 3ANS–3, and through the windings of relays ANS1 and ANS in series to battery. After relay ANS–1 operates, relay SI releases (FIG. 3A) and removes the holding ground from conductors SI and CIH. This releases hold magnet HO and the concentrator switch connection. Relays TK9 and TM9 on FIG. 5A now release and restore a ground to the M lead extending to the TSPS Center. This ground notifies the TSPS Center that the concentrator switch connection has released.

CALLING PARTY FLASH RECALL

The following describes how a connection is established to a TSPS operator when a switchhook flash is detected by the remote location. Switchhook flashing by a calling party causes the repeated release and reoperation of relay 1E on FIG. 3A. Relay STM on FIG. 3B operates from the terminal 313 ground on the first release of relay 1E. Its path includes make contacts 3FCT–5, break contacts 3IE–4, and make contacts 30N–15. Relay STM is of the slow release type and should remain operated during the flashing interval. The first reoperation of relay IE operates relay FL on FIG. 3B from the terminal 312 ground through make contacts 3STNI–1, 3FCT–3, 3IE–5, 3STM–1, and break contacts 3CGD–3 to the winding of relay FL. The operation of relay FL closes a path on FIG. 3A from the terminal 316 ground to operate relay SI. This path includes make contacts 30N–13, 3FL–1 and break contacts 3FLI–1. The operation of this relay initiates the establishment of a new concentration switch connection to the TSPS Center which then connects an idle MF receiver to the established path. The operation of relay SI further initiates the operation of the trunk outpulser of FIG. 2 when the concentrator switch connection is established and ground is applied to the E lead of the remote base unit trunk circuit. This operates relay W which operates relay STN from the terminal 310 ground, make contacts 3W–5, break contacts 3Z–5, make contacts 3PCT–2, 3PCT–3 and 3SI–1. At this time, make contacts 3FL–2 and break contacts 3FL1–2 provide a path on FIG. 3B to enter a digit "2" into the right-most segment of the shift register. The digits "200" are now outpulsed to the TSPS Center. The digit "2" signifies a customer flashing condition; the digits "00" identify the RTSPS trunk circuit serving the call. Relay SIE on 2B operates at the end of the outpulsing operation and closes a locking path for itself over its own make contacts to ground in series with make contacts 3W–6, break contacts 3Z–6 and make contacts 30N–14 to ground on terminal 223. Relay SIE on operating contacts 3SIE–1 and 3SIE–2 to close the talking path from the local office (leads IT and IR) through make contacts 3STN–1, 3STN–2, 3FCT–6 and 7 to the concentrator (leads CIT and CIR) to the TSPS Center.

The TSPS Center receives the digits "200" from the RTSPS trunk circuit and connects an operator position to the connection so that an operator may converse with the parties on the call to determine what further service they require. During this time, the TSPS Center maintains a ground on the E lead of remote base unit trunk circuit 9 on FIG. 5A (assuming this circuit is used on the connection). The talking path between the operator and the parties involved in the call includes make contacts 2 and 3 of relay SIE which interconnect the IT and IR speech conductors with conductors CIR and CIT extending through the concentrator switch.

When the operator is finished conversing with the calling party, the concentrator switch connection is released by a removal of ground from the E conductor of FIG. 5A. The removal of this ground operates relay Z. The operation of relay Z releases relay STN on FIG. 3B and starts the release of relay STN1. Relay STM priorly released when the calling party terminated his switchhook flashing. The release of relay STN opens its make contacts 3STN–6 to remove ground from the left side of the relay FL1 winding. Relay FL1 now operates from the terminal 311 ground through make contacts 30N–16 and 3FL–4 in series with relay FL. The operation of relay FL1 opens its break contacts 3FL1–1 to release relay SI which causes the concentrator switch connection to be released. The operation of relay Z releases relay SIE. This reestablishes the cut through talking condition of the trunk circuit as relay SIE opens its make contacts 1 and 2 on FIG. 2A by removing the wiring to the concentrator switch from the talking path.

Should the calling party flash before a called party answer signal is received or at any other time when relays W and Z are operated, the same sequence of actions occurs as described above, except relay W releases when the CIE lead ground is received. The path for operating relay STN in this case starts at ground terminal 308, break contact 3W–3, make contact 3Z–3 through make contact 3SIE at the end of trunk identification outpulsing is from ground 233, make contact 30N–14, break contact 3W–6, make contact 3Z–6 and make contact 3SIE–1. When the operator releases from the connection, ground is removed from lead CIE and relay 3Z releases. Relay 3STN releases in turn operating relay 3FL1 as described above. Relay 3SI releases and this starts the release of the concentrator switch connection.

No provision is made for flash recalls by the called party.

OPERATOR INTERVENTION

During the processing of a call after answer, the TSPS Center may determine that the operator must contact the calling party to notify him that the initial or an overtime charge period has been completed.

In this case the TSPS Center will use a remote base unit trunk and address the incoming end of the RTSPS trunk by pulsing the digits "000" into the MF receiver 701.

When the RTSP trunk circuit is seized under these conditions both the W and Z relays may be either operated or released.

In either case the ground on lead CIE will change the state of relay 3W. A ground from terminal 303 and make contact 30N–2 through contacts 3W–7 and 3Z–7 in opposite conditions will hold the concentrator connection. The operator will be able to converse with the calling party over the CIT and CIR leads which now pass through break contacts 3STN–2 and 3STN–1 to the IT and IR leads.

Also relays W and Z being in opposite conditions with relays SI released and ETN operated ground is placed on lead IM towards the local office by contacts 3W–1 and 3Z–1. Therefore whenever the operator's position is connected to the trunk by the TSPS Center a signal is returned to the local office. This supervisory signal may be used to associate local office coin control circuits with the call if necessary. It can also be used to prevent the release of the local office connection so that the operator holds the connection.

When the operator is finished conversing with the parties she may release from the connection. The E lead ground is removed at the remote base unit trunk in turn releasing or operating relay Z to match the state of relay W. The ground on lead CIH is removed releasing the concentrator connection.

During the conversation period the operator may be called upon to intervene an indeterminate number of times. The above sequence may be repeated with relays W and Z in opposite phases (relay W released with relay Z operated or relay Z released with relay W operated.)

CALLING PARTY DISCONNECT

When relay IE of FIG. 3A releases for more than 0.5 seconds, its break contacts 3IE–4 operates relay CGD on FIG. 3B via the timer. The relay locks to the terminal 314 ground through its make contacts 3CGD–4 and make contacts 30N–17. Relay SI operates because of the operation of relay CGD and the closure of make contacts 3CGD–5. The operation of this relay closes its make contacts 3CGD–6 on FIG. 2B to enter a "3" into the right-most segment of the shift register. The operation of relay SI also initiates the establishment of a new concentrator switch connection to the TSPS Center; it further operates relay STN to cause the digits 300 to be outpulsed to the TSPS Center at this time. Relay STN may operate when relay W operates or releases. If relay W operates the path is from terminal 310 through make contact 3W–5, break contact 3Z–5, make contacts 3PCT–2 and 3PCT–3 and make contact 3SI–1. If relay W releases the ground is from terminal 308, break contact 3W–3 and make contacts 3Z–3 and 3SI–1. The digit "3" indicates a disconnect seizure of the TSPS Center. During the outpulsing, ground is held on the IM conductor by make contacts 3CGD–2 from the terminal 306 ground. This ground prevents the reseizure of the remote TSPS trunk circuit at the local office. When the TSPS Center sends its own disconnect signal to the remote location by removing a ground from lead E on conductor 5A, relay STN releases when relay Z releases. With relay STN1 operated, relay ON can now release and, in turn, can restore the entire remote TSPS trunk circuit to normal.

A disconnect by the called party is detected by the toll office which transmits a signal to the remote location to remove ground from the OE conductor on FIG. 3A. The removal of this ground release relay CS. With relay CS released and CSI operated, a circuit is closed from the 312 terminal ground to activate the 13 second timer associated with relay CDD on FIG. 3B. This path includes break contacts 3STN1–1, make contacts 3FCT–3, 3CSI–1, break contacts 3DANS–1, and break contacts 3CS–2 and 3CDD–4. Should the calling party fail to disconnect during this period, relay CDD will operate and, in turn, will operate relay SI via make contacts 3CDD–1 and break contacts 3CDD1–1. Relay 3CDD locks to the timer actuating path independent of the timer through break contacts 3CDD1–3 and make contacts 3CDD–4. The operation of this relay activates the trunk outpulser of FIGS. 2A and 2B. With relay CDD operated, its make contacts 3CDD–3 on FIG. 2B closes a path to enter a "4" into the right-most segment of the shift register. The digits "400" are outpulsed to the TSPS Center after the operation of relay SI initiates a new concentrator switch connection to the TSPS Center in the manner priorly described. Notifying the TSPS Center of a called party disconnect of at least 13 seconds permits it to stop the charge timing, with a 13 second allowance. At the end of the trunk outpulsing operation, the trunk circuit will not be returned to normal but instead will await the receipt of a signal indicating that the calling party has released. This signal comprises the removal of a ground from the IE conductor of FIG. 3A. In the meantime relay CDD1 on FIG. 3B operated at the end of the trunk identification outpulsing cycle.

Relay STN releases at the end of trunk identification outpulsing when relay Z operates or releases depending upon whether relay Z is operated or released at the time the connection is established to the TSPS Center. The release of relay STN with relay STN1 slow-to-release momentarily removes the terminal 312 ground from the make contact 3CDD–3 through which relay 3CDD has been held operated. Relay 3CDD1 now operates in series with relay 3CDD from ground terminal 323 through make contact 3IE–3, break contact 30M–5, and make contact 3CDD–2. Relay CDD1 in operating make contact 3CDD1–2 grounds the OM lead to the toll office thereby permitting it to release the connection forward without awaiting the release by the calling party.

Should the calling party disconnect during the sending of the trunk identification for called party answer or timed disconnect, the ground or lead IE will be removed. However, relay IE will not release since a holding path is closed through make contacts 30N–18, 3SI–6 and 3IE–3.

When relay SI released at the end of a trunk identification cycle relay IE may release and start another trunk identification cycle, this time using the calling party disconnect code "3" as the first MF digit transmitted to the TSPS Center. Otherwise the action to release the RTSP trunk is the same as priorly described.

RELEASE FORWARD BY THE OPERATOR

If as a result of a flash recall, the operator is required to release and reestablish a connection through the toll office, the TSPS Center will seize an idle remote base unit trunk circuit and through it will cause a connection to be established to the outgoing end of the remote TSPS trunk circuit in the same manner priorly described. The same supervisory conditions which obtained earlier will now permit the release of the trunk forward and the transmission of a new called number toward a toll office. During this supervisory cycle, relay OM on FIG. 3A will operate from ground on the COE lead and will release relays ANS, ANS1, CDD, CDD1 and CS1 on FIGS. 3A and 3B if they had previously operated. This enables a new charge time interval to be established for the newly established call.

The operation of relay OM reapplies ground to the OM lead for 0.5 seconds through the make contacts 30M–3, 30M2–2 and break contact 30M1–3. When relay 0M1 operates the ground is removed. The 0.5 seconds during which ground is applied to the lead OM is sufficient to release the distant toll office connection and to prepare it to receive a new service request which starts on the reapplication of battery on the OM lead. The toll office may now exchange signals over the OE lead and COM lead to the TSPS Center so that a called number may be outpulsed.

LOCAL BASE UNIT TRUNK CIRCUIT — FIG. 13

FIG. 13 illustrates the circuit details of one of the local base unit trunk circuits which on FIG. 8 are designated as elements 853–0 through 853–9 and which comprise a portion of the TSPS Center. The function of this circuit is to interconnect the SF signal unit equipment of FIG. 6 with the TSPS switching network 803. As shown on FIG. 8A, each local base unit trunk circuit is connected on its left-hand side to an individual one of the SF signal units 652–0 through 653–9. Each trunk circuit is connected on its right side to the TSPS network.

With reference to FIG. 13, the T, R, E, and M conductors extend to a SF signal unit. The T and R leads comprise the transmission pair, the E and M leads are the signal conductors. The T1 and R1 conductors on the right side of the figure extend to the TSPS switching network. The T1 and R1 conductors and the switching network permit the TSPS circuits on the right side of the network to be connected signalwise with the SF signal equipment via the trunk circuit and its T and R conductors.

The trunk circuit contains relays A, B, and C which are of the magnetic latching type and which are connected by means of conductors 1301A, 1301B, and 1301C, to the signal distributor shown as element 833 on FIG. 8A. As described in the Jaeger patent, the signal distributor provides the necessary signals to operate and release its trunk circuit relays. The trunk circuit further contains scanner ferrod 1302 which is connected in series with the E lead. This lead extends from the terminal 1303 battery, through the ferrod, to the SF signal unit which alternately grounds and open circuits the left end of the E conductor. This transmits call supervisory signals to the TSPS Center from the remote location. The ferrod physically comprises a portion of the scanner shown as element 834 on FIG. 8C. Current flows through the ferrod when the E lead is grounded by the SF signal equipment; conversely, no current flows when the E lead is open circuited. The scanner 834 periodically scans ferrod 1302 to determine whether the E lead is grounded or open circuited. The grounding of the E lead switches the ferrod to a first state of magnetization; the open circuiting of the lead switches the ferrod to a different state of magnetization. By this means, the signals transmitted from the remote location are applied to the E lead, detected, and entered into the portion of memory in which other information for the same call is temporarily stored.

The TSPS Center transmits call supervisory signals to the remote location by either grounding or applying negative battery to the M lead on FIG. 13. The potential that is applied to the M lead is determined by the state of relay C. When the relay is released, its break contacts 13C–1 close a path to extend ground from terminal 1304 to the M lead. When the relay is operated, its make contacts 13C–2 connect the terminal 1305 battery to the M lead.

The series circuit comprising resistor R5 and capacitor C3 is connected by means of break contacts 13B–1 across the T1, R1 conductors during the idle condition of the trunk circuit. This provides the necessary idle circuit termination for the SF signal equipment. Relay B is operated when the trunk circuit is seized, and the opening of its break contacts 13B–1 removes the idle circuit termination.

Relay A, together with its contacts, permits the T and R conductors to be connected to the T1 and R1 conductors on either a d-c or a-c basis. The two sets of conductors are connected on a d-c basis by means of break contacts 13A–3 and 13A–4 when the A relay is released. When the relay is operated, the two sets of conductors are connected on an a-c basis by the repeat coil REP. The operation of relay A: closes its make contacts 13A–1 to connect the T conductor to the P1 winding, closes its make contacts 13A–2 to connect the R conductor to the P2 winding, closes its make contacts 13A–3 to connect the T1 conductor to the S1 winding, and closes its make contacts 13A–4 to connect the R1 conductor to the S2 winding. The opening of its break contact 13A–3 and 13A–4 disconnects the path that would otherwise provide a d-c connection between the input and output conductors.

Relay A is necessary so that the SF signal unit of FIG. 6 may be connected to the digit receiver 807 and outpulser 806 in a manner that always provides the necessary and correct polarity d-c energizing potential to the signal conductors. The SF signal unit of FIG. 6 provides what is commonly known as a dry loop termination to its T and R conductors. This circuit must be connected to a circuit that provides a d-c energizing potential to the signal conductors so that a-c signals may be exchanged between the SF circuitry of FIG. 6 and the equipment to which it is connected in the TSPS Center. The local base unit trunk circuit of FIG. 13 connects the SF equipment of FIG. 6 with a digit receiver at certain times and with a TSPS outpulser at other times. The MF receiver (shown on FIG. 81 of the Jaeger patent) provides a d-c energizing potential to its T and R signal conductors. Thus when the local base unit trunk circuit of FIG. 13 is connected to a digit receiver, its T1 and R1 conductor receiver a d-c energizing potential from the MF receiver. Relay A on FIG. 13 is left in an unoperated state on such connections so that the energizing potential from the MF receiver may be extended through break contact 13A–3 and 13A–4, over the T and R conductors to the SF signal equipment of FIG. 6.

The MF outpulser (shown on FIG. 82 of the Jaeger patent) provides only a dry loop termination to its signal conductors. Therefore when the trunk circuit of FIG. 13 is connected to an outpulser, its T1 and R1 signal conductors are connected to the dry loop of the MF outpulser. For such connections, relay A is operated so that the secondary side of the repeat coil provides the necessary d-c energizing potential to the dry loop of the MF outpulser and so that its primary side provides a d-c energizing potential back to the dry loop of the SF signal equipment.

The local base unit trunk circuit is also used to connect the incoming side of an RTSPS trunk circuit with an operator position after the digit receiver at the TSPS Center has received all the information outpulsed from the remote location and the originating office. At that time, the network connection between the local base unit trunk circuit and the digit receiver is released and a new connection is established between the trunk circuit and an operator position circuit. Relay A and its contacts at this time are released since the connection between the SF signal unit and the operator circuit is on a d-c basis with the transmission circuitry ahead of the position circuit providing the necessary energizing potential to the tip and ring conductors.

The circuit of FIG. 13 together with the provision of the A-relay and the repeat coil permit the trunk circuit to be used on two types of connections, namely, those in which a d-c connection is required as well as those in which an a-c connection is required. This feature of the trunk circuit eliminates the necessity of providing two separate groups of trunk circuits for the two different types of SF signal equipment between the remote and base locations.

What is claimed is:

1. In a telephone system, a plurality of remote trunk circuits intermediate a local office and a toll office each of which directly interconnects a local office trunk circuit with a toll office trunk circuit, a call service center distinct from said local and toll offices, transmission means comprising a lesser plurality of service channels connected to said service center, switching means common to said remote trunk circuits and distinct from said service center and said local and toll offices, means responsive to the receipt by one of said remote trunk circuits of a call extended from said local office for establishing a service connection through said switching means to said service center via one of said service channels, means for transmitting call information to said service center over said service connection with said information including the identity of said one remote trunk circuit, means for subsequently transmitting call information from said service center over said service connection via said switching means and said one remote trunk circuit to said toll office, means for subsequently releasing said service connection, and means in said one remote trunk circuit for monitoring the supervisory state of said call subsequent to its extension to the called station.

2. The system of claim 1, in combination with means in each of said remote trunk circuits for detecting each supervisory change of state of a call served thereby, means responsive to the detection of a change of state by said one remote trunk circuit for causing said switching means to establish a service connection to said service center from said one remote trunk circuit, and means for transmitting call information over said last named service connection to said service center with said information including the identity of said one remote trunk circuit and the nature of the detected supervisory change of state.

3. In a telephone system, a plurality of remote trunk circuits intermediate a local office and a toll office each of which directly interconnects the outgoing end of a local office trunk circuit with the incoming end of a toll office trunk circuit, a call service center distantly situated with respect to said remote trunk circuits and distinct from said local and toll offices, transmission means comprising a lesser plurality of service channels connected to said service center, switching means common to said remote trunk circuits and distinct from said service center and said local and toll offices, means responsive to the receipt of a call from said local office by one of said remote trunk circuits for establishing a first service connection from said one remote trunk circuit through said switching means to said service center via one of said service channels, means for transmitting call information over said first service connection to said service center with said information including the identity of said one remote trunk circuit, means for subsequently establishing a second service connection via said switching means and a second of said service channels between said service center and said one remote trunk circuit, means in said service center for transmitting call information forward to said toll office over said second service connection and said one remote trunk circuit, means for subsequently releasing both of said service connections, and means in said one remote trunk circuit for monitoring the supervisory state of said call upon its extension to said toll office.

4. The system of claim 3 in which said means for establishing said second service connection comprises means at said service center for transmitting information representing the identity of said one remote trunk circuit to said switching means, and means including said switching means responsive to the receipt of said trunk identity information for establishing said second service connection.

5. The system of claim 4, in combination with means responsive to the detection of a supervisory change of state by said one remote trunk circuit for causing said switching means to establish a service connection between said service center and said one remote trunk circuit, and means for transmitting call information over said last named service connection to said service center with said information including the identity of said one remote trunk circuit and the call state as represented by the detected supervisory change of state.

6. The system of claim 5 further comprising means responsive to the receipt of said information over said first service connection for subsequently connecting an operator position at said service center to said first service connection so that an operator at said operator position may converse with the calling party.

7. The system of claim 6 in which said means for transmitting information to said service center over said service connections comprises a register in said one remote trunk circuit, means effective upon usage of said last named transmitting means for entering digits into said register representing the identity of said one remote trunk circuit as well as a digit representing the current state of the call served by said one remote trunk circuit, and means further effective upon each usage of said last named transmitting means for outpulsing the information stored therewithin through said switching means and over a service connection to said service center.

8. The system of claim 3 in which said means for establishing said second service connection comprises, a first and a second path connecting each of said remote trunk circuits with said switching means, means at said service center for transmitting to said switching means the identity of said one remote trunk circuit and the identity of the particular path extending to said one remote trunk circuit that is to be used on said second service connection, means associated with said switching means for registering said information received from said service center, and means including said switching means responsive to said registration for establishing said second service connection.

9. In a telephone system, a plurality of local offices, a plurality of toll offices, a plurality of remote centers each distinct from said local and toll offices and each of which serves calls extended from a different one of said local offices to a different one of said toll offices, a plurality of remote trunk circuits in each of said centers with each remote trunk circuit directly interconnecting the outgoing end of a local office trunk circuit and the incoming end of a toll office trunk circuit of the toll office common to the remote center in which the remote trunk circuit is situated, means in each of said local offices for extending calls to at least one of said toll offices via at least one of said remote centers, switching means in each of said remote centers, a call service center distinct from said local and toll offices and distantly situated with respect to said remote centers, means responsive to the receipt of a call from a local office by one of said remote trunk circuits for establishing a connection from said one remote trunk circuit through the switching means of its remote center to said service center, means for transmitting information over said connection to said service center with said information including the identity of said one remote trunk circuit and the current state of said call, means responsive to the receipt of said information for subsequently connecting an operator position at said service center to said connection so that an operator at said position may converse with the calling party, means for establishing a second connection via said switching means between said service center and said one remote trunk circuit, means in said service center for transmitting call information over said second connection and said one remote trunk circuit to the toll office to which said one remote trunk circuit is connected, means for subsequently releasing both of said connections, and means in said one remote trunk circuit for monitoring the supervisory state of each call served thereby.

10. The system of claim 9, in combination with means responsive to the detection of each call supervisory change of state by said one remote trunk circuit for causing its associated switching means to establish a connection to said service center from said one remote trunk circuit, and means for transmitting call information over said last named connection to said service center with said information including the identity of said one remote trunk circuit and the current state of the call as represented by the detected supervisory change of state.

11. The system of claim 10, in which said means for establishing said second connection comprises means at said service center for transmitting information representing the identity of said one remote trunk circuit to the remote center in which said one remote trunk circuit is situated, and means including said switching means responsive to said trunk identity information for establishing said second connection.

12. The system of claim 11, in which said means for transmitting information to said service center from said remote center comprises, a register in said one remote trunk circuit, means effective upon each usage of said means for transmitting for entering digits into said register representing the identity of said one remote trunk circuit as well as the current state of the call served by said one remote trunk circuit, and means further effective upon said registration for outpulsing the information stored in said register through its associated switching means to said service center.

13. The system of claim 10, in which said means for establishing said second connection comprises, a first and a second path connecting each remote trunk circuit with the switching means at its remote center, means at said service center for transmitting to the remote center of said one remote trunk circuit the identity of said one trunk circuit and the identity of the particular path extending to said one remote trunk circuit that is to be used on said second connection, means at each remote center for registering trunk identity and path identity information received from said service center, and means including the switching means associated with said one remote trunk circuit responsive to said registration of said information received from said service center for establishing said second connection.

14. The system of claim 13, in which said means for transmitting information to said service center from said remote center comprises, a register in each of said remote trunk circuits, means effective upon each usage of said means for transmitting information to said service center for entering digits into said register of said one remote trunk circuit representing the identity of its remote trunk circuit as well as a digit representing the current state of the call served by said one remote circuit, and means further effective upon each usage of said register means for transmitting for outpulsing the information stored in said register through said switching means to said service center.

15. In combination a plurality of intermediate trunk circuits for serving calls extended thereover from trunk circuits of a local office to trunk circuits of a toll office, a switching means distinct from said local and toll offices and common to all of said intermediate trunk circuits, a branch on each of said intermediate trunk circuits connected to an individual appearance on said switching means, means in each of said intermediate trunk circuits for monitoring the supervisory state of each call served thereby, a service center distinct from said local and toll offices and said switching means, means responsive to the detection of each supervisory change of state by an intermediate trunk circuit during the serving of a call for causing said switching means to establish a connection to said service center from said call serving intermediate trunk circuit, means for transmitting call information over said connection to said center with said information including the identity of said call serving intermediate trunk circuit and the current call state as represented by the detected supervisory change of state, and means subsequently effective for releasing each of said connections.

16. The combination of claim 15 in which said intermediate means for transmitting information to said service center comprises, a register in each of said trunk circuits, means effective upon the detection of each change of state by a call serving intermediate trunk circuit for entering into its register digits representing the intermediate trunk circuit identity as well as the current state of the call served by the intermediate trunk circuit, and means further effective upon said registration for outpulsing the information stored in said register through said switching means to said service center.

17. The combination of claim 16 in combination with means at said center for registering and storing all of the call data transmitted thereto from said intermediate trunk circuits, and means at said center for recording call charge data upon the receipt of information from said call serving intermediate trunk circuit indicating the end of a call served thereby.

18. In a telephone system, a plurality of remote trunk circuits intermediate a local office and a toll office each of which directly interconnects a local office trunk circuit with a toll office trunk circuit, a call service center distinct from said local and toll offices, transmission means connected to said service center and comprising a lesser plurality of service channels, switching means common to said remote trunk circuits and distinct from said service center and said local and toll offices, means responsive to the receipt by one of said remote trunk circuits of a call extended from said local office for establishing a service connection from said one remote trunk circuit through said switching means to said service center via one of said service channels, means effective subsequent to the receipt of said call for transmitting call information to said service center over said transmission means with said information including the identity number of said one remote trunk circuit, and means responsive to the reception of said call information by said center for controlling the transmission of call control signals from said service center over said service connection via said switching means and said one remote trunk circuit to said toll office.

19. The system of claim 18 in combination with means for subsequently releasing said service connection during said call, and means in said one remote trunk circuit and independent of said service center for thereafter monitoring the supervisory state of said call subsequent to its extension via said toll office to a call station.

20. In a telephone system, a plurality of local offices, a plurality of toll offices, a plurality of remote centers distinct from said local and toll offices each of which serves calls extended from a different one of said local offices to a different one of said toll offices, a plurality of remote trunk circuits in each of said remote centers with each remote trunk circuit interconnecting the outgoing end of a trunk circuit of the local office and the incoming end of a trunk circuit of the toll office common to the remote center in which the remote trunk circuit is situated, means in each of said local offices for extending calls to at least one of said toll offices via at least one of said remote centers, switching means in each of said remote centers, a call service center distantly situated with respect to said remote centers, transmission means connected between said service center and each of said remote centers, each of said transmission means comprising a plurality of service channels, means responsive to the receipt of a call from a local office by one of said remote trunk circuits for establishing a service connection from said one remote trunk circuit through the switching means of its remote center via one of said service channels to said service center, means effective subsequent to the receipt of said call for transmitting call information to said service center over said transmission means with said call information including the identity of said one remote trunk circuit and the current state of said call, means responsive to the receipt of said call information by said service center for subsequently connecting an operator assistance position at said service center to said service connection, means for establishing a second service connection over one of said service channels via said switching means between said service center and said one remote trunk circuit, means in said service center responsive to the establishment of said second service connection for transmitting call control signals over said second service connection and said one remote trunk circuit to the toll office to which said one remote trunk circuit is connected, means for subsequently releasing both of said service connections, and means in said one remote trunk circuit for monitoring the supervisory state of each call served thereby.

* * * * *

UNITED STATES PATENT OFFICE
CERTIFICATE OF CORRECTION

Patent No. 3,731,000 Dated May 1, 1973

Inventor(s) Amos Edward Joel, Jr.

It is certified that error appears in the above-identified patent and that said Letters Patent are hereby corrected as shown below:

Col. 2, line 17, change "persontо-person" to --person-to-person.

Col. 3, line 55, change "form" to --from--.

Col. 19, line 55, after "1963 and before period" insert --which issued on March 9, 1971 as patent No. 3,570,008--.

Col. 23, line 16, change "$CBD^{920}$" to --$CPD^{920}$--.

Col. 24, line 19, change "it" to --its--;
line 54, before "signals" add --type--.

Col. 26, line 56, change "looking" to --locking--.

Col. 27, line 11, change "IM9" to --TM9--;
line 63, change "TM" to --IM--.

Col. 28, line 26, before "office" add --local--;
line 66, after "Diodes" change "5" to --D5--.

Col. 32, line 31, change "stage" to --state--.

Col. 38, line 38, after "501" delete "1" and insert --from the--

Claim 7, line 34, after "upon" add --each--.

Claim 16, lines 47-48, after "said" delete "intermediate";
line 49, after "said" insert --intermediate--.

Signed and sealed this 5th day of February 1974.

(SEAL)
Attest:

EDWARD M.FLETCHER,JR.
Attesting Officer

RENE D. TEGTMEYER
Acting Commissioner of Patents